(12) United States Patent
Küchel

(10) Patent No.: US 7,889,356 B2
(45) Date of Patent: Feb. 15, 2011

(54) TWO GRATING LATERAL SHEARING WAVEFRONT SENSOR

(75) Inventor: Michael Küchel, Oberkochen (DE)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 12/633,639

(22) Filed: Dec. 8, 2009

(65) Prior Publication Data

US 2010/0141959 A1 Jun. 10, 2010

Related U.S. Application Data

(60) Provisional application No. 61/201,270, filed on Dec. 9, 2008.

(51) Int. Cl.
*G01B 9/02* (2006.01)
*G01D 5/36* (2006.01)

(52) U.S. Cl. .................. 356/520; 356/521; 250/237 G

(58) Field of Classification Search ............... 356/520, 356/521; 250/237 G
See application file for complete search history.

(56) References Cited

U.S. PATENT DOCUMENTS

| | | | | |
|---|---|---|---|---|
| 3,829,219 | A * | 8/1974 | Wyant | 356/489 |
| 7,023,562 | B2 * | 4/2006 | De Lega | 356/521 |
| 7,333,216 | B2 * | 2/2008 | Wegmann et al. | 356/521 |
| 2004/0174533 | A1 * | 9/2004 | Nakauchi | 356/515 |
| 2004/0239947 | A1 | 12/2004 | De Groot | |
| 2005/0007602 | A1 * | 1/2005 | Haidner et al. | 356/521 |
| 2005/0117168 | A1 * | 6/2005 | Ouchi | 356/520 |
| 2005/0264827 | A1 * | 12/2005 | Schriever et al. | 356/509 |
| 2006/0012799 | A1 * | 1/2006 | Wegmann | 356/515 |
| 2006/0203253 | A1 * | 9/2006 | Kato | 356/521 |
| 2008/0144043 | A1 * | 6/2008 | Wegmann et al. | 356/521 |
| 2010/0141959 | A1 * | 6/2010 | Kuchel | 356/521 |

FOREIGN PATENT DOCUMENTS

EP 0 628 984 12/1994

OTHER PUBLICATIONS

International Search Report issued on Jul. 20, 2010, for the corresponding PCT Application No. PCT/US2009/067189, filed Dec. 8, 2009.

* cited by examiner

*Primary Examiner*—Patrick J Connolly
(74) *Attorney, Agent, or Firm*—Fish & Richardson P.C.

(57) ABSTRACT

Methods include simultaneously diffracting a beam in a first direction and a second direction orthogonal to the first direction to form a once-diffracted beam, where the beam comprises a wavefront shaped by a test object, simultaneously diffracting the once-diffracted beam in orthogonal directions to form a twice-diffracted beam, overlapping at least two orders of the twice-diffracted beam in each direction to form an interference pattern at a detector, the interference pattern being formed by multiple copies of the wavefront laterally sheared in the first direction and multiple copies of the wavefront laterally sheared in the second direction; and determining information about the wavefront based on the interference pattern.

41 Claims, 35 Drawing Sheets

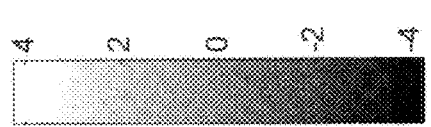
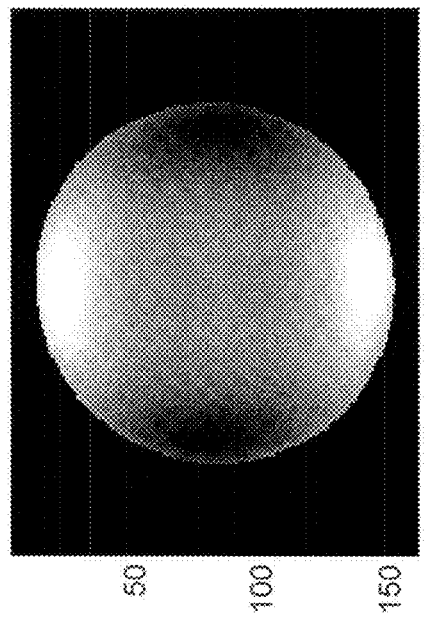
FIG. 11(b)
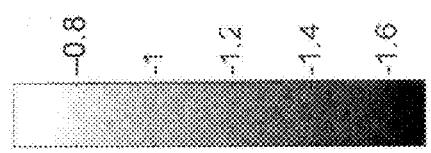
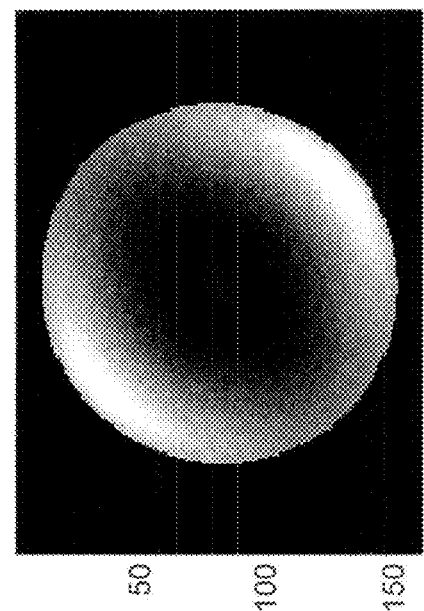
FIG. 11(d)
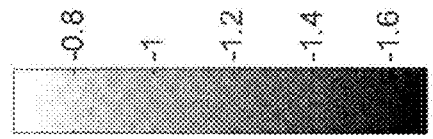
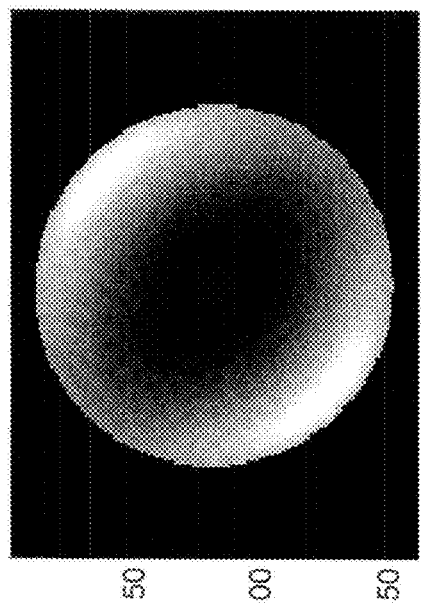
FIG. 11(a)
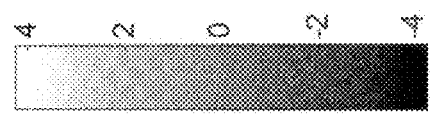
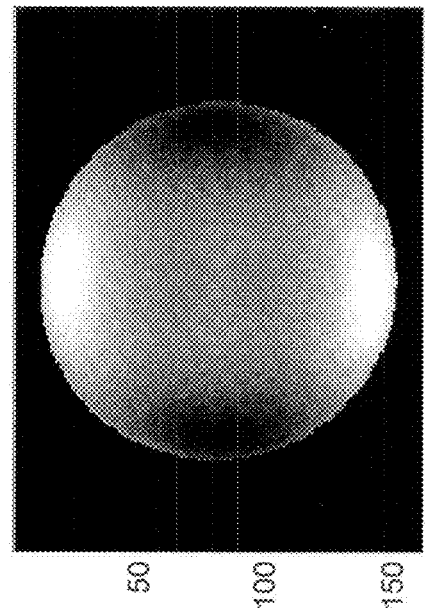
FIG. 11(c)

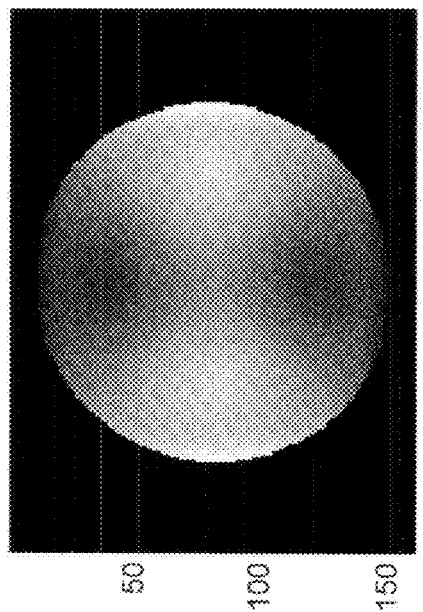
FIG. 11(l)
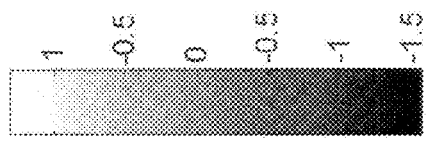
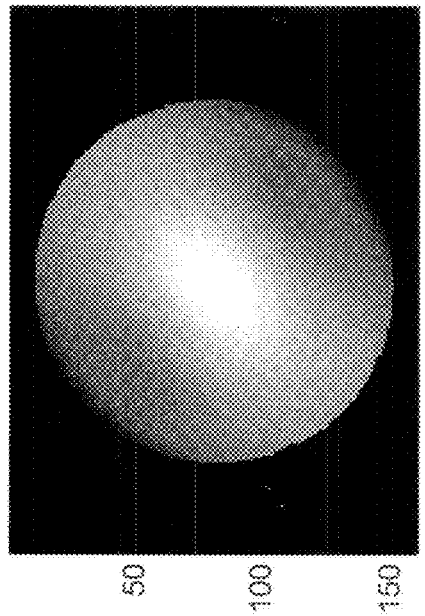
FIG. 11(n)
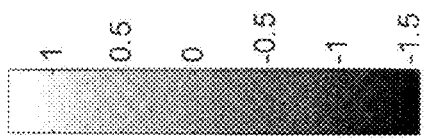
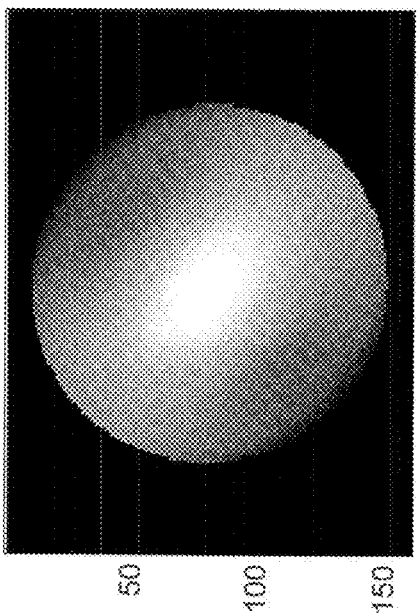
FIG. 11(k)
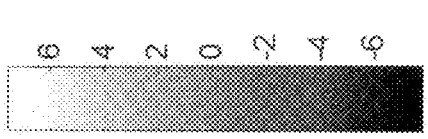
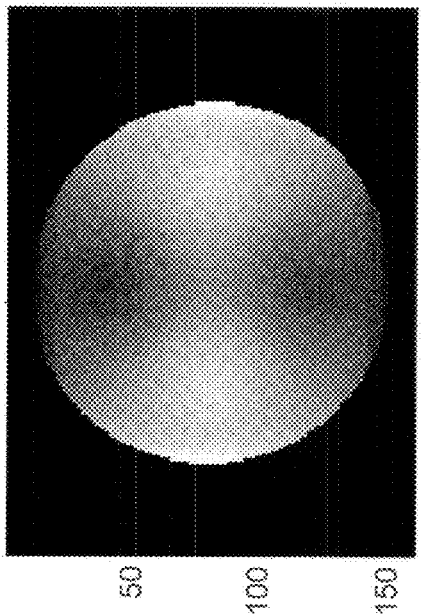
FIG. 11(m)

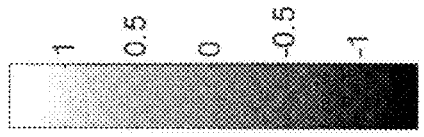
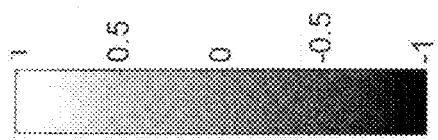
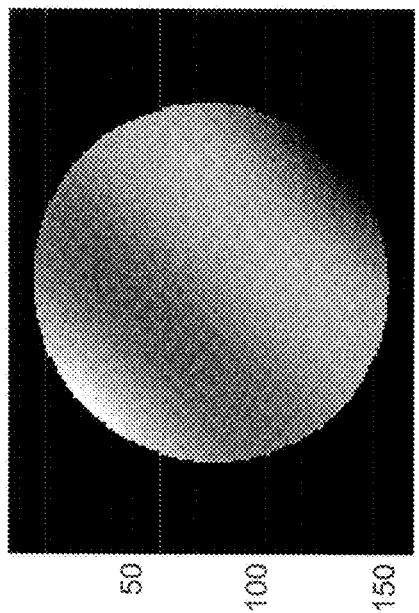
FIG. 11(v)
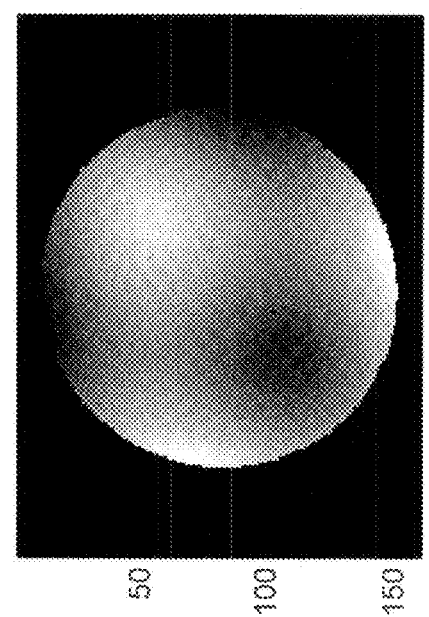
FIG. 11(x)
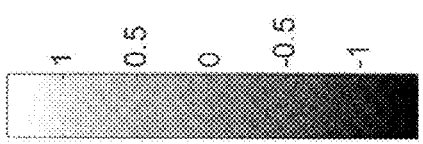
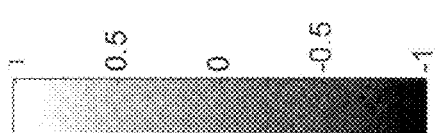
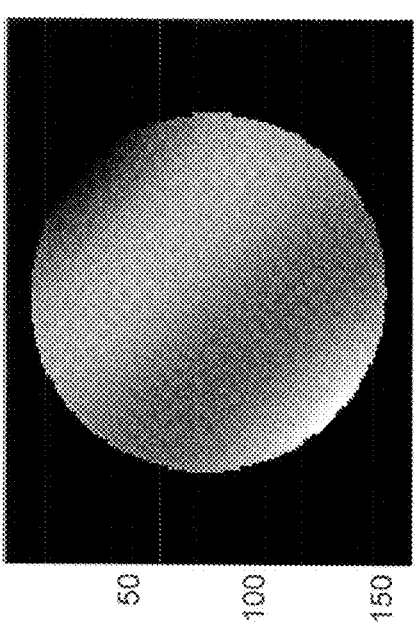
FIG. 11(u)
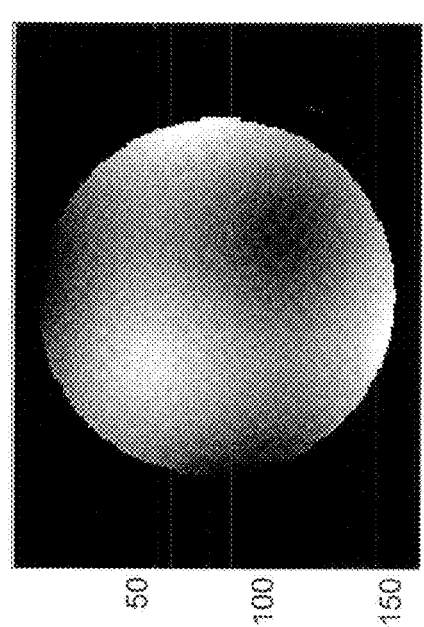
FIG. 11(w)

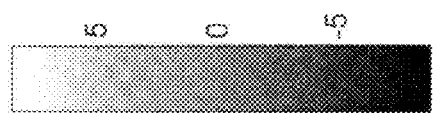
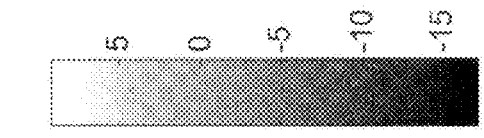
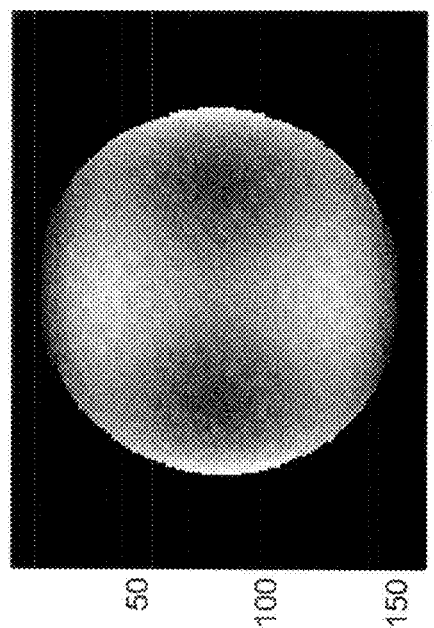
FIG. 12(a)
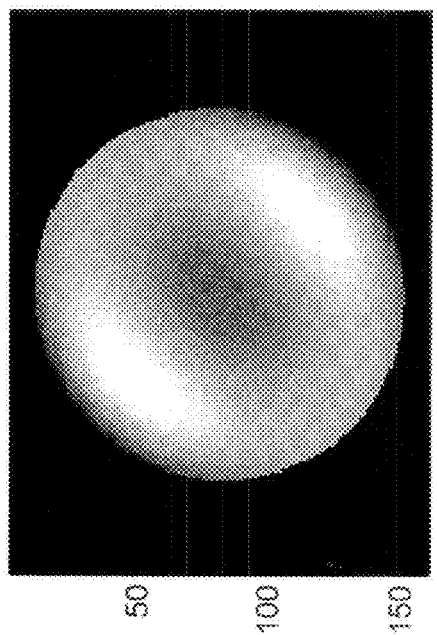
FIG. 12(b)
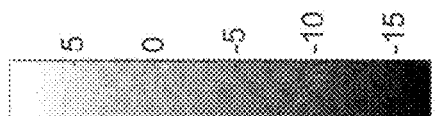
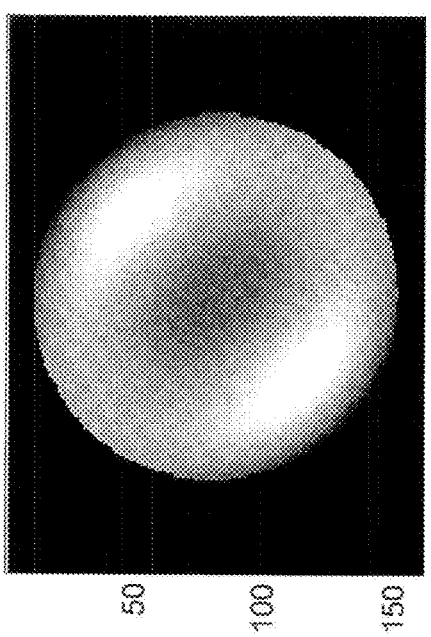
FIG. 12(c)
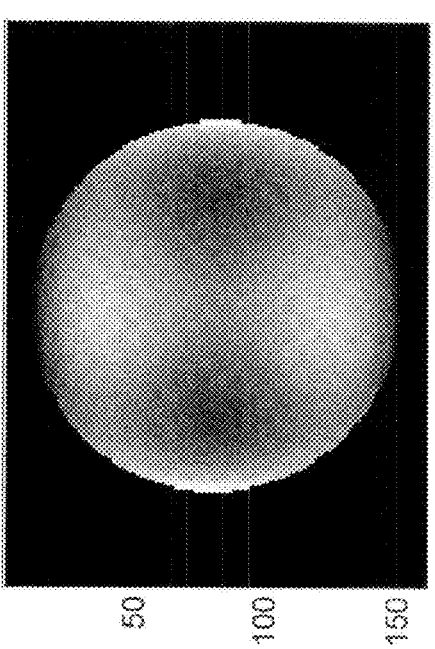
FIG. 12(d)

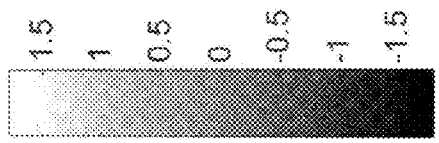
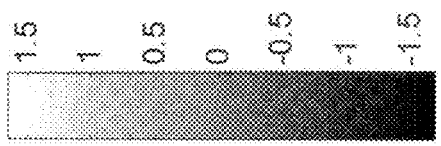
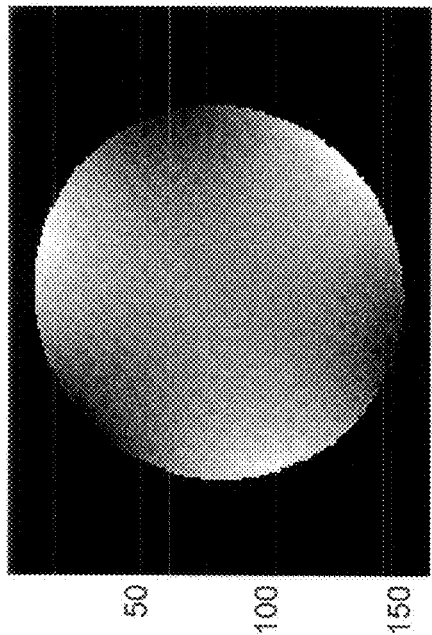
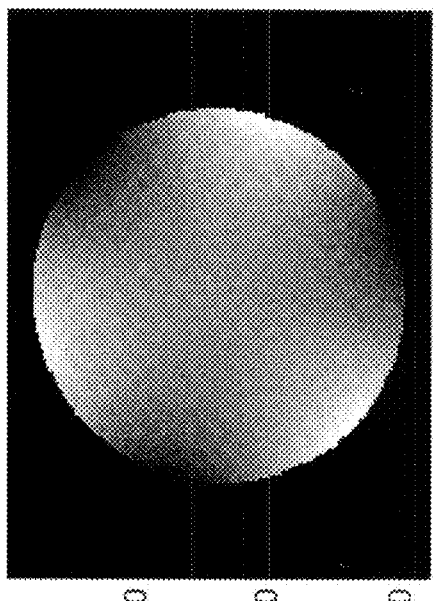
FIG. 12(g)      FIG. 12(h)
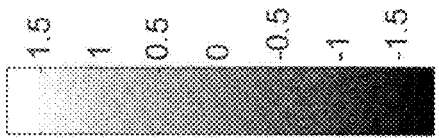
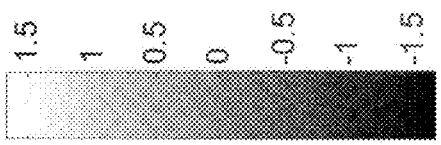
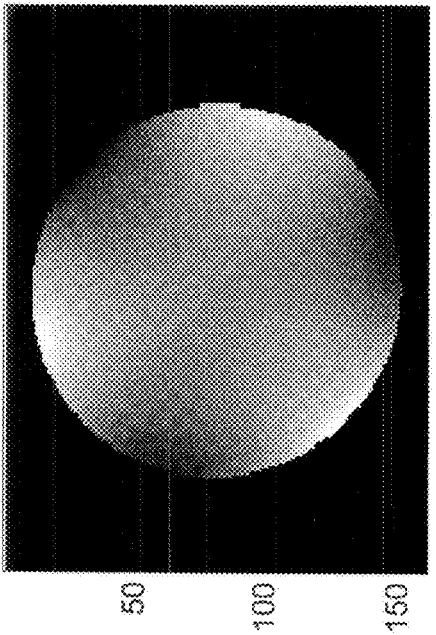
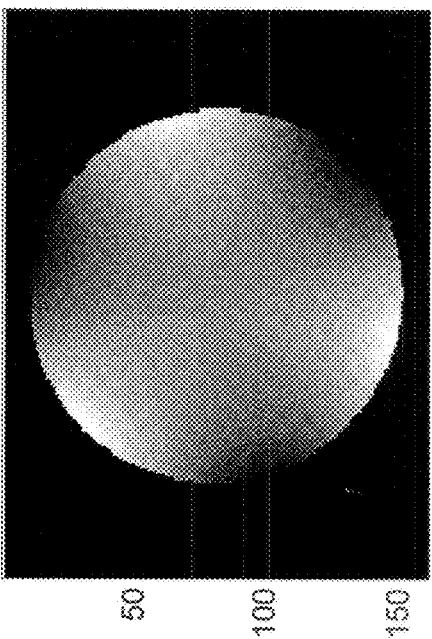
FIG. 12(i)      FIG. 12(j)

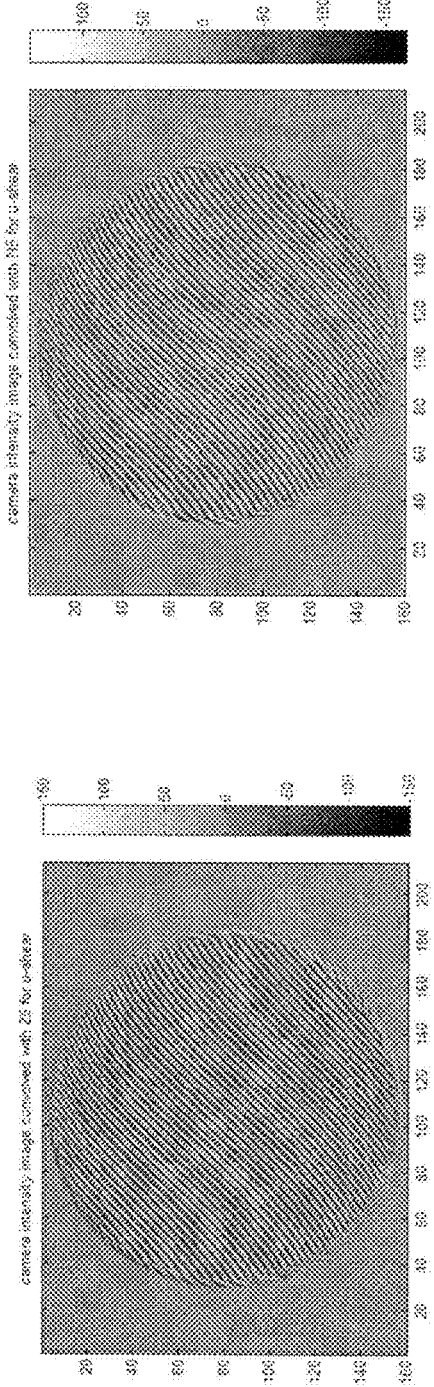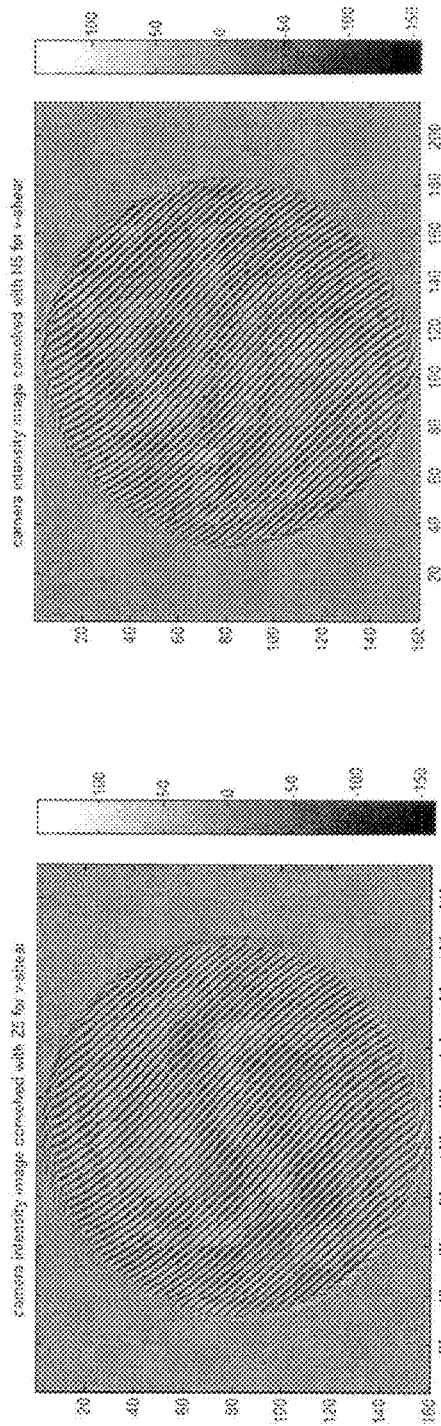
FIG. 13(a) FIG. 13(b) FIG. 13(c) FIG. 13(d)

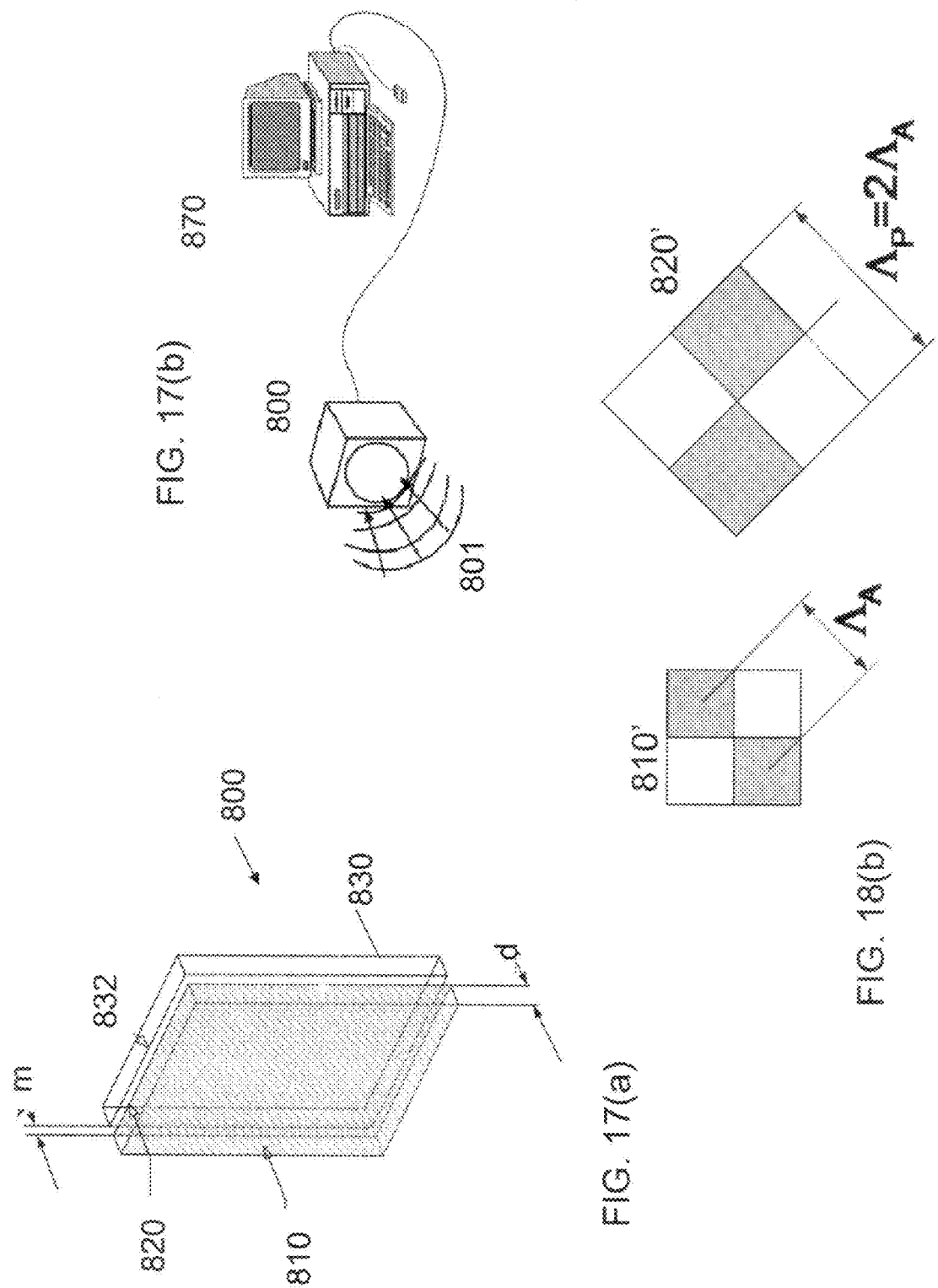

TWO GRATING LATERAL SHEARING WAVEFRONT SENSOR

CROSS-REFERENCE TO RELATED APPLICATIONS

Under 35 U.S.C. 119(e), this application claims benefit of Provisional Application No. 61/201,270, filed on Dec. 9, 2008, the entire contents of which are incorporated herein by reference.

BACKGROUND

This invention relates to wavefront sensors and wavefront measuring techniques, and more particularly to lateral shearing wavefront sensors and lateral shearing wavefront measuring techniques.

Wavefront sensors refer to sensors which measure interference patterns (also referred to as "interferograms") by superimposing two (or more) wavefronts from a test surface on a detector. The wavefronts create an interferogram in which the phase differences of the two wavefronts are encoded.

In optical profilometers, on the other hand, an interferogram is generally formed by the simultaneous reflection of an illuminating wavefront from a test surface and from a different reference surface. While there are a variety of different types of optical profilometer, in at least some embodiments light from a common source is split in two beams, one directed to the reference surface while the other is directed to the test surface. These beams are then recombined and directed by an imaging component of the interferometer to a detector. In certain embodiments (e.g., in the well-known Fizeau arrangement), all optical components from the light source to the detector are common path to both the test wavefront and the reference wavefront, except for the test surface. In this way, most of the signal due to optical imperfections of the components cancel, and high precision measurements of the test surface is possible when a high precision reference surface (or one of a known shape) is used.

In contrast, in a wavefront sensor, only the wavefront for which the "shape" has to be measured is available. The "shape" of a wavefront is defined as the phase distribution of the electromagnetic wave at a defined plane, for instance, at the detector plane. What is initially missing is the coherent reference wavefront to establish a two-beam interference. In shearing interferometry, two (or more) copies of the wavefront to be measured are produced and superimposed. Shearing can be performed in a variety of ways. For example, in rotational shearing, copies of the wavefront are rotated with respect to each other. In radial shearing, copies are variably changed in size before superposition. In reversal shear, copies are reversed with respect to each other. In lateral shear, the copies are shifted laterally before being superimposed.

In general, the wavefront sensor reconstructs the original wavefront (i.e., the wavefront formed by a test object) using the phase differences measured at different locations within the beam at the detector. This task may be mathematically challenging and a solution is not necessarily guaranteed for every arrangement.

It is believed that in lateral shearing interferometry, the phase differences from two independent shear directions should be given in order to reconstruct the wavefront. For example, C. Elster et al. have shown that a transfer function of the measured spatial frequencies of a detected interferogram is zero when spatial frequency f=1/s, where s is the shear distance (see, Appl. Opt. 38, no. 23, (1999), p. 5024-5031). However, it is believed that when a wavefront is characterized using a set of Zernike coefficients, no such restriction for the spatial frequencies is imposed as long as two orthogonal shear directions are used.

SUMMARY

Optical arrangements and techniques are disclosed that enable fast and robust measurements of wavefronts based on simultaneous lateral shear in x- and y-direction through the use of a spatial carrier frequency method to record two shearing interferograms at the same time. This technique can provide reduced measurement uncertainty for a given dynamic range and can provide high spatial resolution when compared to conventional wavefront measuring techniques (e.g., Hartmann-Shack technique).

When the wavefront is evaluated in terms of Zernike functions, the phase reconstruction from the two shearing interferograms can be made computationally very efficient. Zernike functions are a well-known way to represent wavefront aberrations, see, e.g., Principles of Optics, Born and Wolf, Sixth Corrected Edition, Cambridge University Press, 1993, pp. 464-468.

In general, in a first aspect, the invention features methods that include simultaneously diffracting a beam in a first direction and a second direction orthogonal to the first direction to form a once-diffracted beam, where the beam comprises a wavefront shaped by a test object, simultaneously diffracting the once-diffracted beam in orthogonal directions to form a twice-diffracted beam, overlapping at least two orders of the twice-diffracted beam in each direction to form an interference pattern at a detector, the interference pattern being formed by multiple copies of the wavefront laterally sheared in the first direction and multiple copies of the wavefront laterally sheared in the second direction; and determining information about the wavefront based on the interference pattern.

Implementations of the methods can include one or more of the following features. For example, simultaneously diffracting the once-diffracted beam can introduce carrier fringes into the interference pattern. The carrier fringes can be introduced by simultaneously diffracting the once-diffracted beam in orthogonal directions rotated by a non-zero angle $\alpha$ with respect to the first and second directions. The once-diffracted beam can be formed by a first grating and the twice-diffracted beam is formed by a second grating. Overlapping the multiple orders can include imaging a surface equidistant from the first and second gratings onto the detector. The first and second gratings can each be periodic in two dimensions.

In some embodiments, the method includes spatially filtering the twice-diffracted beam to reduce the number of diffracted orders at the detector.

The information can be determined based on a single image frame of the interference pattern acquired by the detector. The method can include acquiring additional image frames of the interference pattern and determining information about the wavefront for each of the additional image frames.

In certain embodiments, the method includes collimating the beam prior to diffracting the beam.

The information about the wavefront can include information about aberrations of the wavefront. The information about the wavefront can include Zernike coefficients for the wavefront.

The test object can be a focusing optical element. For example, in some embodiments, the test object is an optical pickup for an optical storage medium. The test object can be an optical pickup for a Blu-Ray player.

In some embodiments, the information is determined for at least two different wavelengths. For example, the at least two wavelengths can include 405 nm and 650 nm.

Determining information about the wavefront can include measuring an intensity of the interference pattern at multiple locations using the detector, applying a convolution kernel to data derived from the measured intensity values to separate contributions to the interference pattern for shear in the first and second directions, and determining the information based on the separated contributions. The intensity of the interference pattern can include information based on phase differences between sheared copies of the wavefront. The intensity of the interference pattern can be proportional to a differentiated Zernike surface. Determining the information can include subtracting a carrier phase from the data after applying the convolution kernel to provide carrier phase adjusted data. Determining the information can include computing differentiated Zernike surfaces in each of the first and second directions and multiplying the carrier phase adjusted data with the differentiated Zernike surfaces to obtain a set of Zernike coefficients describing the wavefront.

At least part of the interference pattern can include contributions from at least a pair of wavefronts sheared in the first direction and at least a pair of wavefronts sheared in the second direction. Determining the information can include applying a convolution kernel to data derived from measured intensity values of the interference pattern to separate contributions to the interference pattern for shear in the first and second directions.

Determining the information can include fitting differentiated Zernike surfaces to data based on the interference pattern.

In general, in another aspect, the invention features apparatus that include a first grating, periodic in a first direction and a second direction orthogonal to the first direction, positioned along an optical axis to diffract a beam from a test object in the first and second directions, the beam comprising a wavefront shaped by the test object, a second grating, periodic in two orthogonal directions, positioned to receive the once-diffracted beam from the first grating and diffract the once-diffracted beam in the two orthogonal directions, a detector positioned to receive at least two orders of the twice-diffracted beam in the first and second directions forming an interference pattern at the detector, the interference pattern being formed by multiple copies of the wavefront laterally sheared in the first direction and multiple copies of the wavefront laterally sheared in the second direction, and an electronic processor in communication with the detector and configured to determine information about the wavefront based on the interference pattern.

Embodiments of the apparatus can be configured to implement the methods of the first aspect, and/or can include one or more of the following features. For example, the orthogonal directions of the second grating can be rotated by a non-zero angle $\alpha$ with respect to the first and second directions. The electronic processor can be configured to determine information about the wavefront based on carrier fringes in the interference pattern related to the rotation angle $\alpha$.

In some embodiments, second grating is rotated by an angle of $45°\pm\alpha$ with respect to the first and second directions, wherein $\alpha$ is 20° or less. The first grating can have a first period and the second grating has a second period which is different from the first period by a factor of $\sqrt{2}$.

At least one of the gratings can be a phase grating. Alternatively, or additionally, at least one of the gratings can be an amplitude grating.

At least one of the gratings has a checkerboard grating pattern.

The first and second gratings can be formed on opposing sides of a common substrate.

In some embodiments, the apparatus can include an optical assembly between the second grating and the detector, the optical assembly being configured to image a surface between the first and second gratings onto the detector. The optical assembly can be telecentric at the detector. The optical assembly can include a telescope. The optical assembly can include a spatial filter configured to reduce the number of diffracted orders at the detector.

In certain embodiments, the apparatus includes an optical assembly positioned on the optical axis between test object and the first grating. The optical assembly can have a numerical aperture higher than a numerical aperture of the test object.

The detector can be a multi-element detector.

The details of one or more embodiments are set forth in the accompanying drawings and the description below. Other features and advantages of the invention will be apparent from the description and drawings, and from the claims.

DESCRIPTION OF DRAWINGS

FIG. 11(a) shows the Gu(1) contribution to G(1) and FIG. 11(b) shows the Gv(1) contribution to G(1). G(1) corresponds to Zernike number 2, tilt x.

FIG. 11(c) shows the Gu(2) contribution to G(2) and FIG. 11(d) shows the Gv(2) contribution to G(2). G(2) corresponds to Zernike number 3, tilt y FIG. 11(k) shows the Gu(6) contribution to G(6) and FIG. 11(l) shows the Gy(6) contribution to G(6). G(6) corresponds to Zernike number 7, coma X FIG. 11(m) shows the Gu(7) contribution to G(7) and FIG. 11(n) shows the Gy(7) contribution to G(7). G(7) corresponds to Zernike number 8, coma Y

FIG. 11(u) shows the Gu(11) contribution to G(11) and FIG. 11(v) shows the Gv(11) contribution to G(11). G(11) corresponds to Zernike number 12, secondary astigmatism X FIG. 11(w) shows the Gu(12) contribution to G(12) and FIG. 11(x) shows the Gv(12) contribution to G(12). G(12) corresponds to Zernike number 13, secondary astigmatism Y FIG. 12(a) shows the Gu(13) contribution to G(13) and FIG. 12(b) shows the Gv(13) contribution to G(13). G(13) corresponds to Zernike number 14, secondary coma X FIG. 12(c) shows the Gu(14) contribution to G(14) and FIG. 12(d) shows the Gv(14) contribution to G(14). G(14) corresponds to Zernike number 15, secondary coma Y

FIG. 12(g) shows the Gu(16) contribution to G(16) and FIG. 12(h) shows the Gv(16) contribution to G(16). G(16) corresponds to Zernike number 17, tetrafoil X FIG. 12(i) shows the Gu(17) contribution to G(17) and FIG. 12(j) shows the Gv(17) contribution to G(17). G(17) corresponds to Zernike number 18, tetrafoil Y

FIGS. 13(a)-13(d) show intensity images for u-shear convolved with Z5x, u-shear convolved with N5x, v-shear convolved with left/right flipped Z5x(Z5y), and v-shear convolved with left/right flipped N5x(N5y), respectively.

FIGS. 17(a) and 17(b) show a further embodiment of a wavefront analyzer, and an integration measurement system, respectively.

FIG. 18(b) shows the relative size and orientation of two gratings for an embodiment of a wavefront analyzer.

Like reference symbols in the various drawings indicate like elements.

DETAILED DESCRIPTION

Figure 1A:
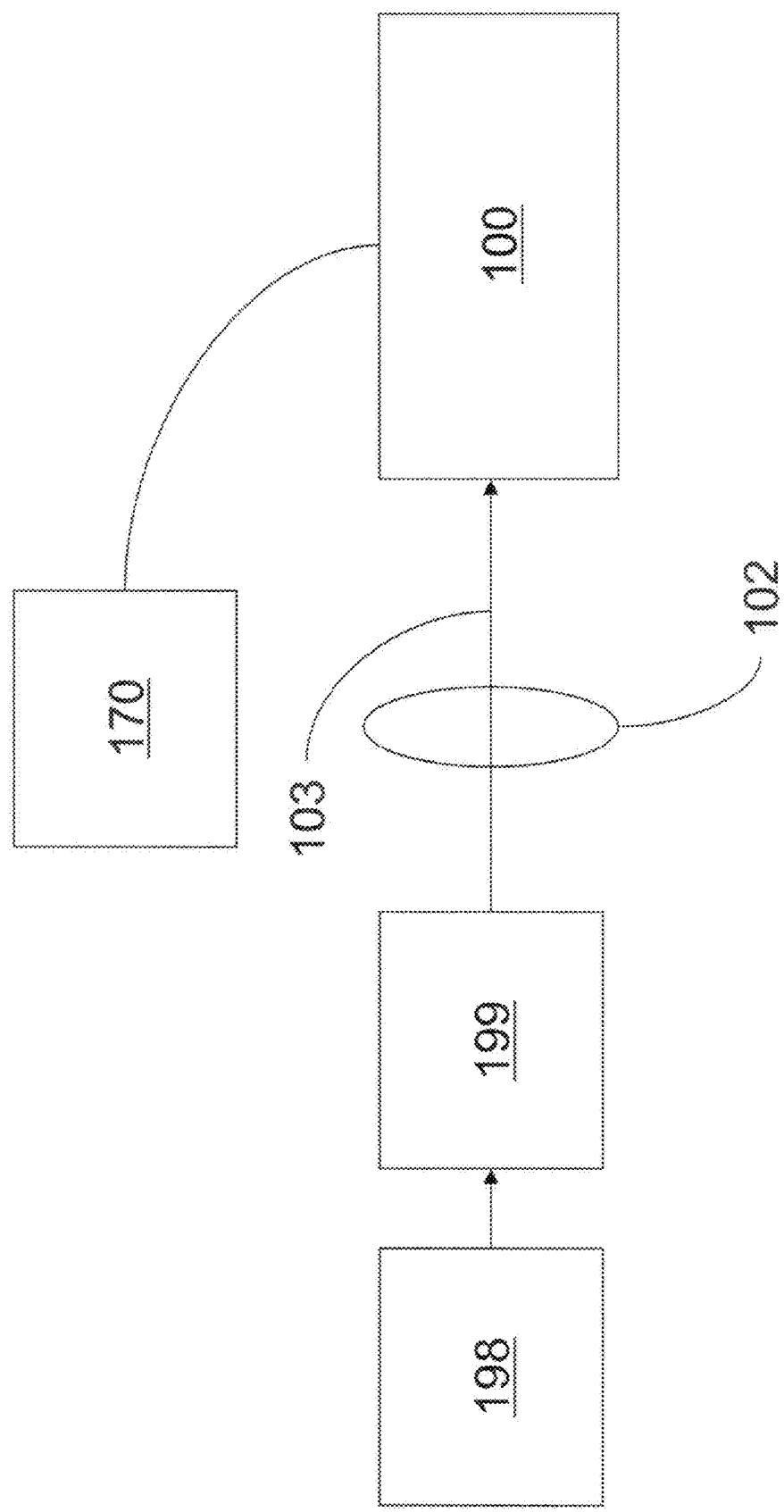
FIG. 1(a) is a schematic diagram of an embodiment of a system used to analyze wavefronts from a test object.

Referring to FIG. 1(a), a system for analyzing wavefronts from a test object 102 (e.g., a lens) includes a wavefront analyzer 100, a light source 198 (e.g., a laser), and illumination optics 199. During operation, illumination optics 199 illuminate test object 102 with light from light source 198. The path of the light is shown as beam 103. Light transmitted by test object 102 impinges on wavefront analyzer 100 which generate an interferogram on a detector by shearing beam 103. An electronic processor 170 in communication with wavefront analyzer 100 receives signals from wavefront analyzer 100 and determines information about a wavefront produced by test object 102 based on the signals.

Figure 1B:
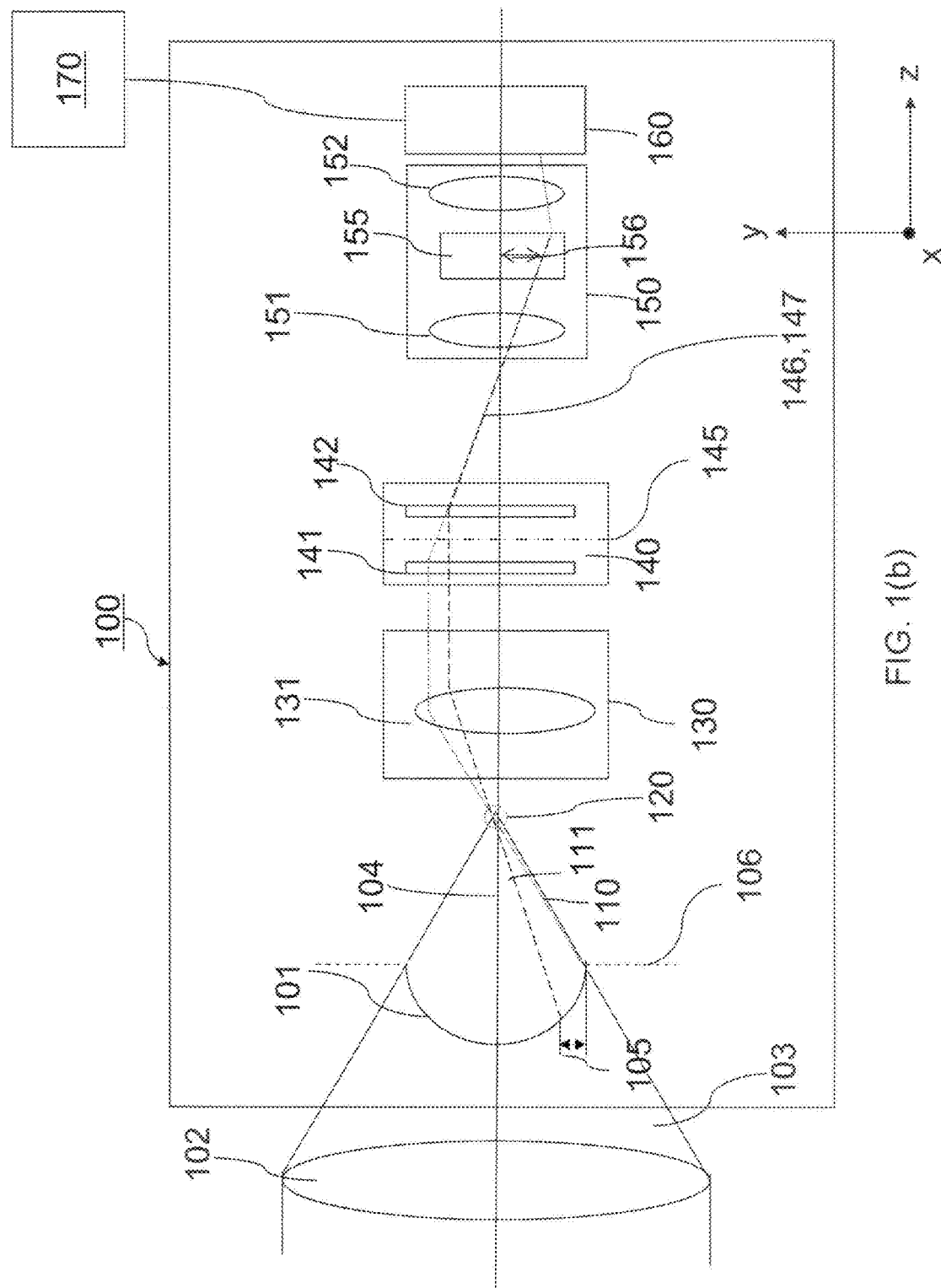
FIG. 1(b) is a schematic diagram that shows an embodiment of a wavefront analyzer used to characterize a wavefront from a test object.

FIG. 1(b) shows an embodiment of wavefront analyzer 100 used to characterize a wavefront 101 from test object 102. A Cartesian coordinate system provided for reference. Wavefront analyzer 100 includes an optical assembly 130, an analyzer unit 140, a telescope 150, and a detector 160 all arranged along an optical axis 104 which is parallel to the z-axis. Detector 160 is connected to electronic processor 170. As will be explained in detail below, wavefront analyzer 100 forms an interference pattern at detector 160 through the overlap of copies of wavefront 101 which are laterally sheared in two orthogonal directions. Electronic processor 170 determines information about wavefront 101 (and hence, information about test object 102) based on the interference pattern detected by detector 160.

As shown in FIG. 1(b), wavefront 101 converges from test object 102 as beam 103 is focused by test object 102 to a point 120.

Optical assembly 130 includes optics 131 (e.g., one or more lenses) which collimates the focused beam prior to the beam impinging on analyzer unit 140. Optical assembly 130 can have a higher numerical aperture (NA) than test object 102 (e.g., to avoid vignetting of beam 103). Optical assembly 130 also images exit pupil 106 (taken as a sphere through the boundary of the exit pupil aperture at 106) into the image space behind optical assembly 130.) FIG. 1 also shows two rays 110 and 111, which represent the path of light through analyzer 100 corresponding to two different locations on wavefront 101 separated by a distance s (labeled 105) in the y-direction at exit pupil 106.

Analyzer unit 140 includes a first diffraction grating 141 and a second diffraction grating 142 separated by a distance d along the z-axis. Both diffraction gratings are gratings with periodicities in two dimensions, diffracting incident light into multiple diffracted orders in two different directions (e.g., in the x- and y-directions). The twice-diffracted beam propagates through telescope 150, which includes lenses 151 and 152. Telescope 150 is positioned so that it images a focal plane 145 positioned midway between grating 141 and grating 142 in analyzer unit 140 to detector 160. Accordingly, telescope 150 images copies of wavefront 101 at plane 145 onto detector 160. Thus, plane 145 is the plane in which the wavefront to be measured is located. As a result, analyzer 100 creates shearing interferograms in both x- and y-directions on detector 160 simultaneously from which electronic processor 170 can determine information about the wavefront.

Telescope 150 also includes a spatial filter 155 positioned between lenses 151 and 152, specifically at the focal plane of lens 151. Spatial filter 155 selects desired diffraction order(s) from analyzer unit 140 to relay to detector 160. In some embodiments, spatial filter 155 includes one or more apertures spaced a distance 156 from optical axis 104, allowing only light this distance from optical axis 104 to be admitted through to detector 160—other light is blocked. Distance 156 of spatial filter 155 is selected so that the light at the aperture(s) corresponds to the diffracted order(s) desired for formation of the interference pattern at detector 160. Detector 160 is a multi-element detector (e.g., a CCD or CMOS device) which captures the interferogram by measuring an intensity of light at each detector element (i.e., pixel).

Figure 2:
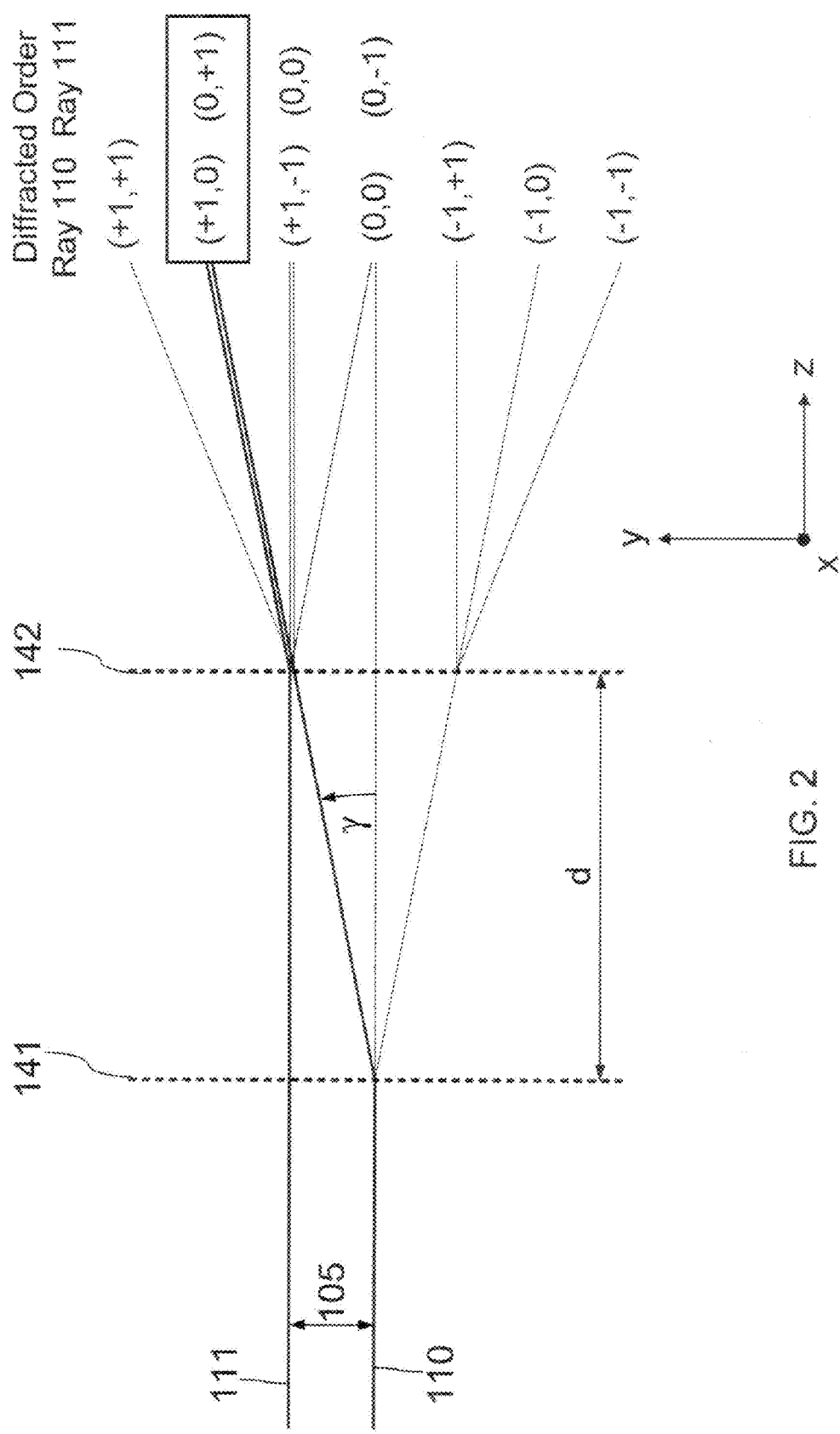
FIG. 2 shows how multiple copies of a wavefront from a test object are generated and overlapped by an analyzer unit which includes two gratings.

Referring to FIG. 2, lateral shearing of the wavefront by gratings 141 and 142 can be understood by considering the interaction of exemplary rays 110 and 111 with the gratings. Here, the +1, 0, and −1 diffracted orders are shown for ray 110 at grating 141, while non-zero diffracted orders for ray 111 and higher diffracted orders for ray 110 are not shown. Zero-order diffracted rays are parallel to optical axis 104. In addition, while diffraction is shown only in the y-direction, the rays will be diffracted in the x-direction too.

At grating 142, the +1, 0, and −1 diffracted orders of once-diffracted ray 110 are each diffracted again to provide twice-diffracted light. FIG. 2 shows the +1, 0, and −1 diffracted orders of +1 and −1 once-diffracted orders of ray 110. Non-zero diffracted orders for the 0-order once-diffracted ray 110 is not shown. Also shown is the +1, 0, and −1 order diffracted light of ray 111 after grating 142.

As depicted in FIG. 2, of the twice-diffracted light, only light from two cases shown ends up being directed along overlapping paths upon diffraction from grating 142. These cases are the part of ray 111 that diffracts into the 0 order at grating 141, and subsequently diffracts into the +1 order at grating 142, denoted as (0,+1), which overlaps with the part of ray 110 that diffracts into the +1 order at grating 141 and subsequently diffracts into the 0 order at grating 142, denoted as (+1,0). The first number in the parenthesis represents the diffraction order of the beam at grating 141 and the second number represents the diffraction order of the beam at grating 142. The combination of (+1, 0) and (0, +1) has the advantage that the twice-diffracted rays (having passed through both gratings) automatically have equal intensities, no matter what intensities are diffracted into the zero order and into the first order. As a result, the contrast of the resulting interference pattern from these two rays is, in theory, optimal.

The distance d between the gratings allows rays on wavefront 101 that have a lateral shear s (labeled 105) between them to be selected by aperture 155. Even though the rays are initially separated by a lateral shear s on test wavefront 101, upon diffraction off the two gratings, the rays become common path. Since both gratings are periodic in two dimensions, these structures split beam 103 into four rays (two in the x-direction, and two in the y-direction). The optical system can also be viewed in the reverse direction, the four rays reaching detector 160 can be traced to different lateral locations in the exit pupil of test object 102.

In general, a variety of different gratings 141 and 142 can be used. The two gratings can be the same (e.g., identical gratings) or different. For example, in some embodiments, grating 141 is a phase grating while the grating 142 is an amplitude grating.

Figure 3A:
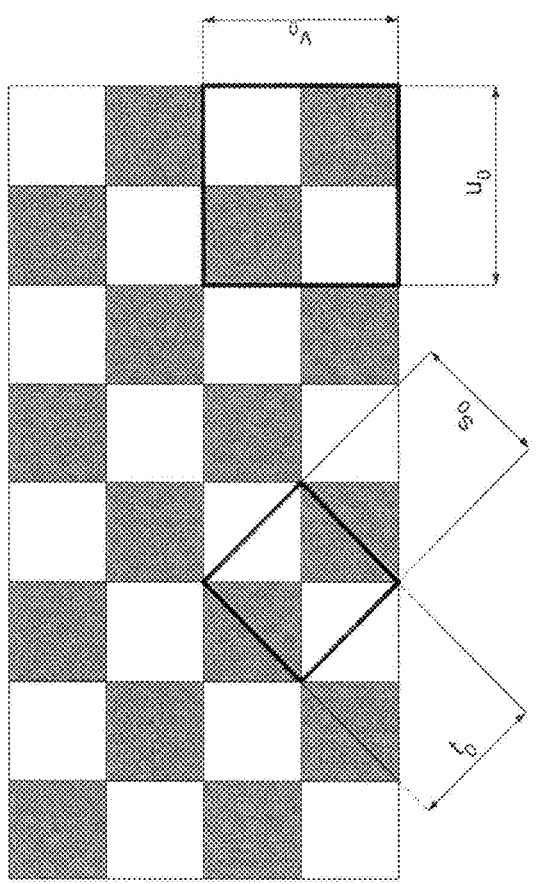
FIG. 3(a) shows an example of a grating with a chess-board pattern which is periodic in two orthogonal directions.

In some embodiments, gratings 141 and/or 142 are gratings having a chess-board pattern, shown, for example, in FIG. 3(a). In this example, the grating has a period $u_0$ in the x-direction and a period $v_0$ in the y-direction. In FIG. 3(a), $u_0$ is depicted as being equal to $v_0$, however, these two periods can differ. This grating is composed of unit cells with the dimensions $t_0$ and $s_0$.

Figure 3B:
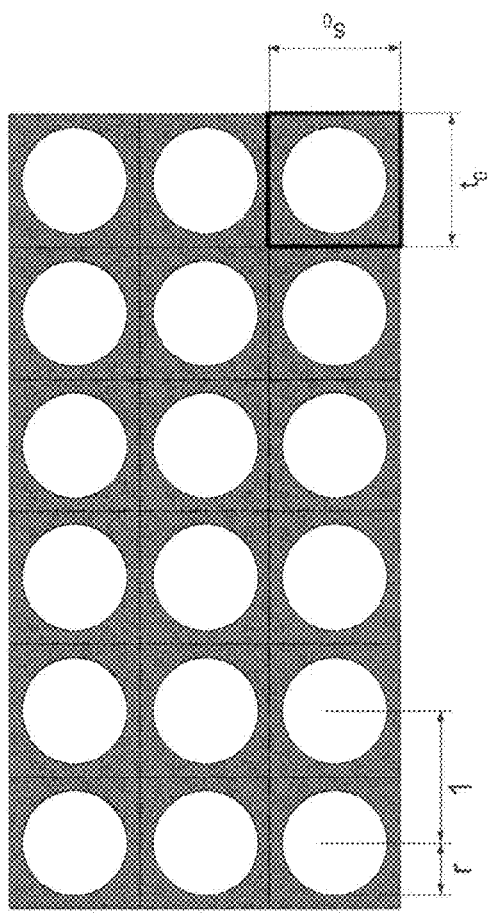
FIG. 3(b) shows a further example of a two-dimensional grating composed of a series of circles arranged on a square lattice.

A further example of a grating is shown in FIG. 3(b). Here, the grating is composed of a series of circles arranged on a square lattice. The circles have a radius r and the center of adjacent circles are separated by a distance 1.

In some embodiments, the unit cell of each grating is constructed such that it creates only 2 diffraction orders (e.g., +1 and 0) with equal intensities. For example, gratings can be used that are phase-gratings which are blazed to increase the diffraction into the first order. The "unit cell" of such a grating can be designed with programs utilizing rigorous wave propagation and subject to optimization routines in order to balance the amplitudes in the zero and first order and to suppress all other orders. Typically, structures with very high aspect ratios are involved and the diffraction efficiency of the grating can be very sensitive to wavelength changes.

Other implementations are also possible. For example, gratings can be used that supply equal intensities for the +1, 0, and −1 diffraction orders or equal intensities only for the +1 and −1 diffraction orders. Examples grating structures that have equal intensities for the +1 and −1 diffraction orders only are shown in FIGS. 3(a) and 3(b). If these gratings are made as phase-gratings with phase-step heights of $\lambda/2$ between the portions of the gratings shown in dark colors from those shown in white, for example, and if the area of those two different parts of the grating is equal in each "unit cell", then the zero order can be suppressed and +1 as well as −1 diffraction order can each have more than 40% of the intensity.

The amount of shear can be adjusted by changing the distance d separating gratings 141 and 142. When d=0, there is zero shear and the larger d is made the more the wavefronts are sheared. In general, the amount of shear also depends on the wavelength of light used to make the measurement and the period of the gratings (e.g., grating period).

In general, the magnitude of the wavefront aberration that can be measured depends on the amount of shear. Typically, the smaller the shear, the larger the aberration that can be measured. In some embodiments, the amount of shear provided by a wavefront analyzer can vary. For example, in certain embodiments, the system can be tuned within a very large range, e.g., from a relative shear of 0.25% to 25%.

Carrier Fringes

Figure 4B:
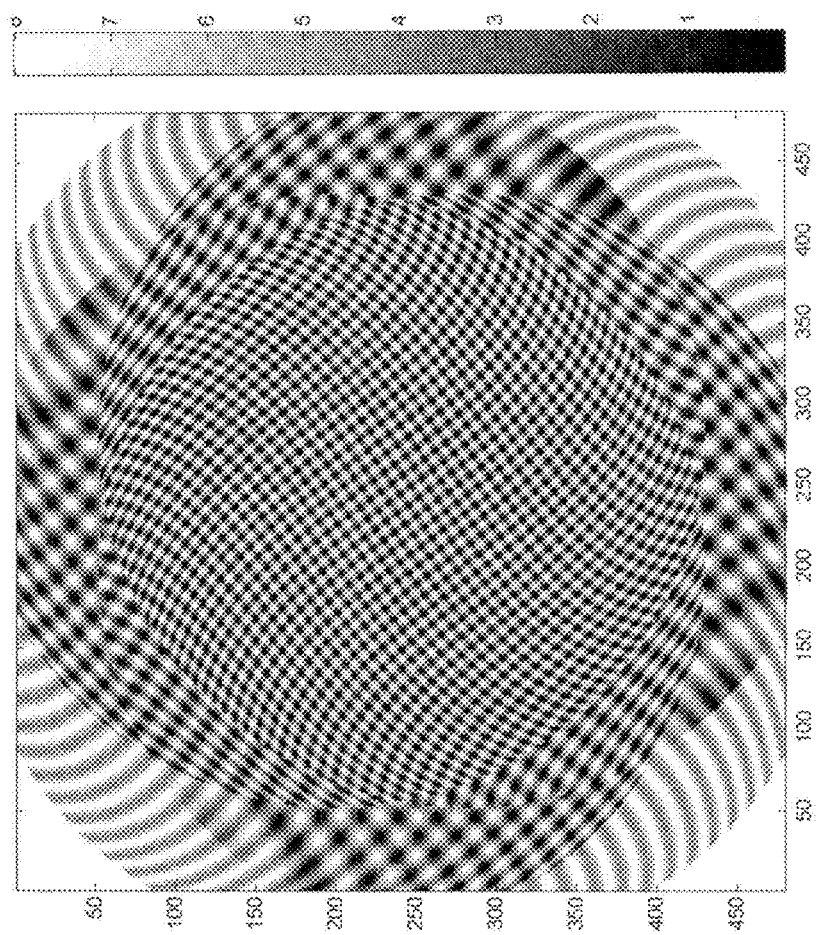
FIG. 4(b) shows a simulated intensity pattern of an interferogram formed by shearing a wavefront containing spherical aberration.
Figure 4A:
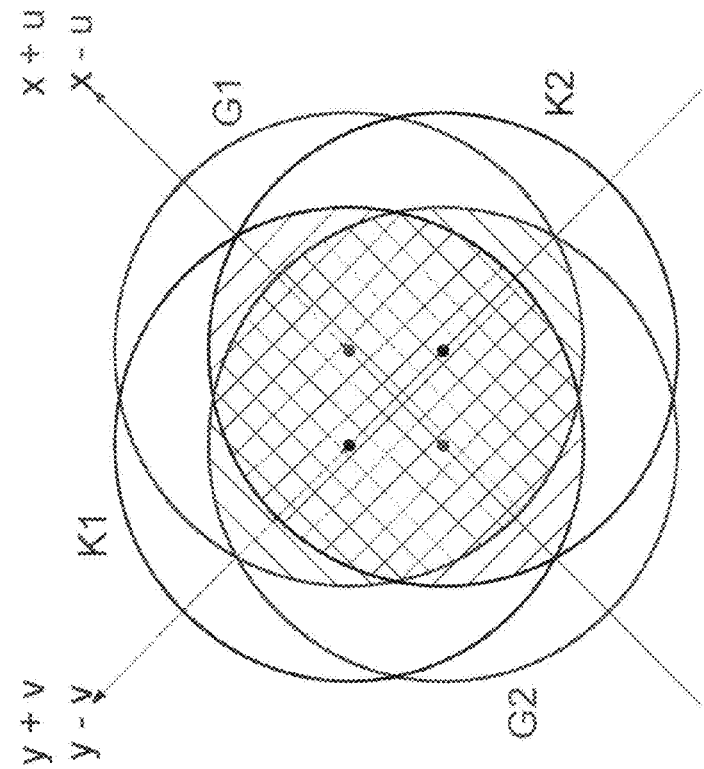
FIG. 4(a) shows simultaneous lateral shearing interferograms in both the x and y directions.

Gratings 141 and 142 are rotated about the z-axis with respect to each other by an angle α. As a result, the fringe patterns of the interferogram on detector 160 includes spatial carrier fringes. Referring to FIGS. 4(a) and 4(b), the x,y-coordinate system, as well as the carrier fringes, are oriented in a diagonal direction relative to the rows and columns of the pixels in the multi-element detector. In FIG. 4(a), four copies of the wavefront are shown: two sheared relative to each other along the x-axis (G1 and G2) and two sheared relative to each other along the y-axis (K1 and K2). The carrier fringe for the x-shear is parallel to the x-axis and the carrier fringe for the y-shear is parallel to the y-direction. The amount of relative shear in the x-direction is u, while the amount of relative shear in the y-direction is v. FIG. 4(b) shows a simulated intensity pattern at detector 160 for a situation where the measured wavefront contains more than two waves of spherical aberration, manifesting in the intensity pattern as a coma-like distortion of the carrier frequency.

In general, the number of carrier fringes is a function of the period of the gratings and the rotation angle α, and is generally, independent of the distance d between gratings 141 and 142, and the wavelength(s) of light used for the measurement. Typically, α is in a range from 1° to 20° (e.g., 5° or more, 10° or more, 18° or less, 15° or less). The density of these carrier fringes at detector 160 is related to how the phase measurements are made.

In some embodiments, a "Direct Measurement Interferometry" (DMI) method is used. Further description of the DMI method can be found, for example, in U.S. Pat. No. 5,361,312, the entire contents of which are incorporated herein by reference and in "Interferogram Analysis for Optical Testing", D. Malacara et al., Marcel Dekker, Inc., New York, Basel, Hong Kong, (1998), Chapter 8.2.6 Spatial Carrier Phase Shifting Method. The DMI method convolves the measured interference pattern with predetermined kernels to get a "numerator" (sine) and a "denominator" (cosine) for the arctangent function used to calculate the phase of the fringe pattern.

In certain implementations, this method uses a 4 pixels per carrier fringe period in both directions (i.e., along the columns and rows of a multi-element detector). In other words, the diagonal fringes increase by a fringe period for every 4 pixels in either the column or row direction. This is equivalent to a carrier phase of +½π per pixel (where one period=2π) in row-direction and in addition +½π per pixel in column direction.

Figure 5B:
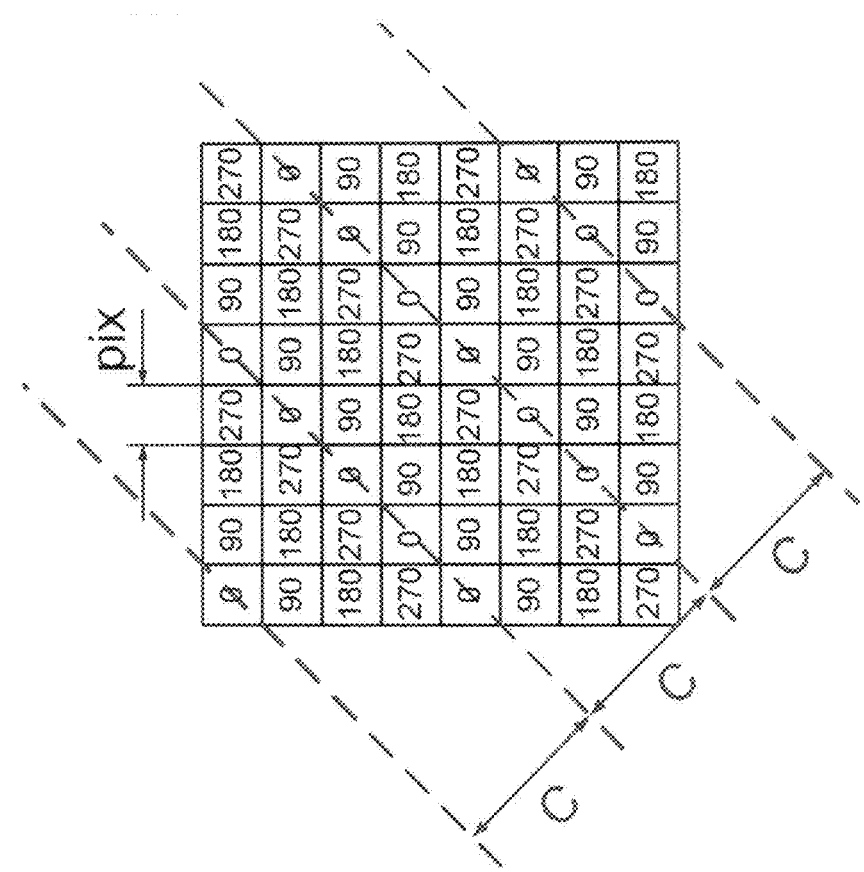
FIG. 5(b) shows a small subset of the pixels of a multi-element detector with pixel spacing pix.
Figure 5A:
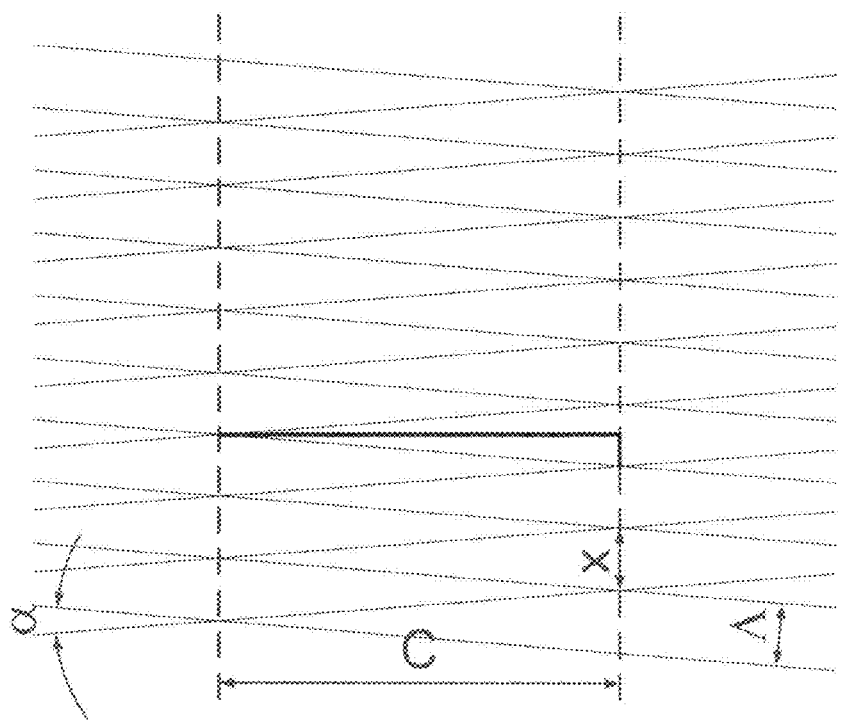
FIG. 5(a) illustrates an analysis of a measured interferogram using Moiré fringes arising from the overlap of two one-dimensional gratings.

Referring to FIGS. 5(a) and 5(b), the 4 pixel implementation can be understood considering Moiré fringes from overlapping one-dimensional gratings. Such a pattern is depicted in FIG. 5(a), where adjacent Moiré fringes are separated by a distance C that depends on the grating period Λ and rotation angle α between the two gratings. From FIG. 5(a), one establishes the following relationships:

$$\frac{x}{2} = C \cdot \tan\frac{\alpha}{2} \tag{1}$$

$$\Lambda = x \cdot \cos\frac{\alpha}{2}. \tag{2}$$

FIG. 5(b) shows a small subset of the pixels of a multi-element detector (e.g., a CCD detector) with pixel spacing pix. The numbers in the pixels show the relative phase modulo 360 degree of the carrier fringes with period C that are introduced by rotating the two gratings with respect to each other by an angle α. The phase increase of 90 degree between adjacent pixels (both rows and columns) is adapted to the convolution kernels tabulated in Table 1 (see below).

From FIG. 6(b), the carrier fringe period C (spacing between the Moiré fringes) and the pixel spacing pix is related by:

$$C = \frac{4}{\sqrt{2}} \cdot pix \tag{3}$$

Eliminating x and C from equations (1), (2) and (3) yields the connection between the rotation angle α between gratings 141 and 142, the pixel spacing pix of the matrix detector and the grating period Λ of the gratings, assuming a 1:1 imaging of the wavefront between the gratings and the detector:

$$\Lambda = 4\sqrt{2} \cdot pix \cdot \sin\frac{\alpha}{2}. \tag{4a}$$

Alternatively, α can be obtained once the grating period Λ and the pixel spacing pix of the detector are given:

$$\alpha = 2 \cdot \arcsin\left(\frac{4\sqrt{2} \cdot pix}{\Lambda}\right) \tag{4b}$$

From equations (1) to (4), none of the quantities are dependent on the wavelength λ of the light used, the arrangement is thus achromatic.

Another manner through which the carrier interference fringes can be established is given below. While the following description is provided for the case of a one-dimensional grating (for simplicity), the analysis can be readily extended to be applied independently to the x and the y coordinates in the two-dimensional case.

Referring again to FIG. 2, the diffraction angle γ for the first order diffracted ray is:

$$\Lambda \cdot \sin\gamma = \lambda \tag{5}$$

The amount of lateral shear s is given by:

$$s = d \cdot \tan\gamma = \frac{d \cdot \lambda}{\sqrt{\Lambda^2 - \lambda^2}} \tag{6}$$

The amount of shear at detector 160 can be determined by considering the imaging properties of the telescope between the analyzer unit and the detector. For example, as shown in FIG. 1(b), the ray bundle incident on gratings 141 and 142 is imaged by telescope 150 containing lenses 151 and 152.

Where these lenses have focal lengths $f_1$ and $f_2$, respectively, the shear at detector 160 can be determined according to:

$$s_{dt} = \frac{f_2}{f_1} \cdot s. \quad (7)$$

The ray bundle with a diameter B before the gratings undergoes an equivalent change in size such that the relative amount of shear, σ (which is expressed as u, v, in the two-dimensional case), is kept unchanged by telescope 150:

$$B_{dt} = \frac{f_2}{f_1} \cdot B, \quad (8)$$

$$\sigma = \frac{s}{B} = \frac{s_{dt}}{B_{dt}}. \quad (9)$$

The lateral distance e of the first diffracted order behind lens 151 with focal lengths $f_1$ of telescope 150 is:

$$e = f_1 \cdot \sin\gamma \quad (10).$$

The mutual distance a of the two focus spots from gratings 141 and 142 rotated by an angle α with respect to each other is (see FIG. 5):

$$a = 2 \cdot e \cdot \sin\frac{\alpha}{2}. \quad (11)$$

These two light sources are collimated by lens 152 to be two inclined plane wavefronts behind lens 152 and fall onto detector 160. On detector 160, the interferogram is formed by the two coherent, interfering plane waves. The spacing C of the interference fringes depends on the wavelength and the angle between the plane waves. This angle β and the spacing C can be computed as:

$$\beta = 2 \cdot \arcsin\frac{a}{2 \cdot f_2}; \quad (12)$$

$$C = \frac{\lambda}{2 \cdot \sin\frac{\beta}{2}}. \quad (13)$$

By substitution of equations (5), (10), (11), (12) into (13), C can be obtained as:

$$C = \frac{f_2}{f_1} \cdot \frac{\Lambda}{2 \cdot \sin\frac{\alpha}{2}}. \quad (14)$$

With eq. (3), Λ and α can both be obtained:

$$\Lambda = \frac{f_1}{f_2} \cdot 4\sqrt{2} \cdot pix \cdot \sin\frac{\alpha}{2} \quad (15)$$

$$\alpha = 2\arcsin\left(\frac{f_2}{f_1} \frac{\Lambda\sqrt{2}}{8 pix}\right). \quad (16)$$

Eq. (15) validates the first approach involving the Moiré fringes. From eq. (16) it is clear that after the grating period Λ is chosen, the carrier fringes can be adjusted for a given detector with pixel spacing pix by simply rotating gratings 141 and 142 with respect to each other by angle α. To additionally adjust the relative shear σ, the distance d between gratings 141 and 142 can be changed.

Given a rectangular detector with N×M pixels (N<M) and a pixel spacing of pix, and the condition that the non-sheared wavefront be imaged onto detector 160 such that its diameter $B_{dt}$ is equal to the smaller dimension of detector 160 (i.e., it just fills the detector):

$$B_{dt} = N \cdot pix \quad (17)$$

With (6), (7) and (9), σ, the relative shear and d, the distance between gratings 141 and 142 can be obtained:

$$\sigma = \frac{f_2}{f_1} \cdot \frac{d \cdot \lambda}{N \cdot pix \cdot \sqrt{\Lambda^2 - \lambda^2}} \rightarrow d = \frac{f_1}{f_2} \cdot \frac{\sigma \cdot N \cdot pix \cdot \sqrt{\Lambda^2 - \lambda^2}}{\lambda}. \quad (18)$$

Figure 6:
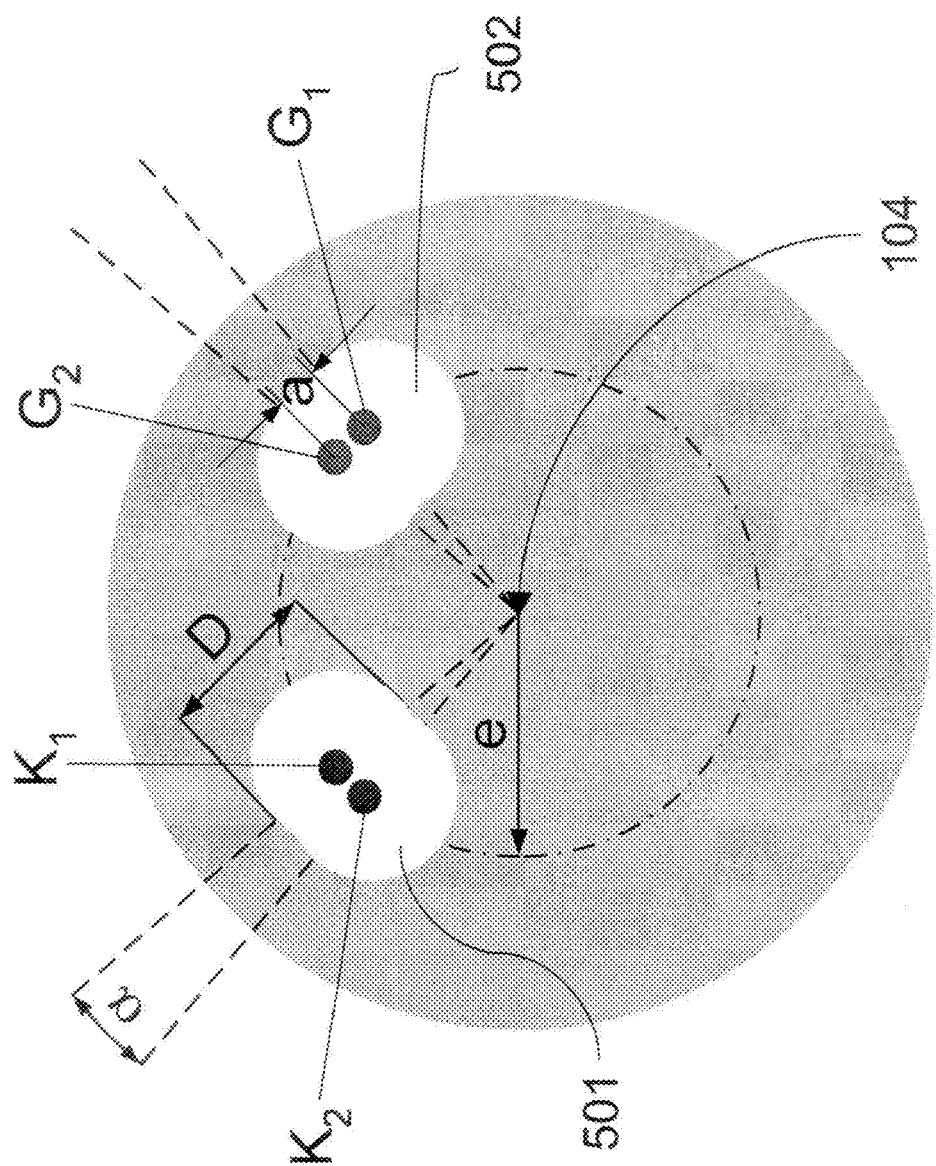
FIG. 6 shows an example of a spatial filter.

As discussed previously, spatial filter 155 can include one or more apertures positioned to allow passage of only certain light (e.g., that is needed to form the interferogram) while blocking light that would otherwise contribute to noise at the detectors. FIG. 6 shows an example of spatial filter 155 with two apertures 501 and 502. Each aperture has a radial dimension D centered a radial distance e from optical axis 104 when spatial filter 155 is positioned within telescope 150, and allow passage of rays labeled K1, K2, G1, and G2. The distance e is given by equation (10), above. Also, K1, K2, G1, and G2 correspond to the sheared wavefronts at detector 160 shown in FIG. 4(a). Apertures 501 and 502 are formed in a piece of material that blocks the light from diffracted orders that are not desired for purposes of forming the interferogram at detector 160.

Data Processing

Phase information of the shearing interferogram is determined by electronic processor 170 based on images of the interferogram captured by detector 160. In some embodiments, the phase information is obtained in real-time from a video feed originating from detector 160.

Figure 7:
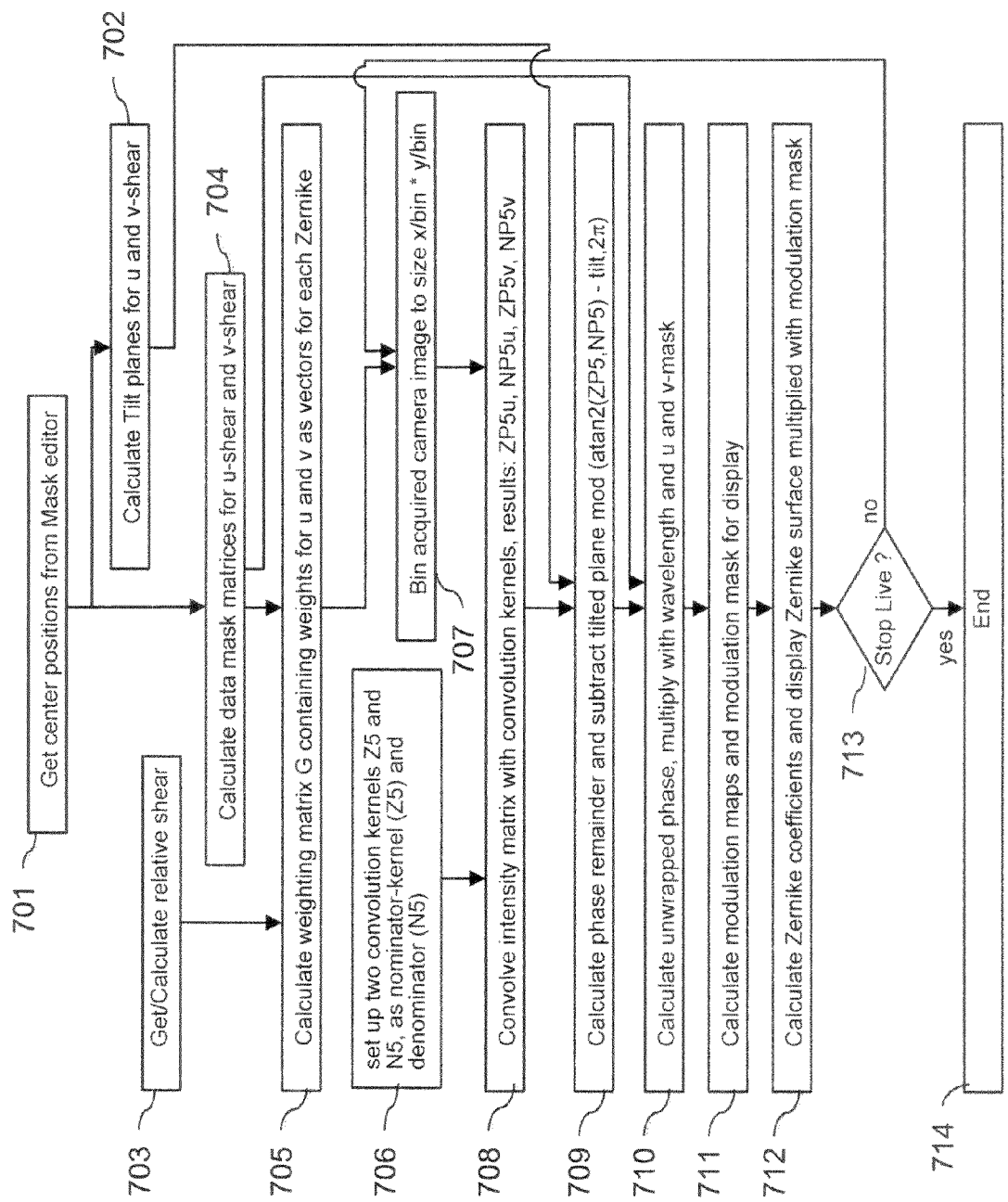
FIG. 7 shows a flow chart of the data processing of the interferograms measured using a wavefront analyzer.

In general, a variety of algorithms can be used to extract wavefront information from the interferogram images detected at detector 160. In some embodiments, the algorithm implemented by processor 170 can be thought of as having two parts: a "static" part where precalculations are first made and stored (e.g., in memory accessible by the electronic processor 170) and a real-time, "pipeline" part, which is updated with the feed from detector 160. A flow chart of an example of such an algorithm is shown in FIG. 7. It is noted that since the wavefront analyzer works with two two-dimensional gratings, therefore calculations are generally done for both dimensions.

Figure 8:
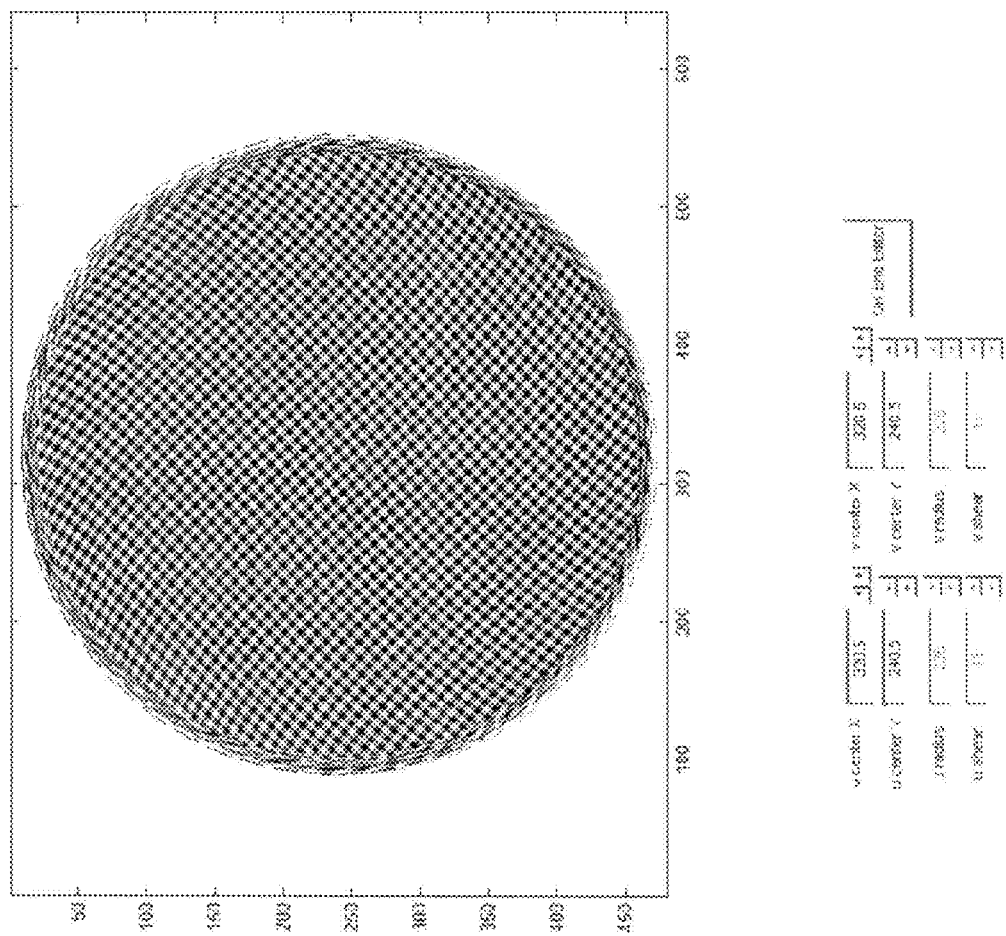
FIG. 8 shows an example of a graphical user interface of a mask editor through which relevant information can be input by an user.
Figure 9B:
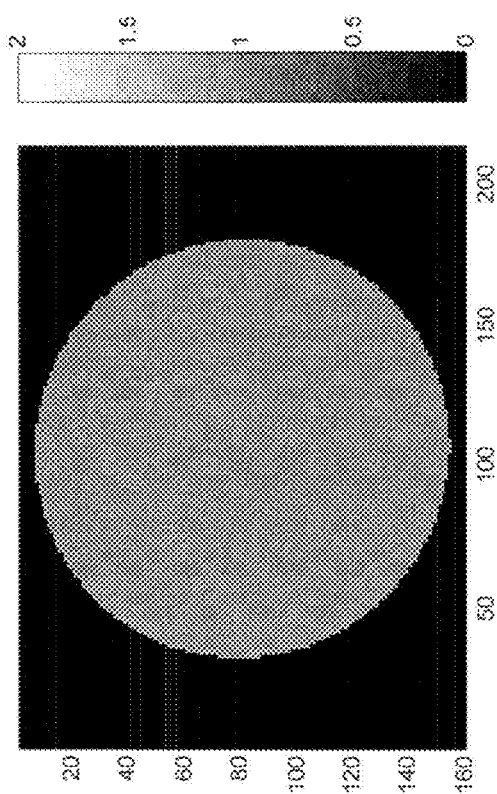
FIG. 9 shows exemplary data masks for the shears in two directions.
Figure 9A:
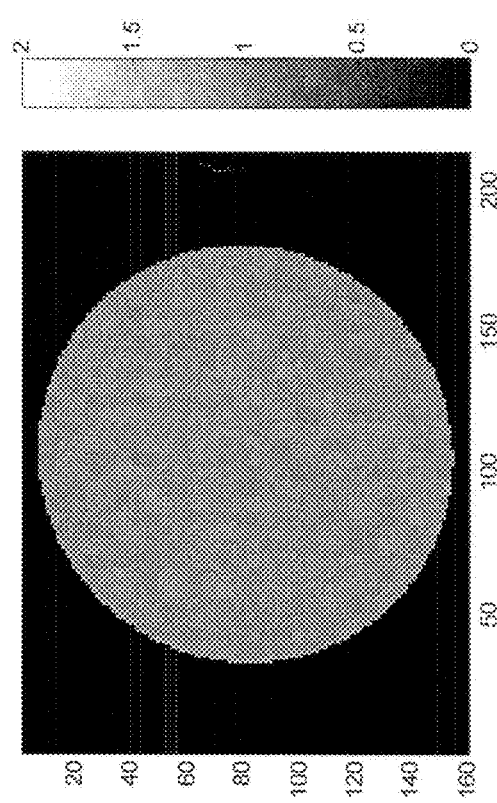
Figure 10B:
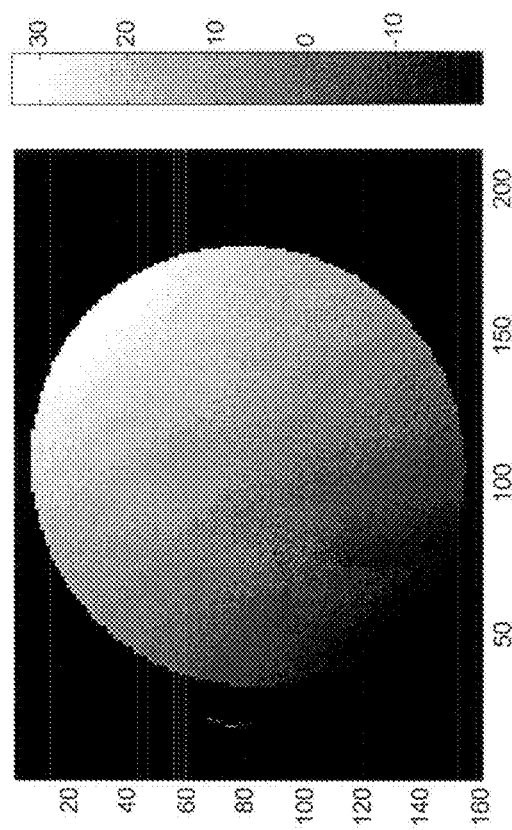
FIG. 10 shows exemplary data tilt planes introduced by carrier fringes in two different directions.
Figure 10A:
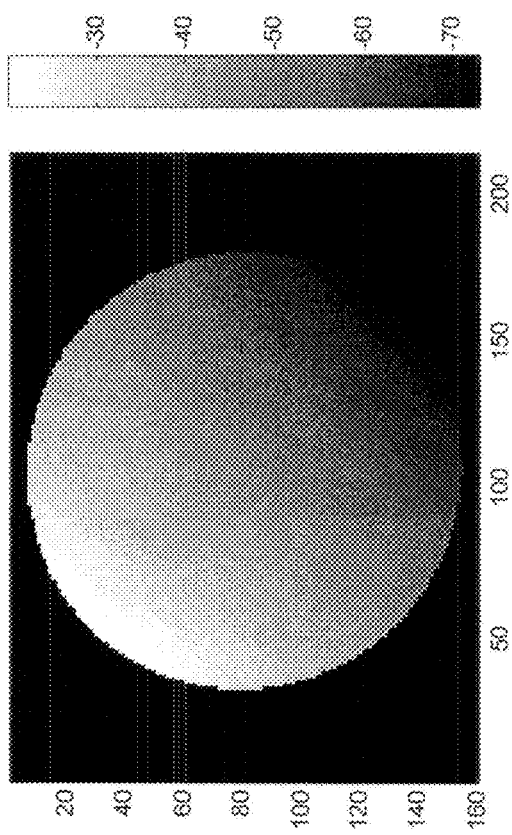
Figure 11F:
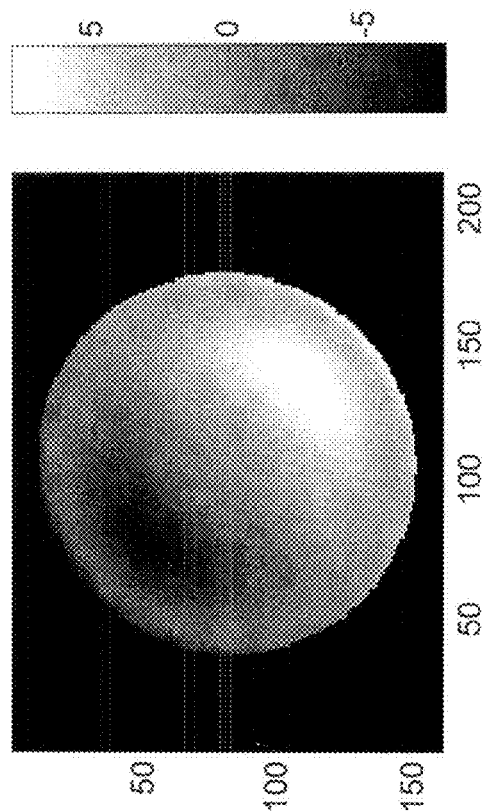
FIG. 11(e) shows the Gu(3) contribution to G(3) and FIG. 11(f) shows the Gv(3) contribution to G(3). G(3) corresponds to Zernike number 4, defocus
Figure 11E:
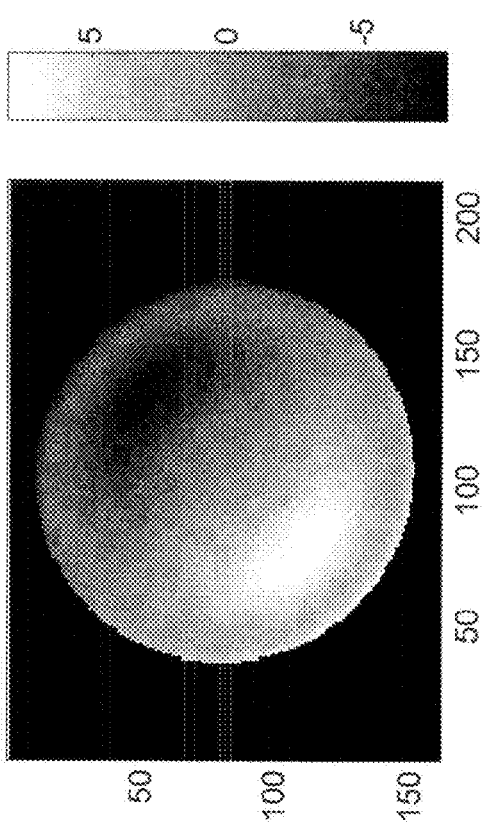
Figure 11G:
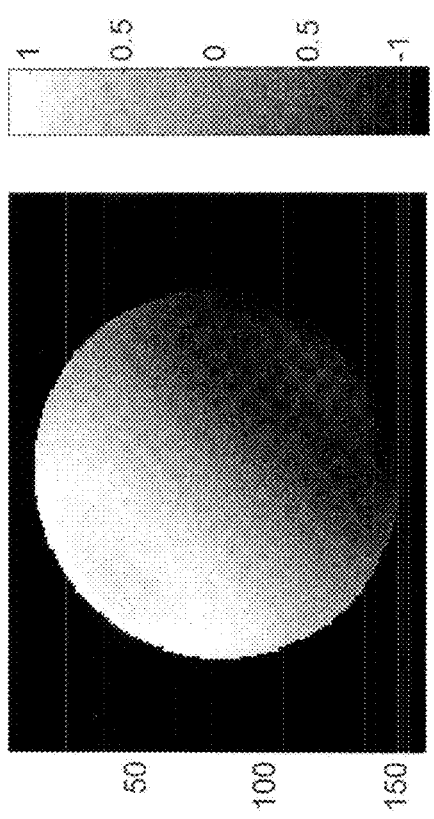
FIG. 11(g) shows the Gu(4) contribution to G(4) and FIG. 11(h) shows the Gv(4) contribution to G(4). G(4) corresponds to Zernike number 5, astigmatism X
Figure 11H:
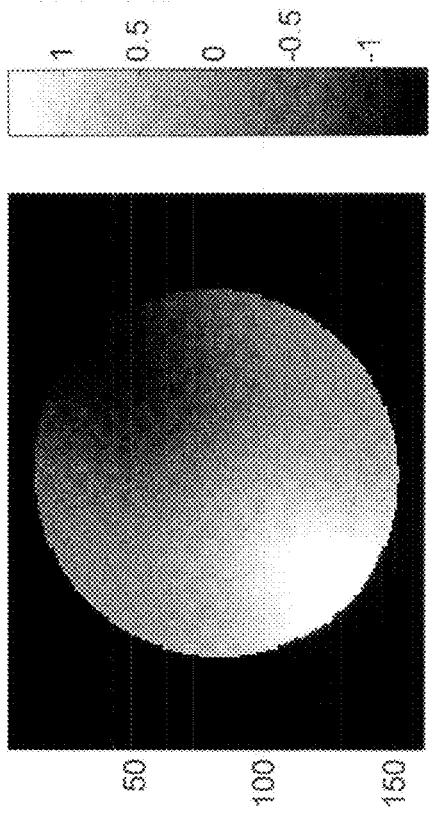
Figure 11I:
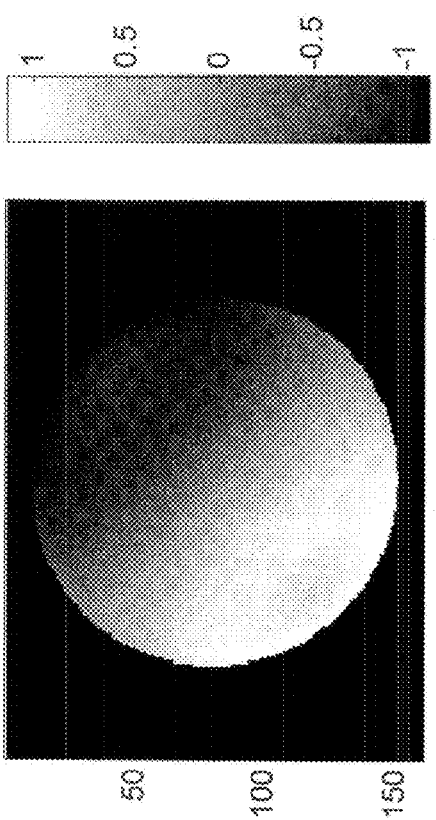
FIG. 11(i) shows the Gu(5) contribution to G(5) and FIG. 11(j) shows the Gv(5) contribution to G(5). G(5) corresponds to Zernike number 6, astigmatism Y
Figure 11J:
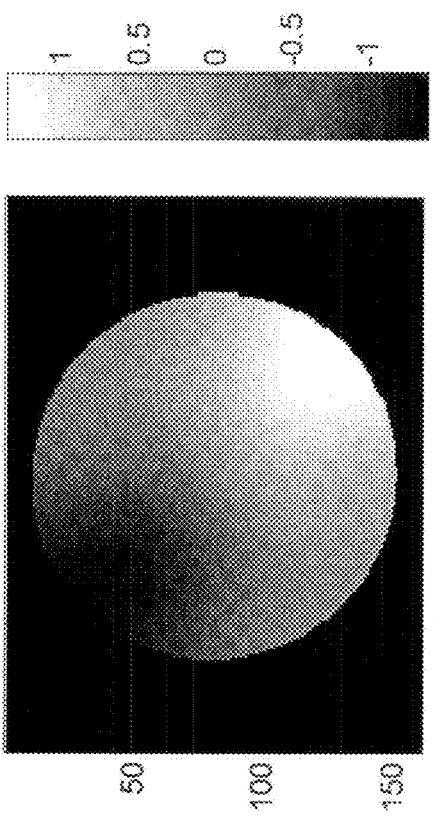
Figure 11P:
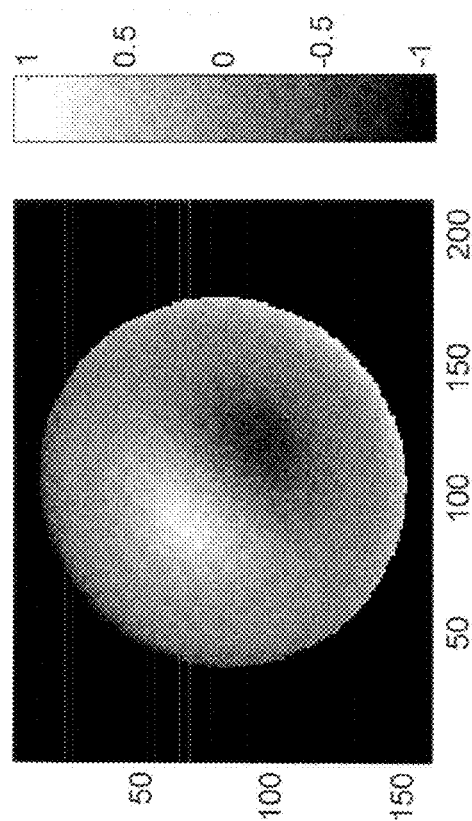
FIG. 11(o) shows the Gu(8) contribution to G(8) and FIG. 11(p) shows the Gv(8) contribution to G(8). G(8) corresponds to Zernike number 9, spherical aberration (3rd order)
Figure 11O:
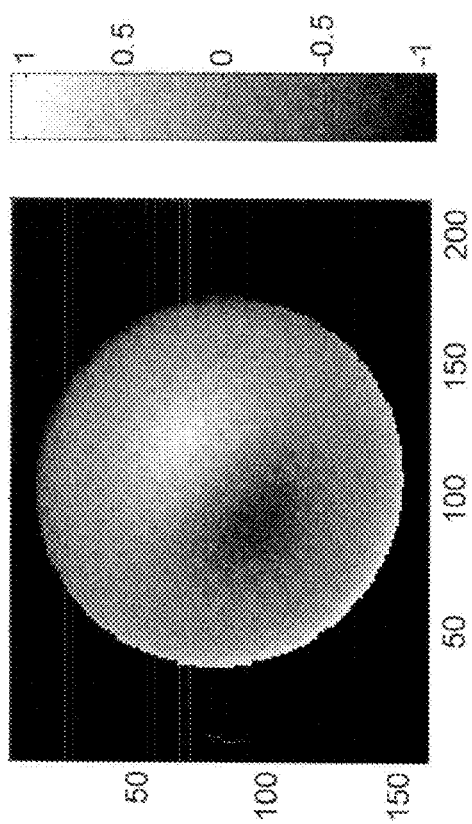
Figure 11Q:
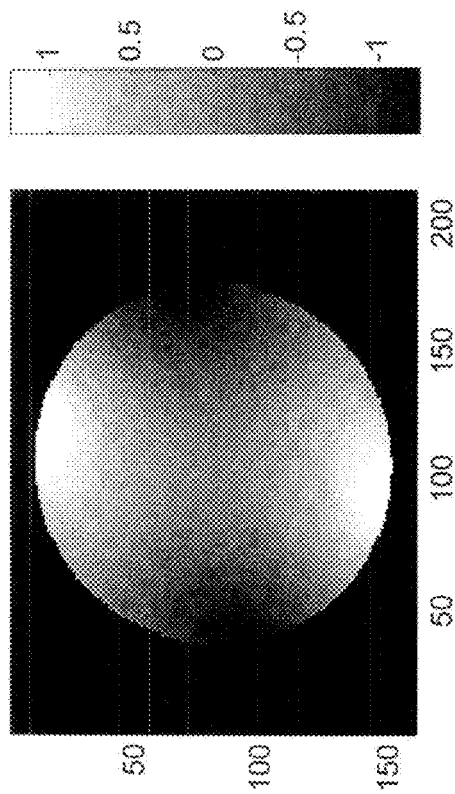
FIG. 11(q) shows the Gu(9) contribution to G(9) and FIG. 11(r) shows the Gv(9) contribution to G(9). G(9) corresponds to Zernike number 10, trefoil X
Figure 11R:
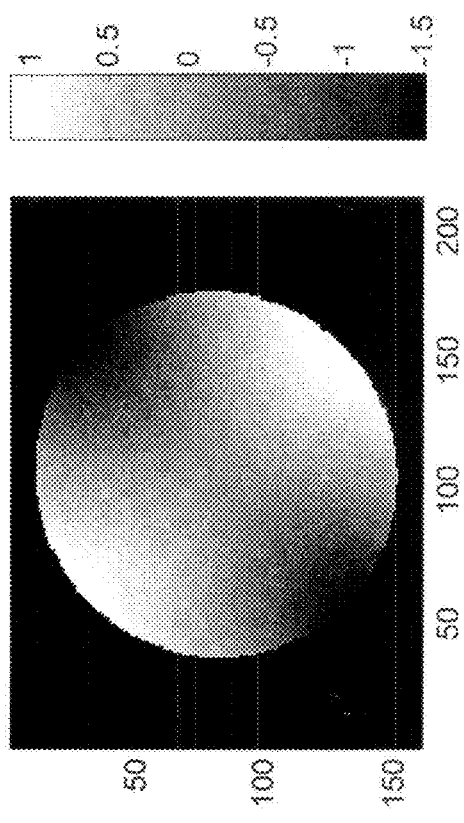
Figure 11S:
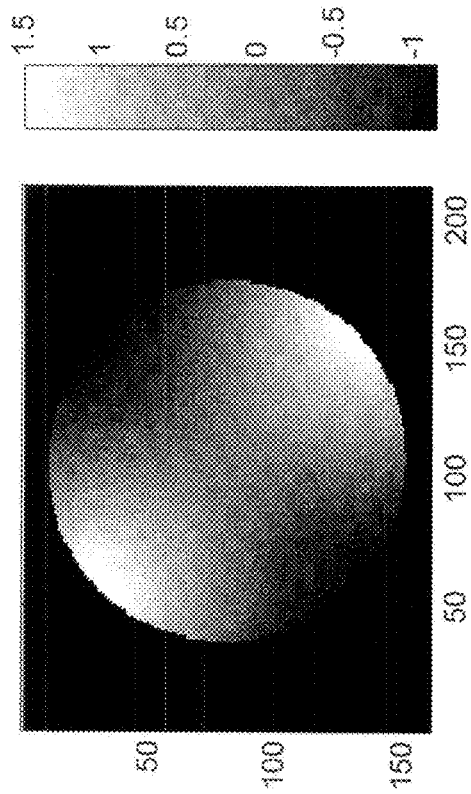
FIG. 11(s) shows the Gu(10) contribution to G(10) and FIG. 11(t) shows the Gv(10) contribution to G(10). G(10) corresponds to Zernike number 11, trefoil Y
Figure 11T:
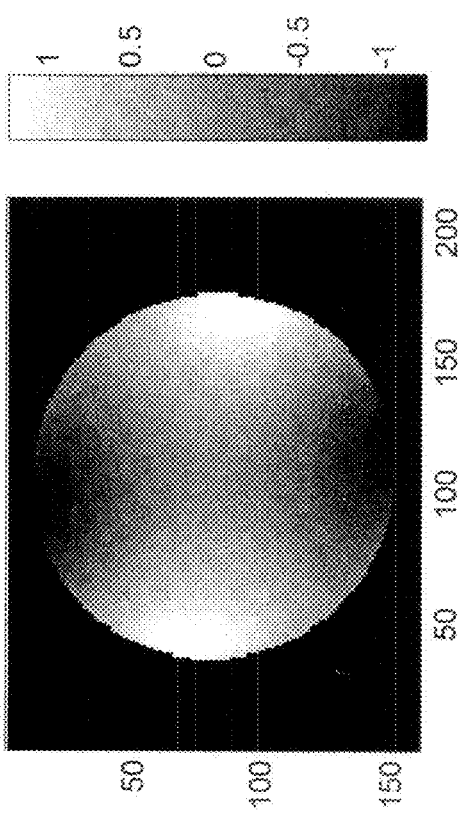
Figure 12F:
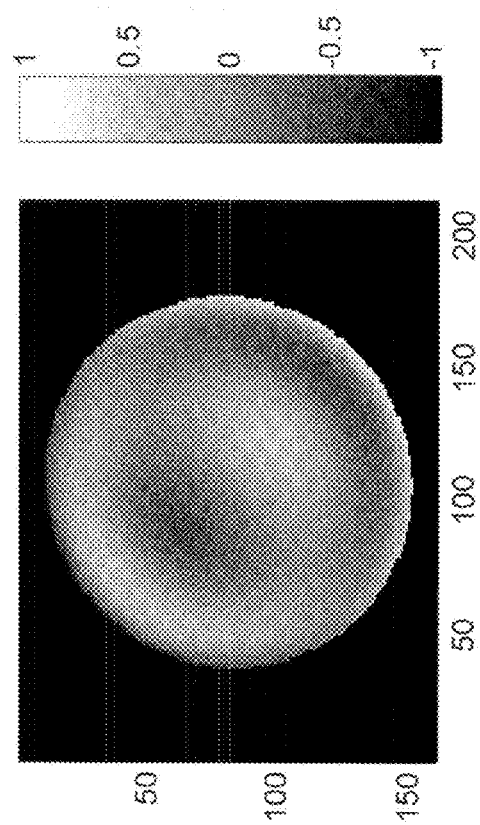
FIG. 12(e) shows the Gu(15) contribution to G(15) and FIG. 12(f) shows the Gv(15) contribution to G(15). G(15) corresponds to Zernike number 16, secondary spherical aberration (5th order)
Figure 12E:
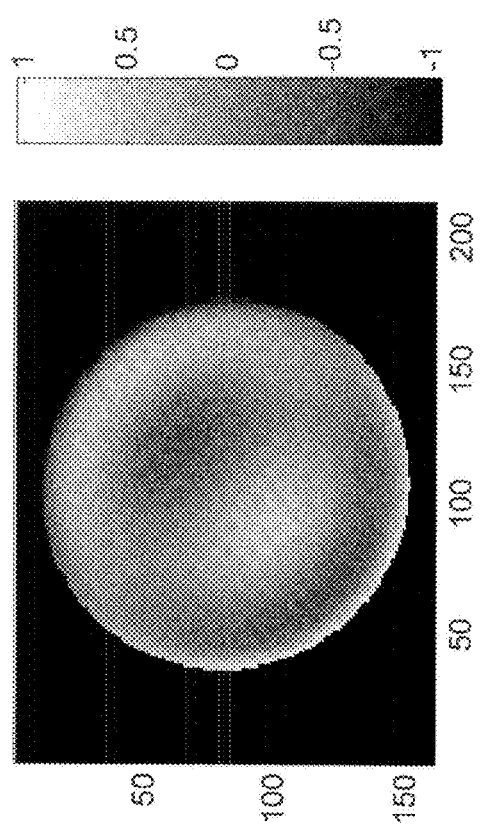
Figure 12L:
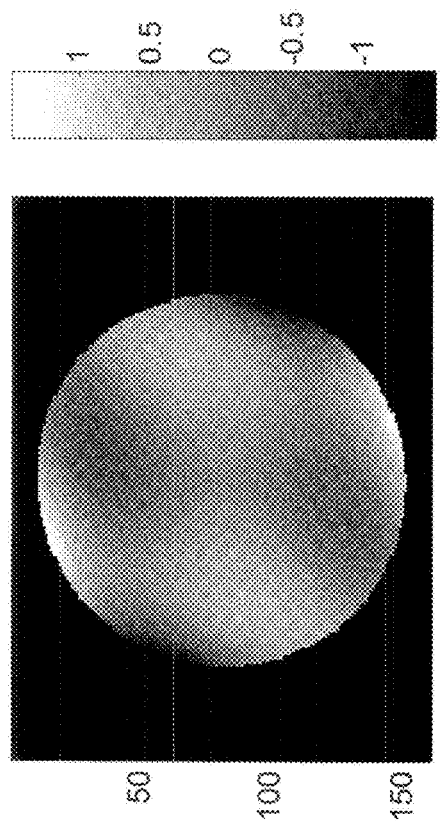
FIG. 12(k) shows the Gu(18) contribution to G(18) and FIG. 12(l) shows the Gv(18) contribution to G(18). G(18) corresponds to Zernike number 19, secondary trefoil X
Figure 12N:
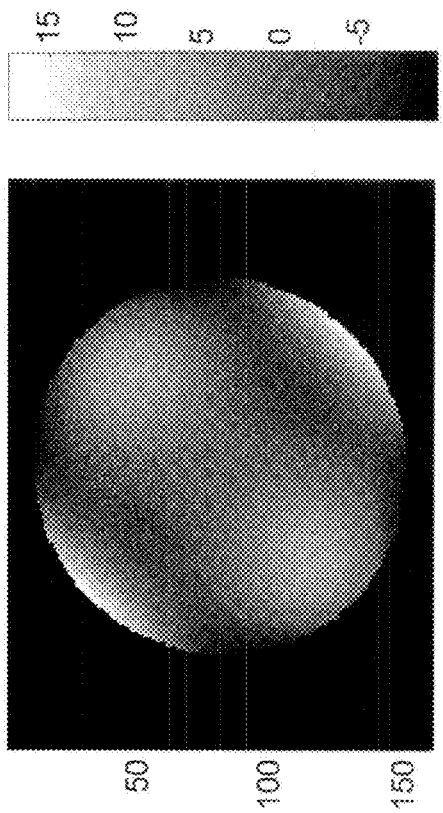
FIG. 12(m) shows the Gu(19) contribution to G(19) and FIG. 12(n) shows the Gv(19) contribution to G(19). G(19) corresponds to Zernike number 20, secondary trefoil Y
Figure 12K:
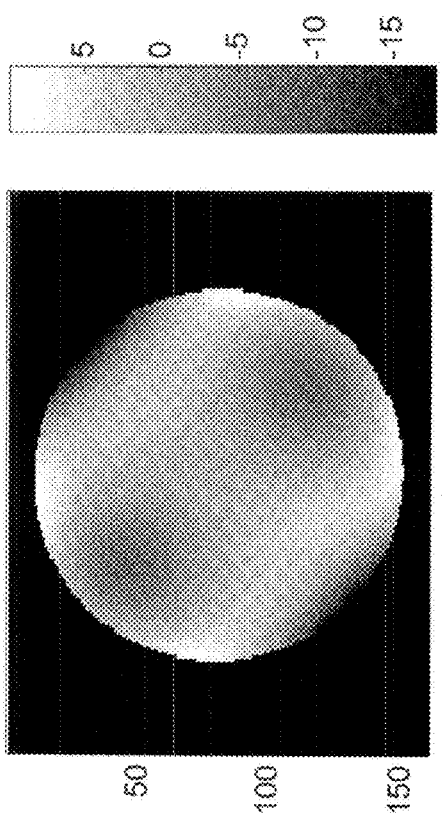
Figure 12M:
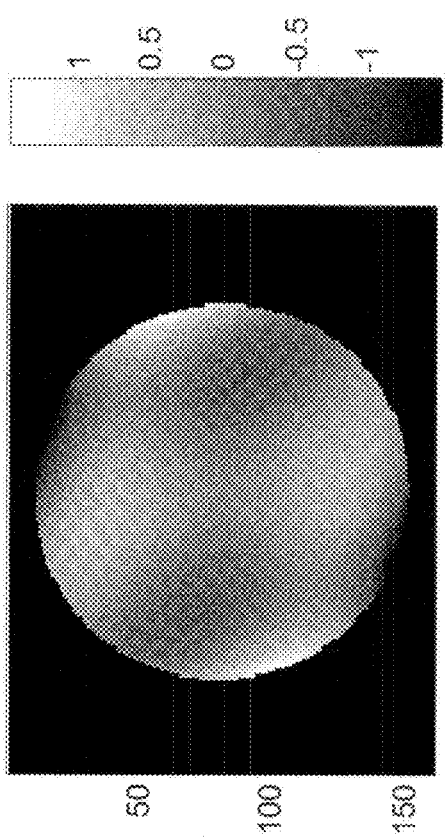
Figure 12P:
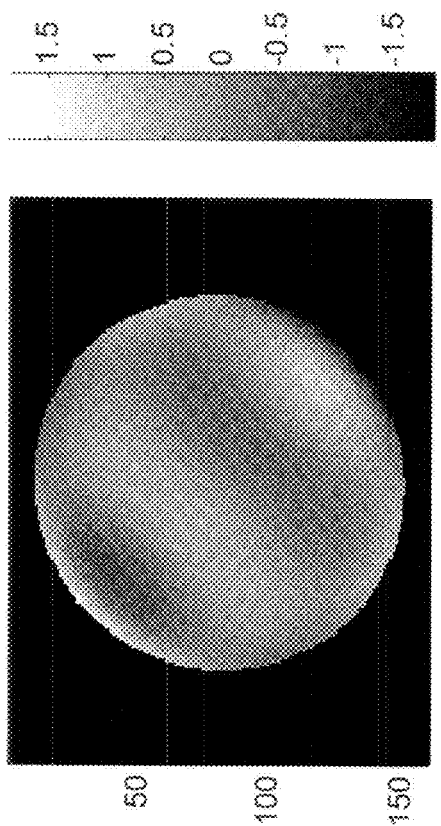
FIG. 12(o) shows the Gu(20) contribution to G(20) and FIG. 12(p) shows the Gv(20) contribution to G(20). G(20) corresponds to Zernike number 21, tertiary astigmatism X
Figure 12R:
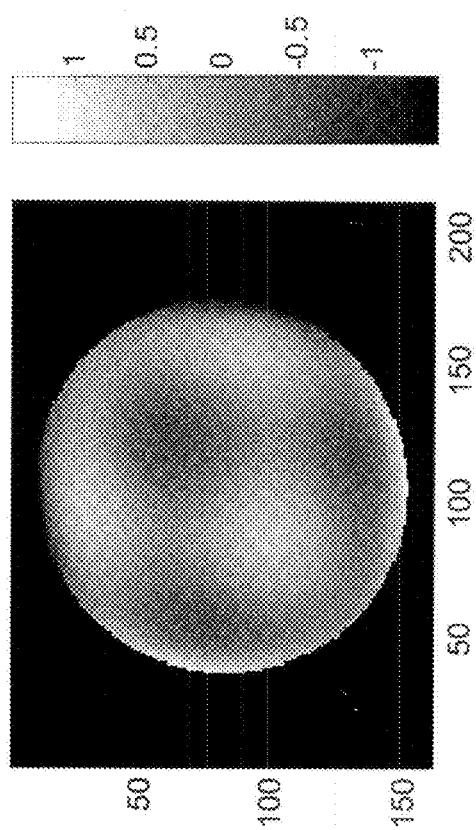
FIG. 12(q) shows the Gu(21) contribution to G(21) and FIG. 12(r) shows the Gv(21) contribution to G(21). G(21) corresponds to Zernike number 22, tertiary astigmatism Y
Figure 12O:
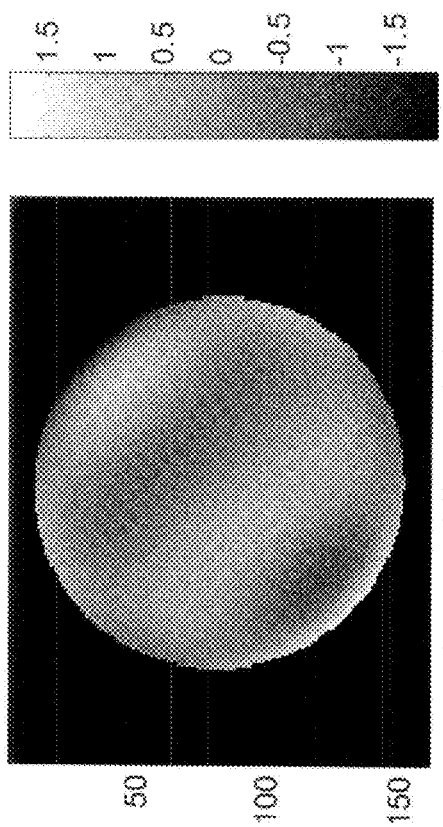
Figure 12Q:
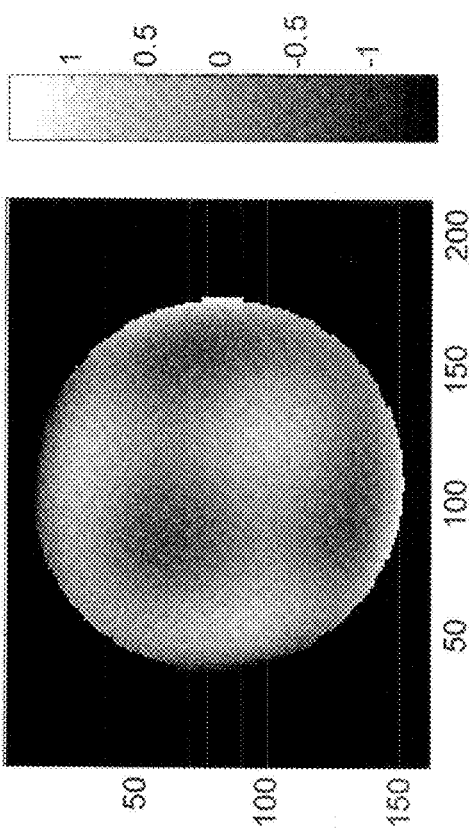
Figure 12S:
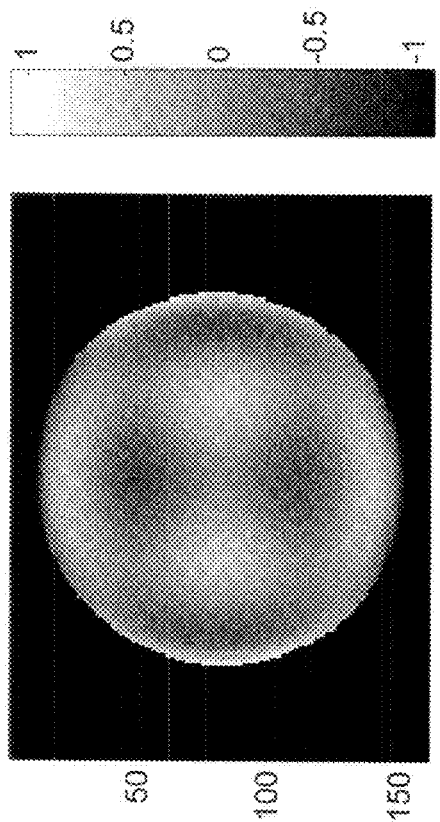
FIG. 12(s) shows the Gu(22) contribution to G(22) and FIG. 12(t) shows the Gv(22) contribution to G(22). G(22) corresponds to Zernike number 23, tertiary coma X
Figure 12T:
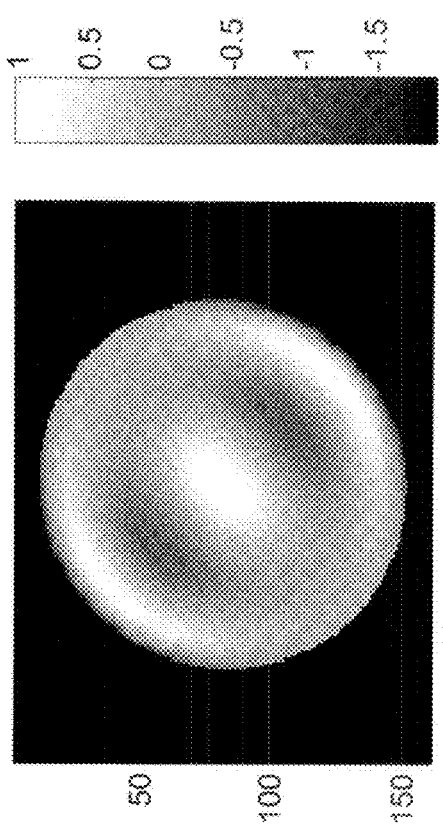
Figure 12U:
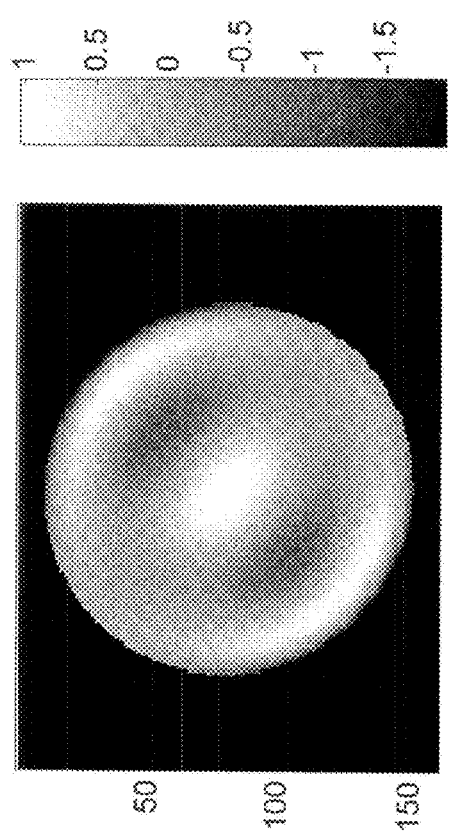
FIG. 12(u) shows the Gu(23) contribution to G(23) and FIG. 12(v) shows the Gv(23) contribution to G(23). G(23) corresponds to Zernike number 24, tertiary coma Y
Figure 12V:
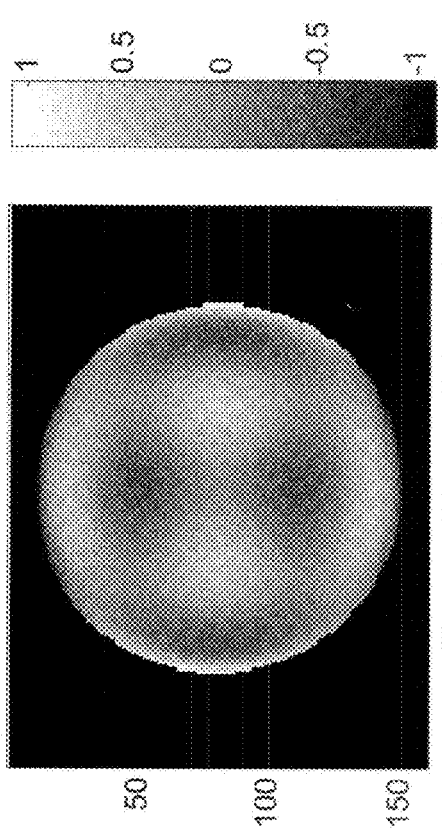
Figure 12X:
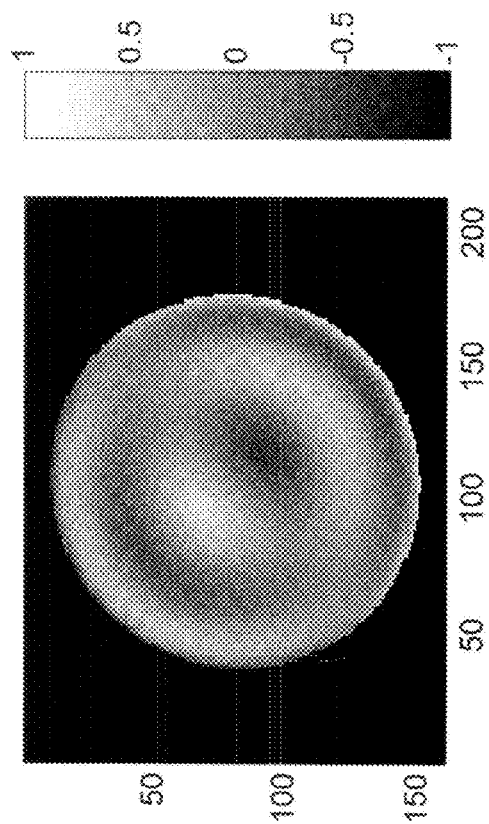
FIG. 12(w) shows the Gu(24) contribution to G(24) and FIG. 12(x) shows the Gv(24) contribution to G(24). G(24) corresponds to Zernike number 25, tertiary spherical aberration (7th order).
Figure 12W:
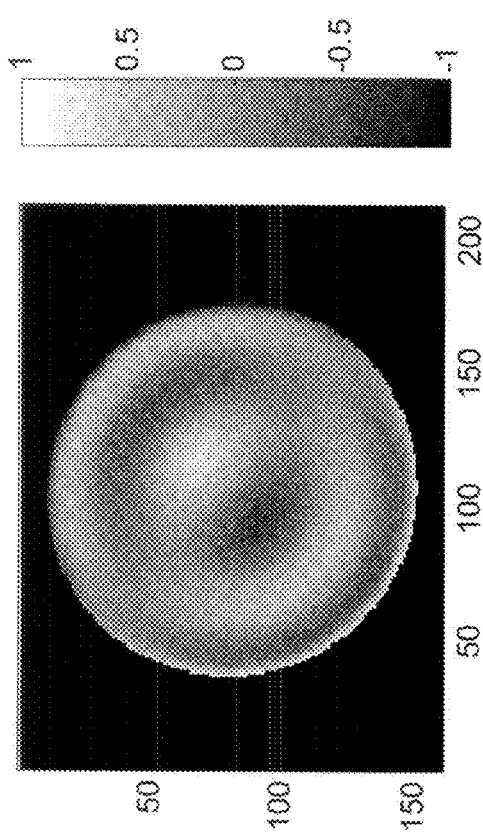

The "static" part includes the following steps. Initially, center coordinates for the interferogram on the detector, the radius of the interferogram, and shear (all in pixels) are entered into a mask editor (step 701). An exemplary user interface for a mask editor is shown in FIG. 8. This data is used to calculate data mask matrices for the shear in the two orthogonal directions (step 704). Exemplary data masks for u-shear and v-shear are shown in FIGS. 9(a) and 9(b), respectively. The data from the mask editor is also used to calculate tilt planes for the shear in the two orthogonal directions (step 702). The tilt planes are calculated and subtracted from the measured u-phase and the v-phase due to the artificially introduced tilt caused by the carrier frequency. Exemplary tilt plane data is shown for u-shear and v-shear in FIGS. 10(*a*) and 10(*b*), respectively.

In another step (step 703), the relative shears, u and v, for which the x-y coordinate system is rotated by 45° is determined based on the following relationships. First, an effective grating pitch is determined from the grating pitch as follows:

$$\text{effective grating pitch} = \frac{\text{grating pitch}}{\sqrt{2}}. \tag{19}$$

Next, an absolute shear is determined based on the effective grating pitch, the distance, d, between the gratings, and the wavelength of light, $\lambda$, for which the measurement is being made.

$$\text{Absolute shear} = \frac{d \cdot \lambda}{\sqrt{(\text{effective grating pitch})^2 - (\lambda)^2}} \tag{20}$$

Finally, a relative shear value can be determined based on the absolute shear and the beam diameter at the gratings:

$$\text{Relative shear } u = v = \frac{\text{Absolute shear}}{\text{Beam diameter at gratings}}. \tag{21}$$

Note that care should be taken that all parameters are determined in the same units (e.g., millimeters) and that the relative shear u and v are dimensionless.

Using the calculated relative shear, the algorithm determines a weighting matrix G (step 705). The weighting matrix G is a matrix that is multiplied with the convolved images (see discussion below) subsequently to directly obtain the Zernike coefficients. Pupil remapping is also included in matrix G. Pupil remapping is used to correct the imaging of a spherical wavefront of a test object as it is imaged onto a flat detector (image plane). The exit pupil diameter from the mask editor, as well as three Legendre coefficients a1,a3,a5, are used for remapping the pupil in matrix G.

The weighting matrix G is calculated such that it holds an effective per pixel weight for each individual Zernike coefficient of the two sheared wavefronts. Since the two sheared wavefronts provide information about the differences contained in test wavefront 101, a Zernike fit cannot be applied directly. Instead, Zernike surfaces corresponding to each Zernike coefficient are shifted by +u and −u laterally in x-direction (note that x and y are normalized coordinates from −1 to +1, and that u and v are given as relative shear values too) and the resulting finite difference surface is computed, now as a function of x, y, and u. The same is done for the v-shear direction, resulting in a second set of Zernike-difference functions, now being expressed in x, y, and v coordinates. This results in two sets of functions, which are the (finite) differentials of the Zernike functions with respect to the x- and y-direction. Now one can establish a system of equations, where, for every pixel within the mask areas (see the dashed areas in FIG. 4(*a*) where the two circles G1 and G2 or K1 and K2 overlap) one can set up one equation for the result of the measured height-difference of the wavefront sheared in u-direction and one equation for the measured height difference of the wavefront in v-direction using the corresponding differential of the Zernike function. In total, one gets as many equations as pixels within each of the two sheared masks. By fitting measured differences of the wavefront to computed differences of Zernike functions, the integration of the measurement to the underlying original wavefront is done indirectly and at the same time the Zernike fit is performed.

The general mathematical procedure for "fitting" a measurement result to a set of polynomials can be expressed in matrix formulation as $$Aw=b \tag{22}$$

In eq. (22) the quantities are as follows:

w is a column vector of unknown coefficients; if n Zernike polynomials are used one gets (n−1) unknown coefficients; the first Zernike polynomial is a constant, and the derivatives of this polynomial with respect to x and with respect to y are both zero. Therefore, this coefficient cannot typically be measured by a shearing method, but its value has no practical meaning. b is a column vector with 2m elements: m measurement values for every pixel within the mask with the (normalized) coordinates x,y for u-shear and another m measurement values for every pixel within the mask for v-shear. A is a matrix with 2m rows and n columns: for every normalized coordinate pair x, y for the given u-shear the value of the Zernike-difference function for u can be computed. The same applies for the v-shear and the associated Zernike-difference function for v.

The general solution of such a fitting procedure can be expressed by:

$$w=(A^TA)^{-1}A^Tb=Gb \tag{23}$$

In this equation the matrix G can be computed without knowing the result of the measurement, which is captured by vector b. G can be computed from the normalized coordinates of the pixels where the measurement values are derived, as well as the values of the Zernike-differential functions for the u-shear and v-shear. Therefore G can be pre-computed, which can speed up the complete fitting procedure.

G is a matrix with n rows (for the coefficients of the n-Zernike functions to be used for the fit) and 2 m columns, where the first m columns are for the measurements of the u-sheared wavefront, the second m columns for the measurement from the v-sheared wavefronts. Thus, one can split G into two matrices, which are referred to as Gu and Gv. By positioning the m numbers of one row in Gu—which act as "weights" for the multiplication with the measurements itself—in an arrangement as the measured pixels in the overlap area of G1,G2 in FIG. 4(*a*), and the m numbers in the same row from Gv in an arrangement as the associated pixels in the overlap area for K1,K2 in FIG. 4(*a*), one gets two sets of 2-dimensional matrices which contain the weights with which the measured sheared wavefronts are multiplied. Examples of these weights are shown in FIG. 11(*a*) to FIG. 12(*x*). These functions look similar to the finite differences of Zernike functions for the u- and the v-direction, i.e., where x is first substituted by (x−u), then by (x+u) and the resulting two functions are subtracted, and the same with v respectively.

Multiplying of the weights at each pixel with the measurement values obtained at the same coordinates and summing up all such products yields the coefficient of the Zernike polynomial.

The static part of the algorithm also involves setting up a set of convolution kernels for later use on the acquired live image (step 705). The convolution kernels are used to extract a phase encoded in the interferogram at each pixel location (or combined pixel location, where intensity data from multiple pixels is binned). Wavefront aberrations spatially modulate the carrier fringes in the detected interferogram. By using four different convolution kernels, the phase content encoded in the fringe pattern of the interferogram can be extracted separately. Two kernels are used for extracting the x-shear phase and another two kernels are used for extracting the y-shear phase. An example with 5×5 elements of such kernels is given in TABLE 1 below. These kernels are suitable for the case that the carrier phase-increase is 90 degrees per pixel in x-direction and also 90 degrees per pixel in y-direction. In addition, the kernels are designed such, that they can absorb a large amount of deviation of the actual local phase-change in x-direction and in y-direction separately or in combination. This can be analyzed by investigating the three directions x, y and diagonal (i.e., combined x and y) separately. Computing the sum of columns in Z5y gives:

$$ZyC=[-2\ 8\ 0\ -8\ 2] \quad (24)$$

and the sum of the columns of N5y gives $$NyC=[-2\ -4\ 12\ -4\ -2]. \quad (25)$$

These are known formulas for a temporal phase-shifting approach, which is typically highly insensitive to detuning of the phase-steps, as it produces a threefold zero for the design step of 90 degrees, when the phase-error induced by a detuning of this value is investigated. Due to the symmetry, the same is true for the sum of rows in the two kernels. Now investigating the combined effect of step-size in x and in y direction, one should investigate the diagonal. Here, the sum of the elements is:

$$ZyD=[-2\ -8\ 30\ 0\ -30\ 8\ 2] \quad (26a)$$

$$NyD=[2\ -12\ -10\ 40\ -10\ -12\ 2] \quad (26b)$$

or divided both by a factor of two (as one calculates the arctangent to get the phase, a common factor in both kernels can be factored out):

$$ZyD=[-1\ -4\ 15\ 0\ -15\ 4\ 1] \quad (27a)$$

$$NyD=[1\ -6\ -5\ 20\ -5\ -6\ 1] \quad (27b)$$

Taking these numbers as a temporal phase-shifting formula gives a 5-fold zero at 90 degrees, as can be seen in Michel, M. F.: "Precise and Robust Phase Measurement Algorithms", IUTAM Symposium on Advanced Optical Methods and Applications in Solid Mechanics, held in Futuroscope, Poitiers, France, Aug. 31-Sep. 4, 1998, Alexis Lagarde (ed.), Kluwer Academic Publishers, Dordrecht, Boston, London, pp. 371-384, (2000). Therefore the complete two-dimensional kernels can be relatively forgiving for changes in the actual frequency of the fringes in all three directions. The kernels Z5x and N5x are essentially the same as Z5y and N5y, but they are horizontally mirrored due to the other orientation of the carrier frequency for u-shear and v-shear (the other diagonal direction).

in the binning parameter are binned together (step 707) and used to calculate four convolved images for u and v with Z5x, N5x, Z5y, and N5y (step 708).

FIGS. 13(a)-13(d) show intensity images for u-shear convolved with Z5x, u-shear convolved with N5x, v-shear convolved with left/right flipped Z5x, labeled as Z5y, and v-shear convolved with left/right flipped N5x, labeled as N5y, respectively. From these intensity images, it is clearly visible that the convolution kernels Z5x, N5x, Z5y, and N5y separate the diagonal fringes from the checkerboard pattern that was present before the convolution.

From these images, an intermediate phase is calculated for both the v and the u shears (step 709) using the following relationships:

$$ZP5u = I \otimes Z5x \quad (28a)$$

$$NP5u = I \otimes N5x \quad (28b)$$

$$\phi_u = \mathrm{mod}(\mathrm{atan}\,2(ZP5u, NP5u) - Tu, 2\pi) \quad (28c)$$

$$ZP5v = I \otimes Z5y \quad (29a)$$

$$NP5v = I \otimes N5y \quad (29b)$$

$$\phi_v = \mathrm{mod}(\mathrm{atan}\,2(ZP5v, NP5v) - Tv, 2\pi) \quad (29c)$$

In these formulas (steps 708 and 709) the symbol $\otimes$ means "convolution" and I is the intensity in the combined interferogram for u-shear (which takes place along the x-coordinate) and v-shear (taking place along the y-coordinate). The convolution with the appropriate kernels "separates" the shear component which is selected by the orientation of the convolution kernel, either along the x-direction or the y-direction. "a tan 2" refers to a function, a tan 2(y, x), that computes the principal value of the argument function applied to the complex number x+iy. That is a tan 2(y, x)=Pr arg(x+iy)=Arg(x+iy). The separation property of the kernels is shown in FIGS. 13(a) to 13(d), which show ZP5u (FIG. 13(a)), NP5u (FIG. 13(b)), ZP5v (FIG. 13(c)) and NP5v (FIG. 13(d)). Now the phases can be readily computed using the arctan function (with its two vector components as the input arguments), and before the value is computed modulo $2\pi$, (the arctan delivers the phase only modulo $2\pi$) a tilted phase-plane Tu is subtracted in case of the u-shear and Tv in case of the v-shear. These two planes compensate for the phase-increase of $\pi/2$ per pixel for every column and in addition of $\pi/2$ per pixel for every line, which was introduced

TABLE 1

$$Z5y = \begin{bmatrix} 0 & -1 & -2 & 1 & 0 \\ -1 & -4 & 14 & 0 & -1 \\ -2 & 14 & 0 & -14 & 2 \\ 1 & 0 & -14 & 4 & 1 \\ 0 & -1 & 2 & 1 & 0 \end{bmatrix} \quad Z5x = \begin{bmatrix} 0 & 1 & -2 & -1 & 0 \\ -1 & 0 & 14 & -4 & -1 \\ 2 & -14 & 0 & 14 & -2 \\ 1 & 4 & -14 & 0 & 1 \\ 0 & 1 & 2 & -1 & 0 \end{bmatrix}$$

$$N5y = \begin{bmatrix} 0 & 1 & -2 & -1 & 0 \\ 1 & -8 & -4 & 8 & -1 \\ -2 & -4 & 24 & -4 & -2 \\ -1 & 8 & -4 & -8 & 1 \\ 0 & -1 & -2 & 1 & 0 \end{bmatrix} \quad N5x = \begin{bmatrix} 0 & -1 & -2 & 1 & 0 \\ -1 & 8 & -4 & -8 & 1 \\ -2 & -4 & 24 & -4 & -2 \\ 1 & -8 & -4 & 8 & -1 \\ 0 & 1 & -2 & -1 & 0 \end{bmatrix}$$

Turning now to the "pipeline" part of the analysis, from an acquired detector frame, the number of pixels that is defined beforehand through the carrier fringes, made by rotating the gratings with respect to each other by $\alpha$.

Figure 14A:
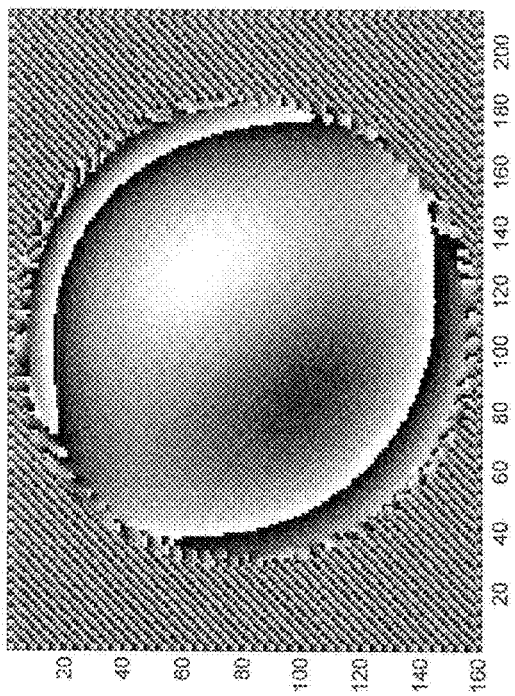
FIGS. 14(a) and 14(b) show exemplary resulting intermediate phase images for u-shear and v-shear, respectively.
Figure 14B:
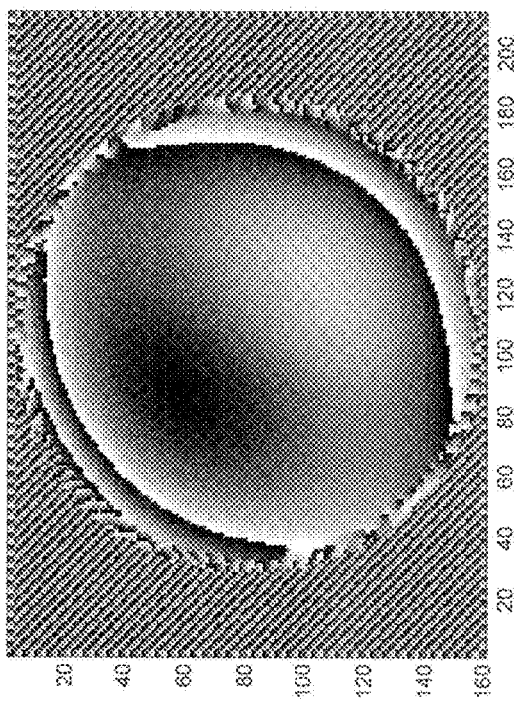

The nominal tilt introduced by the carrier frequency is also subtracted in this step. Exemplary resulting intermediate phase images for u-shear and v-shear are shown in FIGS. 14(a) and 14(b), respectively.

Figure 15A:
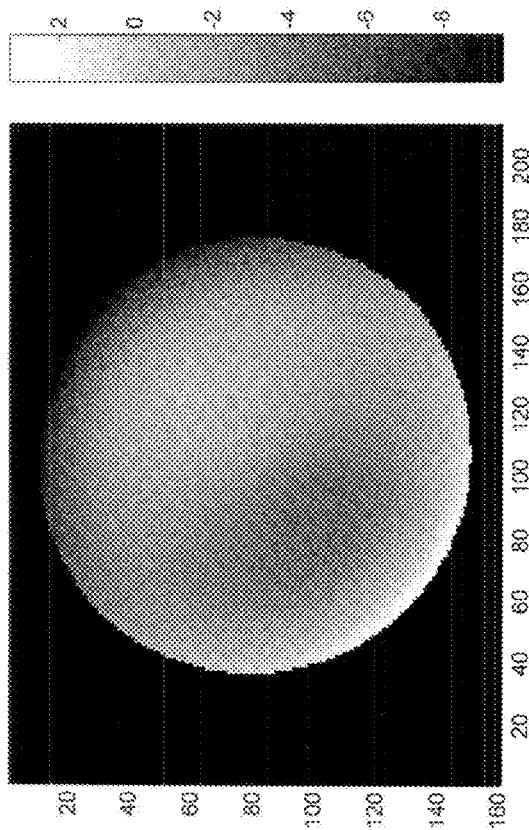
FIGS. 15(a) and 15(b) show phase maps of u-shear and v-shear, respectively, that are unwrapped, masked with the appropriate shear masks, and with the piston term subtracted.
Figure 15B:
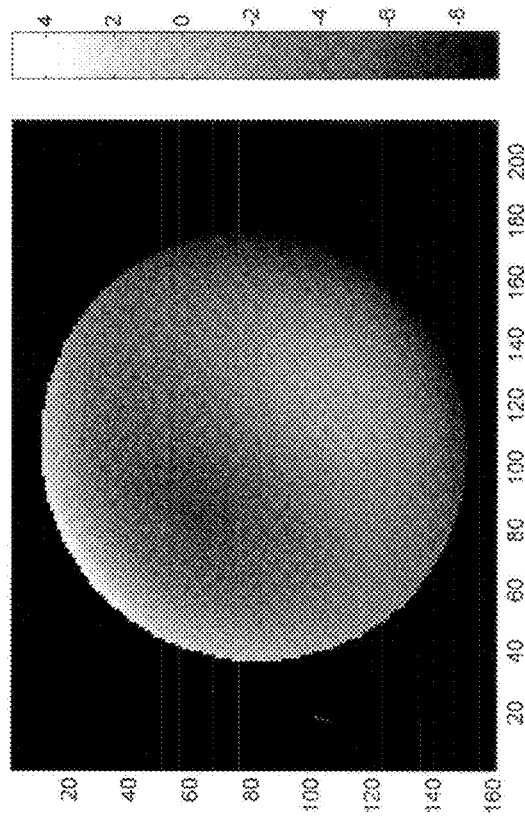

Next, the intermediate phase maps are unwrapped to remove $2\pi$ phase ambiguities, masked using the v-shear mask and u-shear mask, respectively, and a constant piston term subtracted to bring the phase values into a desired range (step 710). FIGS. 15(a) and 15(b) show phase maps of u-shear and v-shear, respectively, that are unwrapped, masked with the appropriate shear masks, and with the piston term subtracted.

Zernike coefficients are calculated from the two phase maps from step 710 by multiplying the phase maps as vectors (arranged from the matrix data collected from the matrix detector) with the weighting vector stored in matrix G for both the u and v phases.

The Zernike surface (of size 2*Radius of the non-sheared pupil, determined using the mask editor, step 701) is set up for display by multiplying each Zernike coefficient with the corresponding pre-calculated matrix and all these matrices are summed.

A modulation map is calculated (step 711) as the square root of the sum of the convolution images $ZP5u^2$ and $NP5^2$ for u and $(ZP5v^2+NP5v^2)^{1/2}$. The modulation maps for u-shear and v-shear are remapped to the size of the Zernike surface by cropping the region of interest. The pixels below the modulation threshold are set to 0, all others are set to 1 in the two modulation maps. The two modulation maps are combined into a single map such that all "1"s from the two individual maps are "1"s in the combined map. This can be an in-place transformation on map 1 (u) with the data of map 2 (v). In other words, this can be a transformation in which no new matrix is necessarily set-up in computer memory for the result of the addition of matrices map 1 and map 2, rather than that map 1 is used for the final result (i.e. its original content is replaced with the new one).

Figure 16A:
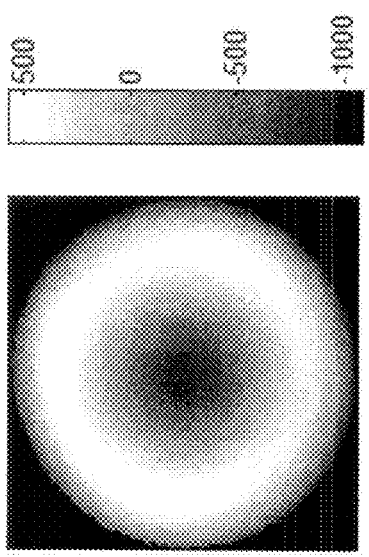
FIGS. 16(a) and 16(b), show the results obtained displayed as a Zernike surface and the Zernike coefficients as bar plot, respectively.
Figure 16B:
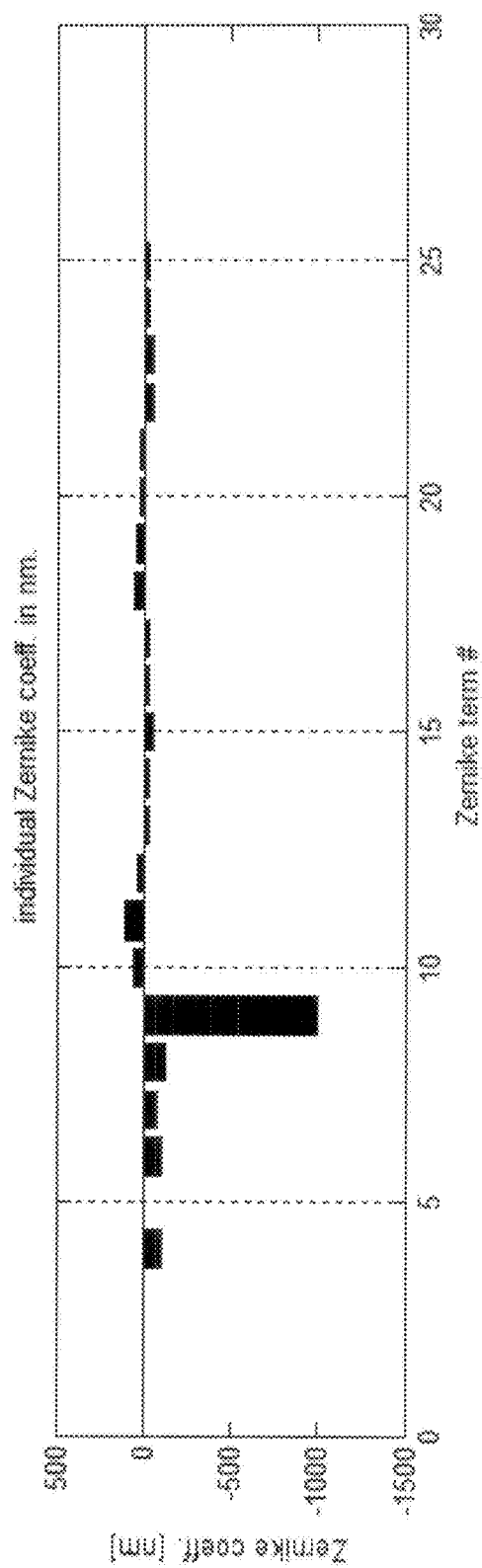

Finally, the wavefront to be displayed is calculated by multiplying the Zernike surface with the modulation map. The results are provided to a user. For example, with reference to FIGS. 16(a) and 16(b), in some embodiments, the results can be displayed to a user either as a Zernike surface (FIG. 16(a)) and/or with the Zernike coefficients as bar plot (FIG. 16(b)).

The pipeline part of the analysis can be repeated for multiple (e.g., every) frame acquired by the detector. The whole computation can be constructed in a manner such that the flow of data is based on pixels rather than complete camera images.

Absolute Measurements of Zernike coefficients

In general, analyzer 100 can be calibrated to enable "absolute" measurements of the values for the Zernike coefficients. Here, absolute measurements are measurements in which the only aberrations contributing to the measured Zernike coefficients are from the test object; the measurements do not contain contributions to the measured aberrations from, e.g., components in the measurement set-up or imperfect alignments. Note, however, that such measurements may still contain measurement errors of random nature, for instance photon shot noise or detector noise.

In some embodiments, calibration is done with a single mode fiber (e.g., with a tempered tip), which is smaller than $1\lambda$, of the wavelength of test wavefront of interest, in order to generate a wave with a spot size smaller than $\lambda/2$. This small "point" light source emits a perfect, "diffraction limited" spherical wave, in principle, which is collected by wavefront analyzer 100. Measurement of the Zernike coefficients for this spherical wavefront thus provide a basis for determining the absolute measurements, which correspond to the deviation of a test wavefronts measured Zernike coefficients from the values for the spherical wavefront.

The calibration can take into account contributions from optical assembly 130 and other optical components in the beam path before the analyzer unit 140 that contains gratings 141 and 142. In addition, telescope 150 is in the beam path after the analyzer unit in order to perform bias-free measurements. The reconstructed wavefront measured using the calibration fiber tip is stored for later processing with data acquired using a test object. In particular, test object 102 is introduced and the size and position of the image of the exit pupil is stored. The amount of absolute shear is calculated from measuring the distance between the gratings, the known wavelengths and the known grating period. Then the fiber is introduced and the system is reconfigured (via rotation of the gratings with respect to each other and varying the position of the fiber in front of optical assembly 130) such that the total root mean square (r.m.s.) wavefront aberration measured at detector 160 is minimized.

The pupil diameter set previously for test object 102 is used for the reconstruction (masks), in which case the NA of the fiber should be slightly higher than that of test object 102. In addition, it can be favorable to have an even illumination of the detector within the interferograms, to make best use of the dynamic range of the CCD.

The amount of aberration that can be handled by the data extraction algorithm is theoretically limited by half the Nyquist criterion. This means that (before introducing the carrier) an increase (or decrease) in phase off $\pm\frac{1}{2}\pi$ per pixels in both directions, columns and rows, is possible. In practice, it may be advantageous to limit the amount of aberration to about 75% of the theoretically limited value. Since the value of this limit is on the phase of the sheared interferograms, the amount of aberration in the original wavefront can be more than an order of magnitude larger, e.g., much larger than the aberration that can be measured in a conventional Fizeau arrangement using a CCD with the same number of pixels.

In general, measurement frequency can vary as desired within the limits of detector 160 and electronic processor 170. To increase measurement frequency (wavefront-measurements per second), the number of data-points can be reduced by binning m rows and m columns of the multi-element detector together, prior to any data processing. However, the carrier frequency on the multi-element detector before binning should also be reduced by a factor of m, which can reduce the maximum amount of detectable aberrations by a factor of m. The gain in speed of calculation is thus a factor of $m^2$. In some embodiments, a reasonable value for m is 2 or 3.

Noise Reduction

Various approaches can be used to improve the signal-to-noise (S/N) ratio of wavefront analyzer 100. For example, with reference to FIG. 6, in some embodiments, filter apertures 501 and 502 can be rotated from the positions shown in FIG. 6 by 180 degrees, such that the interference at the detector is of the opposite sign (e.g., arising from the combination of (−1,0) and (0, −1), rather than (0, +1) and (+1, 0)). The aberrations introduced by telescope 150 should remain unchanged under the rotation. Thus by using four filter holes and a rotating half-plane aperture in front of the 4-hole arrangement, detector 160 can be synchronized with the rotating half-plane aperture so that measurements with improved S/N could be achieved by subtracting the interference signals measured at the detector. At the same time, the aberrations introduced by the telescope 150 should cancel.

Due to the coherent nature of the light passing through spatial filter apertures 501 and 502 to create four sheared images of the exit pupil on detector 160, besides the desired interference between wavefronts (x+u), (x−u) emanating from aperture 501 and wavefronts (y+v), (y−v) emanating from aperture 502, parasitic signals from crosstalks (x+u), (y+v) and (x+u), (y−v) as well as (x−u), (y+v) and (x−u), (y−v) can also be observed. These crosstalks can create a high frequency pattern that may be aliased down into the frequency band of the carrier fringes by detector 160. The grating constant used in gratings 141 and 142, optical first-order properties of telescope 150, pixel spacing, the amount of binning of rows and columns, and the fill factor of the CCD detector, are all factors that determine the extent to which this crosstalk occurs.

In certain embodiments, steps can be taken to reduce such crosstalk. For example, using orthogonal polarizations for the rays passing each of filter apertures 501 and 502, any additional pattern due to crosstalk that creates artifacts in the reconstructed phase of the sheared interferograms can be suppressed. To achieve orthogonal polarizations between the rays in different filters holes, linear polarizing filters are mounted in front of filter holes 501 and 502, for example. When the direction of the linear polarization is mutually orthogonal for the polarizers in filter holes 501 and 502, the wavefronts emanating from these holes are mutually incoherent, thus interference between the wavefronts can be significantly reduced (e.g., prevented entirely). The incoming beam is then polarized at 45 degrees, either using polarizing components in the illumination optics or light source, or in collimating optics 130.

Alternatively, a right-hand circularly polarized pair of beams and a left-hand circularly polarized pair of beam can be used, e.g., by using a combination of half wave plates and quarter wave plates in filter apertures 501 and 502. In both cases, the rays from the two holes are made mutually incoherent by the polarizers, thus avoiding parasitic high frequency interference.

Alternatively, or additionally, four spatial filter apertures (as described above) can be used to prevent cross-talk by rotating another aperture in front of the spatial filter plane that only opens a sector of 90 degree at a time. In this case, the x-sheared interferogram and the y-sheared interferogram would be measured sequentially.

Turning now to techniques for correcting the final wavefront, when the optical system is viewed in the reverse direction from the detector plane all the way back to the exit pupil of test object 102, the wavefront observed is a surface not precisely the shape of a sphere, with circular boundary at the physical stop of the exit pupil. This is commonly termed the "field curvature" when imaged at the detector plane. Associated with this curvature is a small amount of distortion between the x,y-coordinates in the detector plane and the x,y-coordinates in the exit pupil of test object 102. This mapping relationship can be experimentally measured and used to correct the final wavefront. For example, for the measurement of the distortion in imaging the exit pupil to the detector plane, the end of a fiber can be placed onto a high precision x,y,z-mount. Such a x,y,z-mount typically includes of 3 precision linear tables that are mounted together in an orthogonal manner. When the fiber-tip is placed at the location where the spherical exit pupil (101 of the lens 102 in FIG. 1(b)) would be expected, an image of the illuminated fiber-tip is observed on the detector and its precise location can be found by means of image processing the center of gravity of the intensity distribution. After proper alignment of the fiber to the optical axis, calculations of the Cartesian coordinates for the fiber tip can be calculated, when the tip should always remain on the sphere defining the exit pupil. After each setting of the x,y,z coordinates for a new point on the sphere, the position of the center of gravity of the spot can be measured. In some embodiments, a table can be generated which contains object- and image coordinates and a polynomial (e.g., using Legendere polynomials) can be fitted to the data to describe the relationship mathematically. If this relationship is later used for the correction of the normalized coordinates used in the Zernike-difference functions described before, the effect of the distortion on the measured wavefront can be automatically corrected.

Among other advantages, the disclosed techniques can separate two interferograms (corresponding to the x-sheared and y-sheared interferograms) which contain different information but are coded in the same pixels.

The disclosed techniques can have homogeneous characteristics over the entire measurement field with respect to signal to noise ratio (S/N), frequency response, and modulation. In contrast, in many conventional techniques, such as Fourier Transform techniques, these features change with position in the interferograms. In particular, there can be little or no "ringing" or "Gibbs phenomena" at the edge of the pupil in the disclosed techniques. Moreover, the disclosed techniques can be implement without using a window function, as is often used in Fourier Transform techniques, thus no influence of window function choice is imposed on the result.

The frequency behavior of the convolution kernels can be studied by Fourier transforming the kernels. Since the kernels are very limited in the number of pixels they cover (e.g., 5×5), the phase-transfer functions of the kernels typically have a high value over a broad range of frequencies. In many cases, this is sufficiently high for a subsequent calculation of the Zernike coefficients. In addition, the spatial resolution of the wavefront that can be achieved using these kernels can be much higher than those used to fit Zernike coefficients using conventional methods for integration.

In addition, these kernels can separate the interferograms for x-shear and y-shear perfectly, there is no crosstalk.

In the data processing algorithm discussed above, the carrier phase is subtracted as a fixed value, just after the calculation of the phase by the arctangent prior to phase-unwrapping. Also there is a fixed amount of tilt in the interfering beams, which is created by a fixed rotation of the gratings with respect to each other. Taken together, these give a new "zero" for defocus and the two astigmatism coefficients. A perfect wavefront should give zero tilt in both sheared wavefronts after the fixed amount of carrier phase is subtracted. Therefore, in certain embodiments, one can measure focus and astigmatism of the wavefront entering the gratings in an absolute manner, when the correct rotation angle has been applied.

The disclosed techniques can be used to determine Zernike coefficients with relative low error. For example, simulations of the complete creation and reconstruction of the wavefront using crossed gratings, the disclosed techniques and the reconstruction algorithm (a single procedure starting from the Zernike functions and ending with the reconstructed Zernike functions) can show relative errors of less than 0.1%.

Furthermore, in the disclosed techniques, the measured phase is not directly dependent on illumination symmetry and evenness and thus not vulnerable to influence from an uneven illumination distribution. In contrast, conventional techniques (e.g., using a Hartmann-Shack wavefront sensor) can be sensitive to uneven illumination distributions.

Since system parameters are not changed between calibration and measurement, the calibration of the present method can be comprehensive and metrologically correct results can be obtained.

Furthermore, the disclosed techniques can use information collected at every pixel of the detector that contains the interferograms in a very efficient manner. The information of the wavefront aberration is coded in the relative intensity of a number of pixels. In certain embodiments, the information from the pixels are convolved with two different kernels to produce a value proportional to the sine and the cosine of the measured phase. Using these techniques, the absolute intensity as well as a bias intensity, is eliminated. Irregularities in pixel sensitivity can thus be greatly mitigated.

The disclosed techniques can also have a much denser sampling of a measurement compared to certain conventional techniques. For example, using a 5×5 phase-kernel on a 640× 480 pixel detector (using a square defined by the smaller dimension: 480×480=230400 pixels total), having a relative shear of 5% and an optimized imaging of the pupil onto the camera, as many as 174054 phase measurements for x-shear and 174054 phase measurements for y-shear can be obtained. In contrast, in a typical Hartmann-Shack sensor, for example, the position of the centers of gravity for the focal spots need to be determined. In addition, the pixels between the focal spots (which are not illuminated at all) are not typically used photometrically, and the only information collected is usually the distance (i.e., location) of the focal spot.

Furthermore, Hartmann-Shack grids can be limited to about 30×30 cells. For such grids, the relative displacements of the focal spots with respect to one another caused by aberrations can only be unambiguously reconstructed for lateral dislocation of the focal spots of less than ⅓₀ of the pupil diameter. This reduces the spatial resolution in Hartmann-Shack compared to the disclosed shearing method by an order of magnitude in both directions.

Typically, in order to obtain a precise value for the position of the center of gravity for a focal spot in Hartmann-Shack sensor, several pixels should be illuminated around that particular spot center. The diameter of this "disk" (spot center and surround pixels) multiplied by the number of cells should be smaller than the number of pixels in a row or column of the detector used with the sensor by a certain factor. Assuming, for example, that the center spot is 5 times smaller than the disk to avoid overlapping in areas with large lateral aberration, and a number of 1000×1000 pixels on the detector, then with 30 cells and spacing between the spot centers (without any aberration) 5-times the spot diameter, the diameter for each disk can be 1000/(5×30)=6.6 pixels. This means, for a single spot, about 20 pixels are illuminated. Thus assuming the sensor has about 555 spots, for example, within the measurement field on the detector, the sensor actively uses about 20×555 pixels which is approximately 11,000 pixels out of 1,000,000 pixels total—1.1% of the total detector capacity. In contrast, using the disclosed techniques, assuming a relative shear of 2.5%, 696,728 pixels are used for x-shear and 696,728 pixels are used for y-shear when 1000×1000 pixel detector is used, which is 139% of all detector pixels. Thus, for this example, the gain in detector efficiency compared to the Hartmann-Shack sensor is about a factor of 55.

Further Implementations

While certain implementations have been described, other implementations are also possible. For example, a further embodiment of a wavefront analyzer 800 is shown in FIG. 17(a). In this embodiment, a multi-element detector 830 is combined with gratings 810 and 820 that are mounted directly in front of the light sensitive surface 832 of detector 830. Gratings 810 and 820 are separated by a distance d, while grating 820 is separated from surface 832 by a distance m. As for gratings 141 and 142 discussed previously, gratings 810 and 820 are two-dimensional gratings rotated relative to each other by angle α. The entire assembly can be integrated together in a rigid manner so that the relative orientation and spacing of the components is not disturbed, e.g., by vibration or mechanical shock.

Referring to FIG. 17(b), together with a coupled electronic processor 870 and the appropriate software for phase-evaluation, phase unwrapping and reconstruction of the wavefront, this system is a realization of a "wavefront analyzer" that directly measures the shape of a wavefront 801 impinging onto the analyzer 800. In some embodiments, a complete wavefront measurement system can be provided by including a light source (e.g., a diode laser or LED with a fiber mounted on it) with analyzer 800 and electronic processor 870.

Figure 18A:
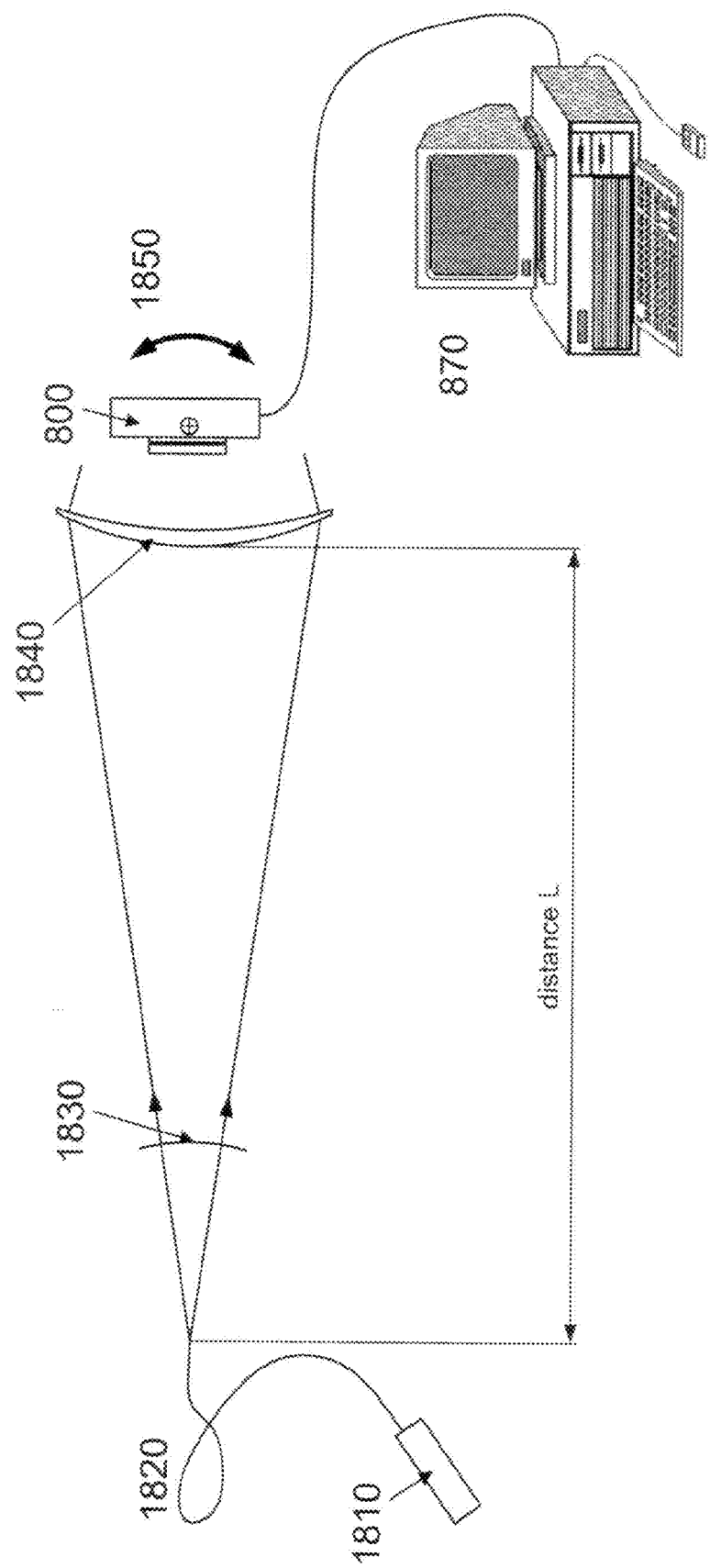
FIG. 18(a) shows an analyzer arranged with a fiber-based source for delivering light to a test object.

For example, with reference to FIG. 18(a), analyzer 800 can be arranged with a fiber-based source (including light source 1810 and a fiber 1820) for delivering light to a test object 1840 (e.g., an ophthalmic lens). It is instructive to compare the arrangement in FIG. 18(a) with analyzer 100 shown in FIGS. 1(a) and 1(b) and discussed above. Firstly, focus point 120 on the left hand side of optical assembly 130 shown in FIG. 1(b) is replaced here by the end of fiber 1820. Optical assembly 130 in FIG. 1(b) is replaced by test object 1840. In analyzer 100, two gratings 141 and 142 are followed by telescope 150, which images a plane between the gratings onto detector 160 and enables the placement of spatial filter 155 to block unwanted diffracted orders. In the analyzer 800, gratings 141 and 142 are replaced by a solid state plate with a gating pattern 810 on the front side and another gating pattern 820 at the back side. Telescope 150 is eliminated, the imaging being replaced by placing double grating device 810 and 820 next to detector 830 and making the device very thin. Blocking of the unwanted diffracted orders is replaced by a phase-grating at front side of the plate, which is designed such that it does not produce unwanted diffracted rays (e.g., a zero order diffracted ray). The relatively large distance between the gratings in analyzer 100 is replaced by the small thickness of the plate and a much smaller pitch of the diffraction pattern of gratings 810 and 820. Rotation of the gratings with respect to each other is now replaced by a solid angle between grating 810 on the front side and grating 820 on the back side that can be introduced during manufacturing (e.g., using e-beam writing of the patterns on both sides of the solid state plate). This feature can make the resulting device extremely stable relative to devices assembled from discrete components (e.g., on an optical breadboard).

This stability enables the device to be used as an optical "normal" for different tasks. For example, one can measure the absolute radius of curvature of wavefronts using the device, thus enabling tasks like the measurement of focal length, or radius of curvature of lenses.

Figure 19:
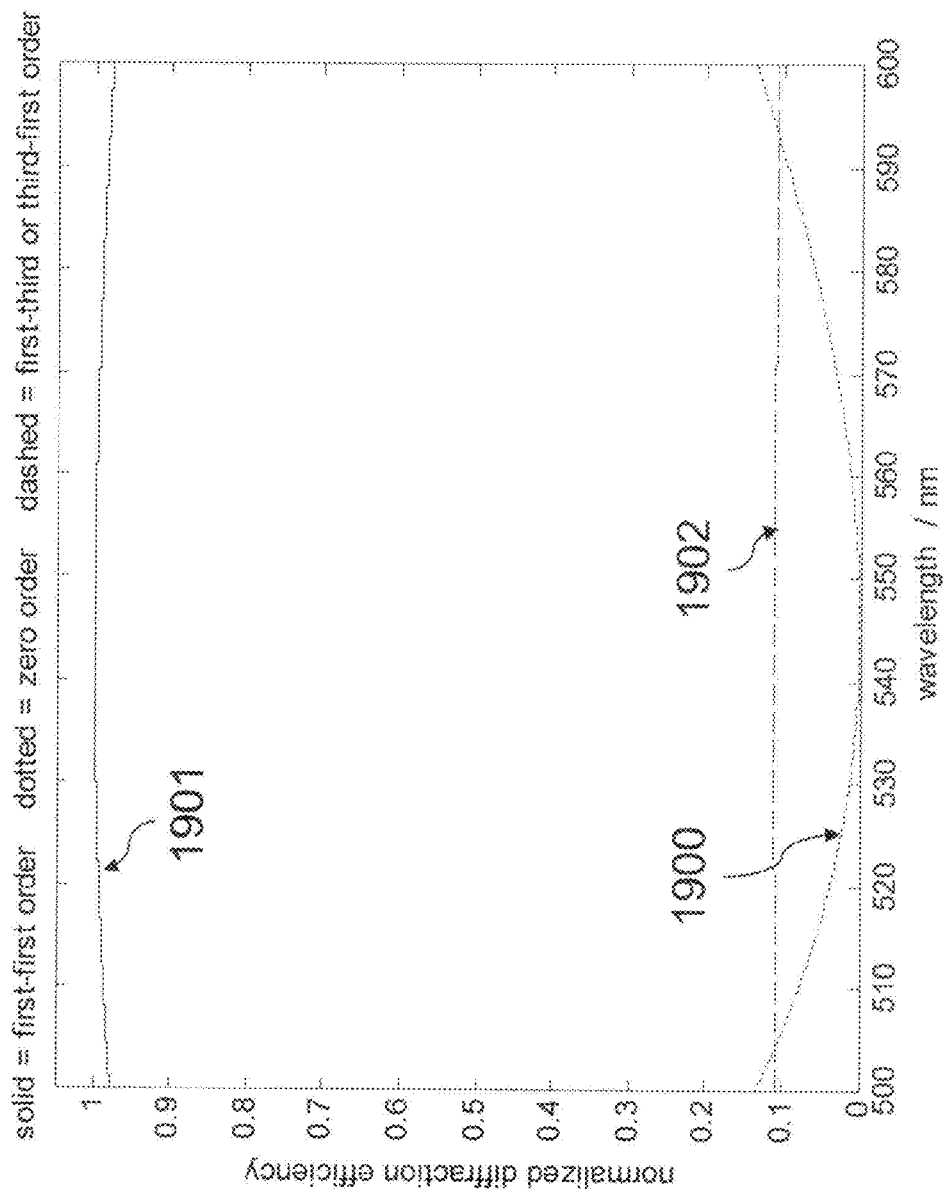
FIG. 19 shows the intensity of diffraction orders of a chessboard phase grating made of fused silica and a step height of the "black" fields in the chessboard structure of h=592 nm for light in the range of 500 nm to 600 nm.
Figure 20B:
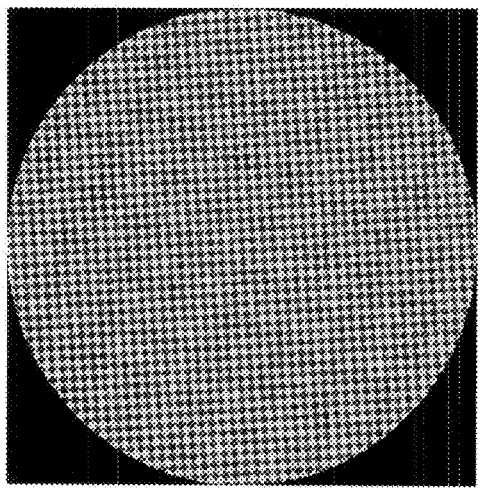
FIGS. 20(b) and 20(c) show the real and imaginary parts, respectively, of the phase grating a distance of 0.1663 mm from the grating.
Figure 20D:
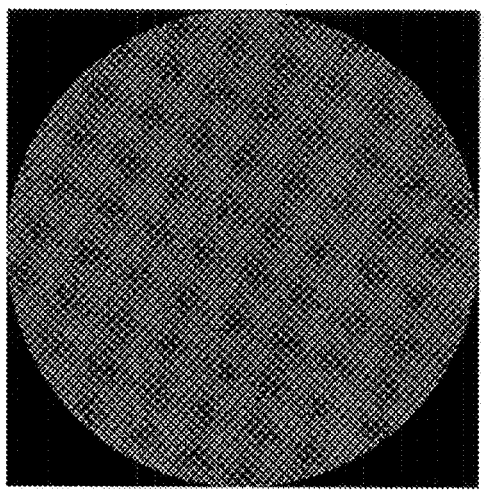
FIG. 20(d) shows the intensity pattern produced by the grating 0.1663 mm from grating.
Figure 20A:
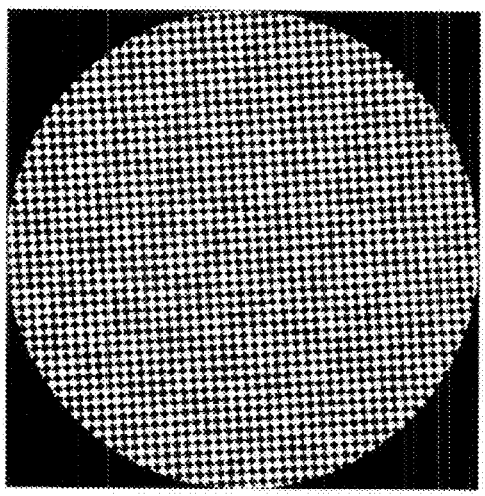
FIG. 20(a) shows the real part of a phase grating.
Figure 20C:
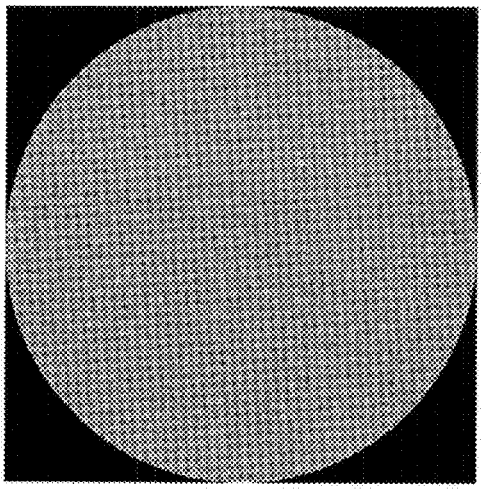

In some embodiments, grating 810 has a chessboard pattern, which can produce only +1 and −1 diffraction orders (e.g., any even diffraction orders are zero and the third and higher orders are weak). By way of example, FIG. 19 shows the intensity of diffraction orders of a chessboard phase grating made of fused silica ($SiO_2$) and a step height of the "black" fields in the chessboard structure of h=592 nm for light in the range of 500 nm to 600 nm. The zero diffraction order (curve 1900) vanishes only for the "design wavelength", of $\lambda_0$=545 nm, where the step height h causes precisely a phase-shift of π. In contrast, the (±1, ±1) orders (curve 1901) is extremely strong across the shown wavelength range. The (±1, ±3) and (±3,±1) orders (curve 1902) is constant across the wavelength range but of much lower intensity than the (±1, ±1) orders.

The grating produces in addition to the zero order all combinations of uneven orders, i.e., the strong (and desirable) orders (±1, ±1), but also (±1, ±3) as well as (±3,±1) and so on. These orders are relatively weak, and all combinations that have a difference of (2,2) (i.e., the absolute difference between the diffracted orders is 2) interfere with one another in the same way as the wanted orders (±1, ±1).

Behind grating 820, the electromagnetic field travels along the z-axis in the direction of the ±first diffraction orders, creating the wanted lateral shearing effect. Other than that, the wavefront does not change significantly. This can be explained by the well-known "Talbot effect" and the "self-imaging" of periodic structures. If one used a plane wavefront illuminating the front side of the device, the amplitude transmittance found directly after the phase-structure would be found again nearly unchanged at a certain distance behind the front side. However, at a yet another slightly different distance, the phase-distribution and lateral shear of the plane wavefronts traveling along the direction of the diffraction orders cause the phase-distribution to change, such that different intensity modulations could be observed in this new z-distance. Therefore different z-distances are associated with varying degrees of intensity modulations. It is very rare to find a distance z at which no intensity modulation is visible.

At grating 820, an amplitude-transmittance pattern can be used, again in the form of a chessboard. This pattern is rotated by an angle α with respect to the chessboard pattern of grating 810, and its unit cell is larger by a factor of √2. This is due to a different definition of the grating constant for the phase-grating on the fronts side and the amplitude grating at the back side. Note that the gratings are rotated by 45 degree in addition to the rotation by the angle α. This relationship is illustrated in FIG. 18(*b*), which shows a portion of grating 810 (labeled 810') and the relative orientation and size of a portion of grating 820 (labeled 820'). In embodiments where the grating orientation has a nominal rotation of 45°, the angle a depends on the grating period and pixel size, and can be, e.g., 20° or less, 15° or less, 12° or less, 10° or less, 8° or less, 5° or less.

FIGS. 20(*a*)-20(*d*) show the results of a numerical simulation for a very small part of a device in which grating 810 is a phase grating and grating 820 is an amplitude grating and represents a small fraction of the complete lateral dimensions of the gratings. FIG. 20(*a*) shows the real part of phase grating 810, while FIGS. 20(*b*) and 20(*c*) show the real and imaginary parts of the phase grating a distance of 0.1663 mm from grating 810 towards grating 820. FIG. 20(*d*) shows the intensity pattern produced by grating 810 0.1663 mm from grating 810 towards grating 820. Due to computational restrictions, these figures are shown with a circular boundary, however this should not be interpreted as a physical boundary of the measured beam.

Figure 21:
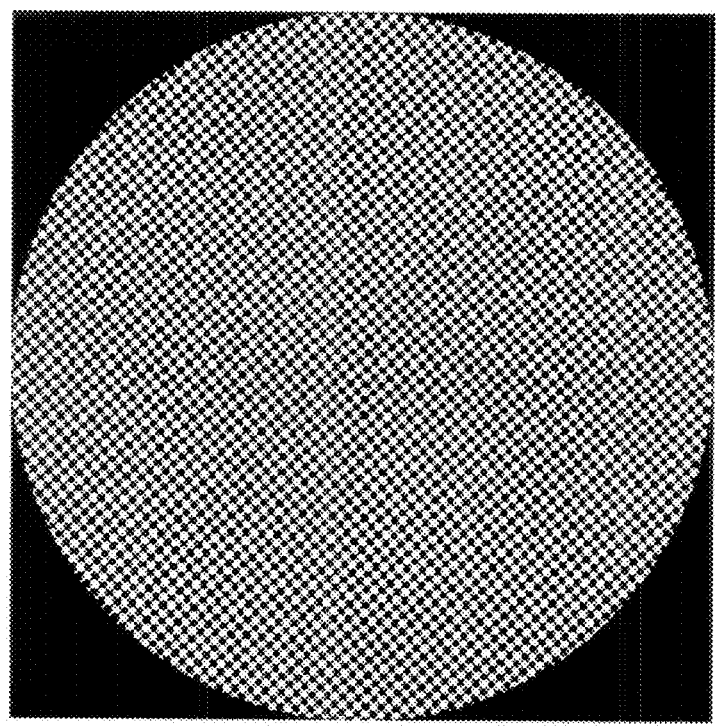
FIG. 21 shows the intensity after both the gratings from FIGS. 20(a)-20(d).

FIG. 21 shows the intensity after both gratings. Notice a chessboard-like "moiré pattern" that is created by an interference effect. The rotation angle of Δα=8° between gratings 810 and 820, and the grating constants are all chosen to fit the pixels spacing of detector 830. For example, in the case where the detector has square pixels with 7.4 μm spacing, grating constants for the amplitude and phase gratings can be $\Lambda_A$=2√2 μm and $\Lambda_P$=4√2 μm, respectively (see FIG. 18(*b*) for definitions of $\Lambda_A$ and $\Lambda_P$).

Given the grating constants, the shear can be computed as a function of the thickness of the device (i.e., as a function of the distance d between gratings 810 and 820). It is reasonable to relate the amount of absolute shear to the spacing of the pixels, for instance a shear of 1, 2, 3, 4 or even more pixels, depending on the application. The larger the shear, the higher the sensitivity but also the smaller the amount of aberration that can be measured. In addition, the smaller the shear, the higher the spatial resolution. Since the resolution is limited by the size of the convolution kernel, it is reasonable to relate the shear also to size of the convolution kernel.

As an illustrative example, a shear of 3 pixels (i.e., s=3×7.4 μm=22.2 μm) is chosen, along with a "nominal wavelength" λ=550 nm for the visible range. With $\Lambda_P$=4√2 μm, n=1.459911 for the fused $SiO_2$ on which gratings 810 and 820 are formed, a diffraction angle γ between the plus first and the minus first order of can be obtained using the following equation:

$$\gamma = 2 \cdot \arcsin\left(\frac{\lambda}{n \cdot \Lambda_P}\right) \tag{24}$$

The absolute shear is given by:

$$s = 2 \cdot d \cdot \tan\left(\frac{\gamma}{2}\right) = \tag{25}$$

$$2 \cdot d \cdot \frac{\sin\frac{\gamma}{2}}{\sqrt{1-\left(\sin\frac{\gamma}{2}\right)^2}} = \frac{2 \cdot d \cdot \lambda}{n \cdot \Lambda_P \cdot \sqrt{1-\frac{\lambda^2}{n^2 \Lambda_P^2}}} = \frac{2 \cdot d \cdot \lambda}{\sqrt{n^2 \cdot \Lambda_P^2 - \lambda^2}}$$

Therefore, for a given absolute shear the thickness of the plate must be chosen as:

$$d = \frac{s \cdot \sqrt{n^2 \cdot \Lambda_P^2 - \lambda^2}}{2 \cdot \lambda} \tag{26}$$

For this example, d is calculated to be 0.1663 mm, a value that is very close to the standard thickness of microscopic cover glasses, for example. Such a device may be readily mounted on top of the cover glass and micro-lenses that CCD detectors currently already have.

Figure 22:
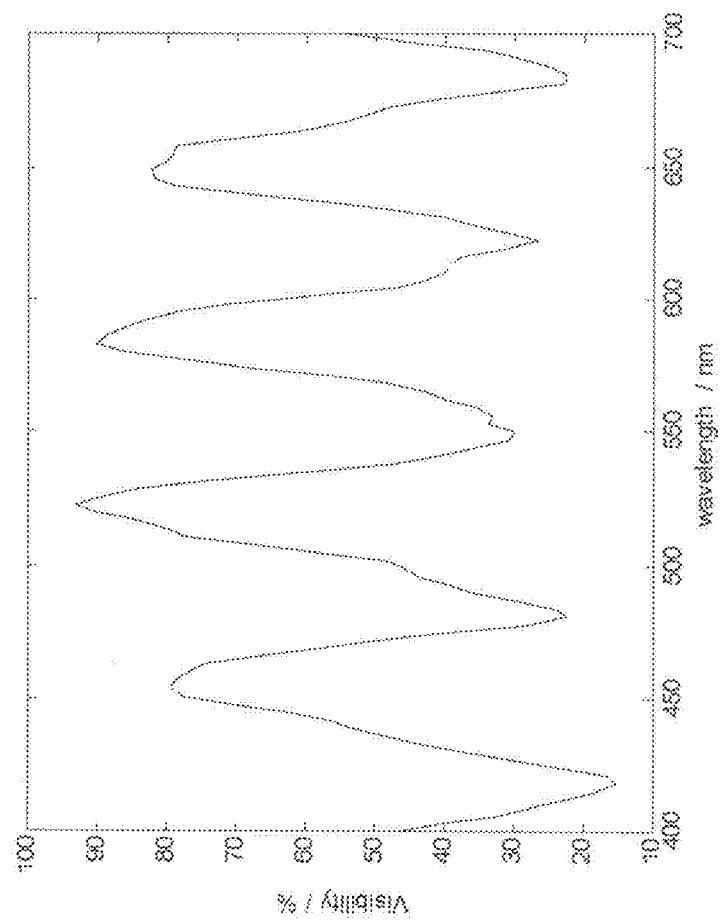
FIG. 22 shows the visibility of an interference pattern in the visible wavelength range (approximately from 400 nm to 700 nm).

Referring to FIG. 22, fringe visibility can also be determined for the above-described example. Specifically, FIG. 22 shows the visibility of the interference pattern for the design wavelength of 550 nm in the visible wavelength range (approximately from 400 nm to 700 nm). It can be seen that the visibility is periodically vanishing; accordingly, in some embodiments, one can design a device that is optimized simultaneously for 2 or 3 discrete wavelengths, for example, for 405 nm, 550 nm, and 660 nm.

In certain embodiments, where a broadband light measurement (e.g., white light) is desired, one can simultaneously use two devices with different thickness designed to act complementarily with respect to visibility. The minima in the visibility spectrum shown in FIG. 22 can be understood as arising from the Talbot effect of the phase-grating. The thickness d of the device allows fine-tuning of the location of maxima by lateral shifting. The grating constant allows the stretching or shrinking in the spectral locations of the maxima.

Compact assemblies such as that shown in FIGS. 17(*a*) and 17(*b*) and discussed by way of example above have many possible applications, a few of which are as follows: (1) Measurement of the wavefront of complete optical systems, like cell-pone camera lenses, digital camera lenses, microscopic lenses, lenses of SLR cameras, or digital projector lenses; (2) Measurement of wavefronts after transmission through ophthalmic lenses, including continuous vision lenses; (3) Measurement of the transmitted aspheric or spherical wavefront of single spherical or aspheric lens elements; (4) Measurement of the wavefront during the assembly of optical instruments to detect asymmetries caused by misalignment; (5) Measurement of the wavefront falling on a Fizeau interferometer as an alignment aid for a fast or automated alignment of parts to be measured. This is a much more versatile version of the common "cross-hair" used for alignment; (6) Measurement of turbulence in air, for instance along the measurement paths of a distance measuring interferometer; and (7) Sensor in arrangements with closed loop feedback for active optical applications. Applications are discussed in more detail below.

In some embodiments, a beam-splitter and two cameras can be used together with appropriate spatial filters placed in telescope 150, located behind gratings 141 and 142, in order to separate the x-shear information from the y-shear information. The cameras should be synchronized.

Furthermore, while the foregoing techniques utilize carrier fringes in order to extract phase information from a single detector frame, other implementations are also possible. For example, in some embodiments, a phase-shifting technique which introduces different magnitudes of phase steps in the x-sheared and y-sheared rays, by shifting the grating in a direction other than 45 degrees, for instance 11 degrees, 20 minutes. For this angle, the cosine and the sine are a factor of five different, which can result in a desirable separation of the measured shear for x- and y-direction, even for the second and third diffraction orders in addition to the first one. In other words, this orientation can reduce (e.g., minimize) the crosstalk.

Additional Applications

In general, the disclosed wavefront analyzers and techniques can be used in a variety of applications. Due to the simultaneous measurement of x-sheared interferogram and y-sheared interferogram using a single camera in an optical arrangement that has almost perfectly created equal aberrations for the two interfering beams, these techniques have great potential for use in real-time measurements of wavefronts. The technique is especially suited for the measurement of dynamic wavefront changes, like in turbulence. Since only one "shot" is needed (i.e., no temporal phase-shifting), the technique could be used to measure the "thermal lens" in pulsed lasers, for example. As it is also an achromatic technique, the techniques may also be suited for the measurement of wavefront quality (e.g., focus spot) in laser welding systems.

In some embodiments, the techniques can be used to measure the properties of optical components (e.g., lenses, mirrors). For example, in some embodiments, wavefront analyzers can be used to measure the quality of an optical pickup for an optical memory device (e.g., a BluRay or DVD player/recorder).

Measurement rates of several Hz can already be reached with commercially-available general purpose computers. This can be important for applications in fields where the optimization of optical systems is performed, as is the case for pick-up optimization of Blue-ray discs and DVDs. A high measurement frequency may also be required in areas where the optical performance is optimized by closed-loop controls, like in astronomical and military applications or in laser material processing, to mention only a few examples.

The reconstruction technique in the latter case can easily be adapted to "mirror modes" of active or adaptive optics. By using a pipeline structure for the computations, for example, the measurement rate can be defined solely by the detector frequency (which may be as high as kHz, for example).

In the case of pick-up modules for BluRay and DVD players, the wavefront analyzer should be able to measure wavefronts at two different wavelengths (e.g., $\lambda=405$ nm and $\lambda=650$ nm) as well as different numerical apertures (e.g., NA=0.85 and NA=0.6). In addition, the thickness of the layer on the storage device is different (e.g., thickness of layer on the blue ray disk is 0.1 mm and is 0.6 mm for DVD), which lead to different necessary pre-aberrations on the spherical wavefront entering the layer.

Wavefront analyzers disclosed above can be used to measure both the BluRay and DVD heads with one instrument. For a combined pick-up for both wavelengths, a simultaneous measurement for both wavelengths can be performed using a multi-element detector that includes color filters so that a subset of the detector elements are used to detect light at one wavelength, while another subset detect light at the other wavelength. Alternatively, or additionally, sequential measurements can be made at each wavelength.

In order to adapt to the measurement of different layer thicknesses, it is possible to insert different thin "cover glasses" between the pick-up lens and the wavefront analyzer. Alternatively, or additionally, aberrations due to the different layer thicknesses can be compensated during data analysis. For example, the spherical aberration which is caused by a cover glass of thickness t and refractive index n on a wavefront with a numerical aperture NA can be calculated by ray-tracing and polynomial fitting to the achieved wavefront or OPD (optical path length difference to a Gaussian reference sphere), e.g., in a form using the appropriate Zernike polynomials Z9, Z16, Z25 and Z36 for the fit (these polynomials are rotationally symmetric). These values can be stored and subtracted from the measured results when no cover glass is used during the measurement. Similarly, measurements made using a cover glass can be corrected where either the thickness and/or the refractive index of the used cover glass does not match the original cover glass. Here, ray-tracing can allow one to calculate the residual effect, which then can be compensated by Zernike polynomials.

As an example, details of a wavefront analyzer for measuring pick-up heads of BluRay and DVD disks are provided in TABLE 2 below. Such as system was used with a CCD camera with 640×480 pixels. For analysis, 2×2 pixels were "binned" together, so the detector had an effective resolution of 320×240. 240×240 points were used to inscribe a circle on the detector from which data was obtained.

TABLE 2

| | BluRay Disc @ $\lambda$ = 405 nm | DVD @ $\lambda$ = 660 nm |
|---|---|---|
| Diameter of bundle entering the grating shear pair B = | 5.00 mm | 4.70 mm |
| Diameter of Bundle at detector $B_d$ = | 3.35 mm | 3.15 mm |
| Ratio of focal lengths in telescope 150 $f_1/f_2$ = | 1.4925 | 1.4920 |
| separation of grating pair d = | 4 mm | 4 mm |
| period of chessboard grating $u_0 = v_0$ = | 0.020 mm | 0.020 mm |
| effective period of chessboard grating $t_0 = s_0 = \Lambda$ = | 0.01414 mm | 0.01414 mm |
| absolute shear, eq. (6), s = | 0.1146 mm | 0.1869 mm |
| relative shear, eq. (9), $\sigma$ = | 2.292% | 3.976% |
| Effective pixel size of 2 × 2 binned pixels pix = | 0.0148 mm | 0.0148 mm |

TABLE 2-continued

|  | BluRay Disc @ λ = 405 nm | DVD @ λ = 660 nm |
|---|---|---|
| Rotation angle of the gratings to obtain carrier fringes, eq. (16) α = | 13° | 13° |
| Separation of the filter aperture from the optical axis for $f_1$ = 60 mm, eq. (10), e = | 1.72 mm | 2.80 mm |
| Diameter of the filter holes D = 2e/3 = | 1.15 mm | 1.87 mm |

Figure 23:
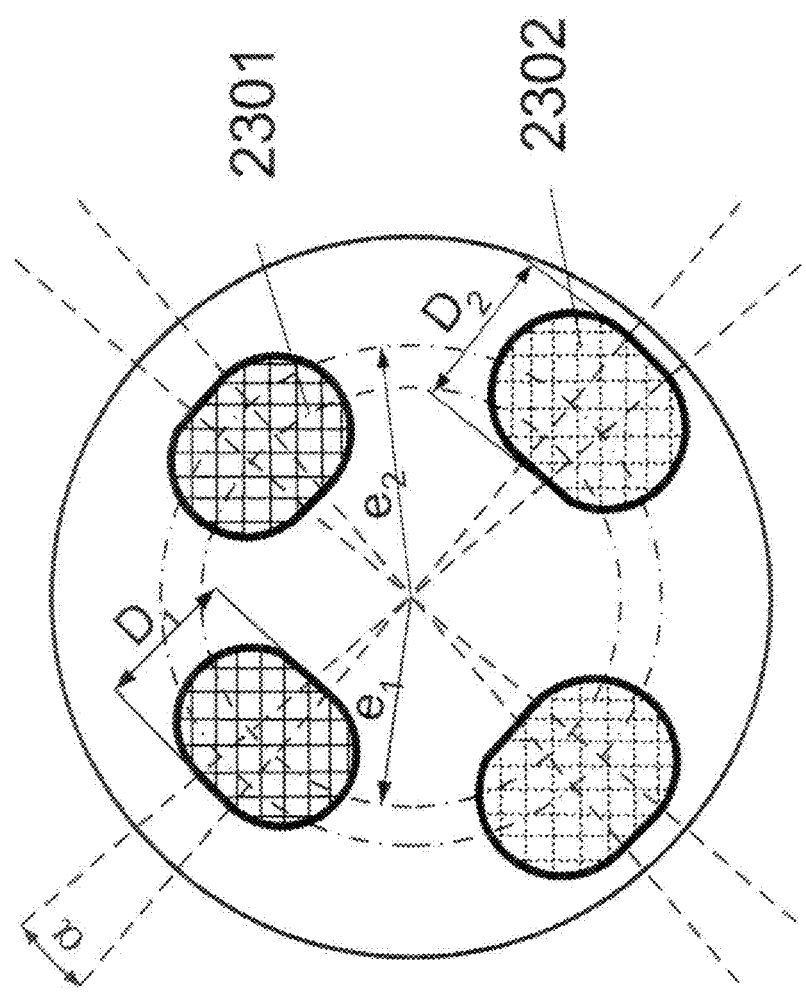
FIG. 23 shows a spatial filter with four filter apertures in which two holes are covered with a first dichroic filter. The two opposite apertures include a second dichroic filter.

It is noted that the gratings used are common to both wavelengths, therefore the rotation angle between the gratings to create the carrier fringes is also common to both wavelengths—this feature is achromatic. Also, the distance e of the filter holes from the optical axis and the diameter of the filter holes from the optical axis is different at the two wavelengths, as shown in the last two lines of the table. This can be accommodated by selecting a compromised value for e and D. Alternatively, with reference to FIG. 23, it is possible to make in total 4 filter apertures in the spatial filter and cover 2 holes with a first dichroic filter 2301 to transmit blue light (405 nm) and block red light (650 nm). The two opposite apertures are include a second dichroic filter 2302 which transmits red and blocks blue. While the relative shear is different for the two wavelengths, this is of no consequence because the software evaluation for the reconstruction of the wavefronts is adapted to the actual shear for each wavelength.

The disclosed apparatus and techniques can be applied in cases where an optical system as a whole (e.g., composed of multiple optical components) is tested, for instance in a pick-up device for DVDs and BluRay discs. These devices can include the light source, beam shaping devices and finally the focusing lens. Besides this application, the testing of a complete telescope (e.g., where the a star is the light source), the testing of a complete camera lens, for instance a cell-phone camera lens or a zoom lens for a digital SLR camera, can be performed using the disclosed wavefront measurement techniques.

In some embodiments, a wavefront analyzer can be integrated into a camera. For example, an analyzer can be incorporated into a camera with a large zoom range (e.g., a television or movie camera) in order to improve (e.g., optimize) the optical performance of the zoom optics in the field. In addition, or alternatively, the analyzer can be used for auto-focus functioning.

Even though the shear, s, is proportional to the wavelength, given a certain wavefront aberration in nm, the number of interference fringes is inversely proportional to the wavelength, such that the number of interference fringes in a sheared interferogram is overall, strictly independent of wavelength. That means that a source with a specific (and large) spectral range can be used to measure (for instance photographic) lenses within the same spectral for which the lenses are made for. From the wavefront measurement, the modulation transfer function can be calculated with high precision, enabling the measurement of the "white light MTF".

In some embodiments, an in-situ optimization of lithographic projection optics can also be performed with such a wavefront analyzer. Together with the ability to perform wavefront reconstructions using two shearing phase-maps in a pipeline structure, high data processing rates can be possible. Commercially-available digital cameras already include dedicated "image engines", accordingly, their software/firmware can be extended to also include the algorithms needed for complete wavefront reconstruction.

Software

The analysis steps described above can be implemented in computer programs using standard programming techniques. Such programs are designed to execute on programmable computers or specifically designed integrated circuits, each comprising an electronic processor, a data storage system (including memory and/or storage elements), at least one input device, and least one output device, such as a display or printer. The program code is applied to input data (e.g., images from the detector) to perform the functions described herein and generate output information (e.g., Zernike coefficients, etc.), which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis and control functions described herein.

A number of embodiments have been described. Nevertheless, it will be understood that various modifications may be made without departing from the spirit and scope of the invention. For example, in some embodiments, additional information above wavefronts can be determined based on the Zernike coefficients. For example, wavefront maps can be reconstructed based on the Zernike coefficients. In certain embodiments, information about the test object itself can be determined based on the Zernike coefficients.

Other embodiments are within the scope of the following claims.

What is claimed is:

1. A method, comprising:
simultaneously diffracting a beam in a first direction and a second direction orthogonal to the first direction to form a once-diffracted beam, where the beam comprises a wavefront shaped by a test object;
simultaneously diffracting the once-diffracted beam in orthogonal directions to form a twice-diffracted beam;
overlapping at least two orders of the twice-diffracted beam in each direction to form an interference pattern at a detector, the interference pattern being formed by multiple copies of the wavefront laterally sheared in the first direction and multiple copies of the wavefront laterally sheared in the second direction; and
determining information about the wavefront based on the interference pattern.

2. The method of claim 1, wherein simultaneously diffracting the once-diffracted beam introduces carrier fringes into the interference pattern.

3. The method of claim 2, wherein the carrier fringes are introduced by simultaneously diffracting the once-diffracted beam in orthogonal directions rotated by a non-zero angle α with respect to the first and second directions.

4. The method of claim 3, wherein the once-diffracted beam is formed by a first grating and the twice-diffracted beam is formed by a second grating.

5. The method of claim 4, wherein overlapping the multiple orders comprises imaging a surface equidistant from the first and second gratings onto the detector.

6. The method of claim 5, wherein the first and second gratings are each periodic in two dimensions.

7. The method of claim 1, further comprising spatially filtering the twice-diffracted beam to reduce the number of diffracted orders at the detector.

8. The method of claim 1, wherein the information is determined based on a single image frame of the interference pattern acquired by the detector.

9. The method of claim 8, further comprising acquiring additional image frames of the interference pattern and determining information about the wavefront for each of the additional image frames.

10. The method of claim 1, further comprising collimating the beam prior to diffracting the beam.

11. The method of claim 1, wherein the information about the wavefront comprises information about aberrations of the wavefront.

12. The method of claim 1, wherein information about the wavefront comprises Zernike coefficients for the wavefront.

13. The method of claim 1, wherein the test object is a focusing optical element.

14. The method of claim 13, wherein the test object is an optical pickup for an optical storage medium.

15. The method of claim 14, wherein the test object is an optical pickup for a Blu-Ray player.

16. The method of claim 1, wherein the information is determined for at least two different wavelengths.

17. The method of claim 16, wherein the at least two wavelengths include 405 nm and 650 nm.

18. The method of claim 1, wherein determining information about the wavefront comprises:
measuring an intensity of the interference pattern at multiple locations using the detector;
applying a convolution kernel to data derived from the measured intensity values to separate contributions to the interference pattern for shear in the first and second directions; and
determining the information based on the separated contributions.

19. The method of claim 18, wherein the intensity of the interference pattern includes information based on phase differences between sheared copies of the wavefront.

20. The method of claim 19, wherein the intensity of the interference pattern is proportional to a differentiated Zernike surface.

21. The method of claim 18, wherein determining the information comprises subtracting a carrier phase from the data after applying the convolution kernel to provide carrier phase adjusted data.

22. The method of claim 21, wherein determining the information further comprises:
computing differentiated Zernike surfaces in each of the first and second directions; and
multiplying the carrier phase adjusted data with the differentiated Zernike surfaces to obtain a set of Zernike coefficients describing the wavefront.

23. The method of claim 1, wherein at least part of the interference pattern comprises contributions from at least a pair of wavefronts sheared in the first direction and at least a pair of wavefronts sheared in the second direction.

24. The method of claim 23, wherein determining the information comprises applying a convolution kernel to data derived from measured intensity values of the interference pattern to separate contributions to the interference pattern for shear in the first and second directions.

25. The method of claim 1, wherein determining the information comprises fitting differentiated Zernike surfaces to data based on the interference pattern.

26. An apparatus, comprising:
a first grating, periodic in a first direction and a second direction orthogonal to the first direction, positioned along an optical axis to diffract a beam from a test object in the first and second directions, the beam comprising a wavefront shaped by the test object;
a second grating, periodic in two orthogonal directions, positioned to receive the once-diffracted beam from the first grating and diffract the once-diffracted beam in the two orthogonal directions;
a detector positioned to receive at least two orders of the twice-diffracted beam in the first and second directions forming an interference pattern at the detector, the interference pattern being formed by multiple copies of the wavefront laterally sheared in the first direction and multiple copies of the wavefront laterally sheared in the second direction; and
an electronic processor in communication with the detector and configured to determine information about the wavefront based on the interference pattern.

27. The apparatus of claim 26, wherein the orthogonal directions of the second grating are rotated by a non-zero angle $\alpha$ with respect to the first and second directions.

28. The apparatus of claim 27, wherein the electronic processor is configured to determine information about the wavefront based on carrier fringes in the interference pattern related to the rotation angle $\alpha$.

29. The apparatus of claim 26, wherein the second grating is rotated by an angle of $45°\pm\alpha$ with respect to the first and second directions, wherein $\alpha$ is 20° or less.

30. The apparatus of claim 29, wherein the first grating has a first period and the second grating has a second period which is different from the first period by a factor of $\sqrt{2}$.

31. The apparatus of claim 26, wherein at least one of the gratings is a phase grating.

32. The apparatus of claim 26, wherein at least one of the gratings is an amplitude grating.

33. The apparatus of claim 26, wherein at least one of the gratings has a checkerboard grating pattern.

34. The apparatus of claim 26, wherein the first and second gratings are formed on opposing sides of a common substrate.

35. The apparatus of claim 26, further comprising an optical assembly between the second grating and the detector, the optical assembly being configured to image a surface between the first and second gratings onto the detector.

36. The apparatus of claim 35, wherein the optical assembly is telecentric at the detector.

37. The apparatus of claim 35, wherein the optical assembly comprises a telescope.

38. The apparatus of claim 35, wherein the optical assembly comprises a spatial filter configured to reduce the number of diffracted orders at the detector.

39. The apparatus of claim 26, further comprising an optical assembly positioned on the optical axis between test object and the first grating.

40. The apparatus of claim 39, wherein the optical assembly has a numerical aperture higher than a numerical aperture of the test object.

41. The apparatus of claim 26, wherein the detector is a multi-element detector.

* * * * *